(12) United States Patent
Liu et al.

(10) Patent No.: US 12,197,498 B2
(45) Date of Patent: Jan. 14, 2025

(54) METHOD, APPARATUS, AND SYSTEM FOR DETERMINING POSE

(71) Applicant: Huawei Technologies Co., Ltd., Guangdong (CN)

(72) Inventors: Jinxue Liu, Shenzhen (CN); Jun Cao, Shenzhen (CN); Ruihua Li, Shenzhen (CN); Jiange Ge, Shenzhen (CN); Yuanlin Chen, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 321 days.

(21) Appl. No.: 17/662,260

(22) Filed: May 6, 2022

(65) Prior Publication Data
US 2022/0262035 A1 Aug. 18, 2022

Related U.S. Application Data

(63) Continuation of application No. PCT/CN2020/100475, filed on Jul. 6, 2020.

(30) Foreign Application Priority Data

Nov. 8, 2019 (CN) .......................... 201911089900.7
Feb. 27, 2020 (CN) .......................... 202010124987.3

(51) Int. Cl.
*G06T 7/73* (2017.01)
*G06F 16/532* (2019.01)
(Continued)

(52) U.S. Cl.
CPC .......... *G06F 16/587* (2019.01); *G06F 16/532* (2019.01); *G06T 7/0002* (2013.01);
(Continued)

(58) Field of Classification Search
None
See application file for complete search history.

(56) References Cited

U.S. PATENT DOCUMENTS 9,080,882 B2 7/2015 Gupta et al.
2013/0157682 A1 6/2013 Ling
(Continued)

FOREIGN PATENT DOCUMENTS

CN 103489002 A 1/2014
CN 104422439 A 3/2015
(Continued)

OTHER PUBLICATIONS

ITU-T H.264(Jun. 2019),Series H: Audiovisual and Multimedia Systems, Infrastructure of audiovisual services—Coding of moving video, Advanced video coding for generic audiovisual services, total 836 pages.
(Continued)

*Primary Examiner* — Edward Park
(74) *Attorney, Agent, or Firm* — WOMBLE BOND DICKINSON (US) LLP

(57) ABSTRACT

A method, an apparatus, and a medium for determining a pose are provided. The method includes: receiving a query image sent by a terminal and N text fields included in the query image; determining a candidate reference image based on a prestored correspondence between a reference image and a text field and based on the N text fields; determining an initial pose of the terminal at the first location based on the query image and the candidate reference image; and sending the initial pose to the terminal. According to the method, a candidate reference image is queried based on a text field, and an initial pose of a terminal is obtained based on a candidate reference image with higher accuracy. Therefore, the obtained pose is more accurate.

15 Claims, 26 Drawing Sheets

(51) Int. Cl.
*G06F 16/587* (2019.01)
*G06T 7/00* (2017.01)
*G06V 10/24* (2022.01)
*G06V 10/74* (2022.01)
*G06V 20/62* (2022.01)

(52) U.S. Cl.
CPC ............... *G06T 7/74* (2017.01); *G06V 10/24* (2022.01); *G06V 10/74* (2022.01); *G06V 20/63* (2022.01); *G06T 2207/30168* (2013.01); *G06T 2207/30184* (2013.01)

(56) References Cited

U.S. PATENT DOCUMENTS

| | | | |
|---|---|---|---|
| 2013/0243250 A1 | 9/2013 | France et al. | |
| 2017/0046580 A1* | 2/2017 | Lu | G06V 10/462 |
| 2018/0033162 A1* | 2/2018 | Chang | G06V 10/82 |
| 2019/0370998 A1* | 12/2019 | Ciecko | G06T 7/248 |
| 2022/0262035 A1* | 8/2022 | Liu | G06T 7/0002 |

FOREIGN PATENT DOCUMENTS

| | | |
|---|---|---|
| CN | 106304335 A | 1/2017 |
| CN | 109919157 A | 6/2019 |

OTHER PUBLICATIONS

Torsten Sattler et al, Efcient and Effective Prioritized Matching for Large-Scale Image-Based Localization, IEEE Transactions on Pattern Analysis and Machine Intelligence, vol. 39, No. 9, Sep. 2017, 13 pages.

Paul-Edouard Sarlin et al, From Coarse to Fine: Robust Hierarchical Localization at Large Scale, IEEE/CVF Conference on Computer Vision and Pattern Recognition (CVPR), 2019, 10 pages.

\* cited by examiner

METHOD, APPARATUS, AND SYSTEM FOR DETERMINING POSE

CROSS-REFERENCE TO RELATED APPLICATIONS

This application is a continuation of International Application No. PCT/CN2020/100475, filed on Jul. 6, 2020, which claims priority to Chinese Patent Application No. 202010124987.3, filed on Feb. 27, 2020 and Chinese Patent Application No. 201911089900.7, filed on Nov. 8, 2019. The disclosures of the aforementioned applications are hereby incorporated by reference in their entireties.

TECHNICAL FIELD

The present disclosure relates to the field of electronic technologies, and in particular, to a method, an apparatus, and a system for determining a pose.

BACKGROUND

With development of science and technology, a computer vision technology is applied more extensively. An initial pose of a terminal can be determined by using the computer vision technology. The initial pose includes a location and a posture of the terminal in a target venue.

A specific implementation of determining the initial pose of the terminal is as follows: The terminal shoots a query image at a current position in the target venue, and uploads the query image to a server. The server stores a plurality of environmental images shot at each position in the target venue and three-dimensional location information of a physical point that is in actual space and corresponding to each pixel in each environmental image. After receiving the query image sent by the terminal, the server searches the stored environmental images of the target venue for a target environmental image that matches the query image. The server further extracts an image key point in the query image, and determines, from pixels in the target environmental image, a target pixel that matches the image key point in the query image. Based on the stored three-dimensional location information of the physical point that is in the actual space and corresponding to each pixel in each environmental image, and the target pixel that is in the target environmental image and matches the image key point in the query image, the server determines three-dimensional location information of a physical point that is in the actual space and corresponding to the image key point in the query image. Finally, the server can perform pose calculation processing by using a pose calculation algorithm based on location information of the image key point in the query image and the three-dimensional location information of the corresponding physical point in the actual space, to obtain the initial pose of the terminal. The server sends the determined initial pose to the terminal, and the terminal performs navigation or other processing based on the initial pose.

Theoretically, in the foregoing process, if a shooting location of the target environmental image that matches the query image and is found by the server is closer to a shooting location of the query image, the initial pose finally determined is more accurate. Certainly, in addition to the foregoing shooting location, there are many factors that can affect accuracy of the initial pose, and those factors are not considered herein.

In a process of implementing the present disclosure, a conventional technology has the following disadvantages:

Because a plurality of similar environments exist at different positions in some venues, there are a plurality of similar environmental images among different environmental images shot at different positions in the venues. For example, there are usually a plurality of similar environmental images among environmental images of underground garages. If the target venue is an underground garage, in a process of searching for the target environmental image matching the query image, due to interference from a plurality of similar environmental images, the server is likely to find an environmental image that is not actually shot near the shooting location of the query image, as the target environmental image. Therefore, accuracy of the initial pose determined based on this target environmental image is low.

SUMMARY

To overcome the problem in the related art, the present disclosure provides the following technical solutions.

According to a first aspect, an embodiment of the present disclosure provides a method for determining a pose, where the method includes:
  obtaining, by a terminal, a query image at a first location, where a scene at the first location includes a scene in the query image, and the query image has a text;
  determining N text fields included in the query image, where N is greater than or equal to 1;
  sending the N text fields and the query image to a server; and
  receiving an initial pose that is of the terminal at the first location and is returned by the server, where the initial pose is determined and obtained by the server based on the N text fields and the query image.

According to this embodiment of the present disclosure, even if a plurality of similar environments exist at different positions in target venues, and there are a plurality of similar images among different images shot at different positions in the venues, a candidate reference image that matches the query image can be queried based on a text field included in the query image and text fields included in different reference images. Even if there is interference from the plurality of similar images, accuracy of the candidate reference image found based on the text field is high, and the initial pose of the terminal obtained by performing pose calculation processing based on the candidate reference image with higher accuracy is more accurate.

In an embodiment, the obtaining, by a terminal, a query image at a first location includes:
  shooting a first initial image;
  when the first initial image has no text, displaying first prompt information or playing first prompt information by voice, where the first prompt information is used to indicate that no text is detected in the first initial image, and prompt a user to move a location of the terminal or adjust a shooting angle of the terminal; and
  when the terminal shoots, at the first location, a second initial image having a text, determining the second initial image as the query image.

In the foregoing manner, after the user performs an operation every time, the terminal may evaluate and properly guide the operation of the user based on preset logic, to guide the user to shoot a query image with high image quality. Accuracy of the initial pose of the terminal determined based on the query image with high image quality is high.

In an embodiment, the obtaining, by a terminal, a query image at a first location includes:

shooting a third initial image;

determining, by performing text detection processing on the third initial image, a text region image included in the third initial image;

when the text region image included in the third initial image does not meet a preferred image condition, displaying second prompt information or playing second prompt information by voice, where the second prompt information is used to indicate that the text region image included in the third initial image does not meet the preferred image condition, and prompt a user to move the terminal in a direction of a real text; and when the terminal shoots, at the first location, a fourth initial image including a text region image that meets the preferred image condition, determining the fourth initial image as the query image, where the preferred image condition includes one or more of the following conditions:

a size of the text region image is greater than or equal to a size threshold;

definition of the text region image is higher than or equal to a definition threshold; and texture complexity of the text region image is less than or equal to a complexity threshold.

In the foregoing manner, after the user performs an operation every time, the terminal may evaluate and properly guide the operation of the user based on preset logic, to guide the user to shoot a query image with high image quality. Accuracy of the initial pose of the terminal determined based on the query image with high image quality is high.

In an embodiment, the obtaining, by a terminal, a query image at a first location includes:

shooting a fifth initial image;

determining N text fields included in the fifth initial image;

obtaining M text fields included in a reference image, where a time interval between a time at which the reference image is captured and a time at which the fifth initial image is captured is less than a duration threshold, and M is greater than or equal to 1;

when any text field included in the fifth initial image is inconsistent with each of the M text fields, displaying third prompt information or playing third prompt information by voice, where the third prompt information is used to indicate that an incorrect text field is recognized in the fifth initial image, and prompt a user to move a location of the terminal or adjust a shooting angle of the terminal; and when text fields included in a sixth initial image shot by the terminal at the first location all belong to the M text fields, determining the sixth initial image as the query image.

In the foregoing manner, after the user performs an operation every time, the terminal may evaluate and properly guide the operation of the user based on preset logic, to guide the user to shoot a query image with high image quality. Accuracy of the initial pose of the terminal determined based on the query image with high image quality is high.

In an embodiment, the obtaining, by a terminal, a query image at a first location includes:

capturing, by the terminal, a first image of a current scene at the first location, where the first image includes a text;

performing text detection processing on the first image to obtain at least one text region image; and using the at least one text region image included in the first image as the query image.

After a user is guided to shoot the first image including the text region image that meets a preset condition, cropping or matting processing may be performed on the first image to obtain the text region image in the first image from the first image. When the query image is subsequently sent to the server, only the text region image obtained through cropping or matting processing needs to be sent, and there is no need to send the entire first image.

In an embodiment, the method further includes:

determining a location region of the text region image in the query image; and sending the location region to the server; and that the initial pose is determined and obtained by the server based on the N text fields and the query image includes: the initial pose is determined and obtained by the server based on the location region of the text region image in the query image, the N text fields, and the query image.

The image sent by the terminal is a complete environmental image, and the server determines the initial pose by using the text region image. Therefore, the terminal can further send the location region of the text region image in the environmental image to the server, and the server determines the initial pose of the terminal based on the location region.

In an embodiment, the method further includes:

obtaining location information of the terminal; and sending the location information to the server; and that the initial pose is determined and obtained by the server based on the N text fields and the query image includes: the initial pose is determined and obtained by the server based on the N text fields, the query image, and the location information.

When there are a plurality of candidate reference images, a target reference image may be screened out from the candidate reference images based on the location information. Therefore, accuracy of the initial pose determined based on the target reference image is higher.

In an embodiment, after the receiving an initial pose returned by the server, the method further includes:

obtaining a pose change of the terminal; and determining a real-time pose based on the initial pose and the pose change of the terminal.

By using a simultaneous localization and mapping (SLAM) tracking technology, computational overheads can be reduced. The terminal needs to send the query image and the N text fields to the server only once. The server needs to return the initial pose of the terminal only once based on the query image and the N text fields. Subsequently, the real-time pose may be determined based on the initial pose and based on the SLAM tracking technology.

In an embodiment, after the receiving an initial pose returned by the server, the method further includes:

obtaining a preview stream of the current scene;

determining, based on the real-time pose, preset media content included in a digital map corresponding to the scene in the preview stream; and rendering the media content in the preview stream.

If the terminal is a mobile phone, an AR wearable device, or the like, a virtual scene may be constructed based on the real-time pose. First, the terminal may obtain the preview stream of the current scene. For example, the user may shoot a preview stream of a current environment in a shopping mall. Then the terminal may determine the real-time pose according to the foregoing method. Subsequently, the terminal may obtain the digital map, where the digital map records three-dimensional coordinates of each position in a world coordinate system, and corresponding preset media content exists at a preset three-dimensional coordinate position. The terminal may determine, in the digital map, a target three-dimensional coordinate position corresponding to the real-time pose, and if corresponding preset media content exists at a target three-dimensional coordinates positon, obtain the preset media content. For example, when the user photographs a target store, the terminal recognizes a real-time pose, determines that a current camera is photographing the target store, and may obtain preset media content corresponding to the target store, where the preset media content corresponding to the target store may be description information of the target store, for example, which goods are worth buying in the target store. Based on this, the terminal may render the media content in the preview stream. In this case, the user may view, in a preset region near an image corresponding to the target store in the mobile phone, the preset media content corresponding to the target store. After viewing the preset media content corresponding to the target store, the user may have a general understanding of the target store.

In an embodiment, the determining N text fields included in the query image includes:
  determining all text fields in the query image;
  inputting each text field into a pre-trained text classifier to obtain a text type corresponding to each text field; and
  determining, from all the text fields, text fields whose text types are a preset salient type as the N text fields.

Screening processing may be performed on all the text fields detected in the query image to further extract a text field of the salient type, where the text field of the salient type is an identification field and can clearly or uniquely identify an environment. Alternatively, the server may be configured to complete the execution logic. Accuracy of the initial pose determined based on the text field of the salient type is higher.

According to a second aspect, an embodiment of the present disclosure provides a method for determining a pose, where the method includes:
  receiving a query image sent by a terminal and N text fields included in the query image, where N is greater than or equal to 1, the query image is obtained based on an image captured by the terminal at a first location, and a scene at the first location includes a scene in the query image;
  determining a candidate reference image based on a prestored correspondence between a reference image and a text field and based on the N text fields;
  determining an initial pose of the terminal at the first location based on the query image and the candidate reference image; and
  sending the initial pose to the terminal.

According to this embodiment of the present disclosure, even if a plurality of similar environments exist at different positions in target venues, and there are a plurality of similar images among different images shot at different positions in the venues, a candidate reference image that matches the query image can be queried based on a text field included in the query image and text fields included in different reference images. Even if there is interference from the plurality of similar images, accuracy of the candidate reference image found based on the text field is high, and the initial pose of the terminal obtained by performing pose calculation processing based on the candidate reference image with higher accuracy is more accurate.

In an embodiment, the query image is an environmental image shot by the terminal, the reference image is a pre-shot environmental image, and the candidate reference image is a candidate environmental image among pre-shot environmental images.

In an embodiment, the query image is a text region image recognized in an environmental image shot by the terminal, the reference image is a text region image recognized in a pre-shot environmental image, the candidate reference image is a text region image recognized in a candidate environmental image, and the candidate environmental image is a candidate environmental image among pre-shot environmental images.

In an embodiment, when the query image is a text region image recognized in an environmental image shot by the terminal, the determining an initial pose of the terminal at the first location based on the query image and the candidate reference image includes:
  performing image enhancement processing on the query image to obtain a query image after the image enhancement processing; and
  determining the initial pose of the terminal at the first location based on the query image after the image enhancement processing and the candidate reference image.

After the image enhancement processing is performed on the query image, accuracy of extracting a local image feature in the query image can be improved, and further, accuracy of the initial pose determined based on the local image feature in the query image and the candidate reference image is also high.

In an embodiment, the determining an initial pose of the terminal at the first location based on the query image and the candidate reference image includes:
  determining a target reference image in the candidate reference image, where the scene at the first location includes a scene in the target reference image; and
  determining the initial pose of the terminal at the first location based on the query image and the target reference image.

Because some of candidate reference images are still interfering images, that is, the candidate reference images are not necessarily images pre-shot near the first location at which the query image is shot, but text fields corresponding to the candidate reference images are exactly consistent with the text fields corresponding to the query image, the interfering images are also used as candidate reference images to determine the initial pose of the terminal, and this affects accuracy of the initial pose. Therefore, screening processing may be performed on the candidate reference images to determine the target reference image.

In an embodiment, the determining the initial pose of the terminal at the first location based on the query image and the target reference image includes:
  determining a 2D-2D correspondence between the query image and the target reference image; and determining the initial pose of the terminal at the first location based on the 2D-2D correspondence and a preset 2D-3D correspondence of the target reference image.

The 2D-2D correspondence may include a 2D-2D correspondence between an environmental image shot by the terminal and a pre-shot target environmental image, and a 2D-2D correspondence between a text region image recognized in the environmental image shot by the terminal and a text region image recognized in the pre-shot target environmental image.

In an embodiment, the determining a 2D-2D correspondence between the query image and the target reference image includes:

determining an image key point that is in the target reference image and corresponding to each image key point in the query image, to obtain the 2D-2D correspondence between the query image and the target reference image.

In an embodiment, the 2D-3D correspondence of the target reference image includes three-dimensional location information of a physical point that is in actual space and corresponding to each image key point in the target reference image, and the determining the initial pose of the terminal at the first location based on the 2D-2D correspondence and a preset 2D-3D correspondence of the target reference image includes:

determining the initial pose of the terminal based on the 2D-2D correspondence and the three-dimensional location information of the physical point that is in the actual space and corresponding to each image key point in the target reference image.

In an embodiment, the method further includes:

receiving a location region of a text region image in the query image sent by the terminal; and the determining a 2D-2D correspondence between the query image and the target reference image includes:

determining, based on the location region, a target text region image included in the query image;

obtaining a text region image included in the target reference image; and determining a 2D-2D correspondence between the target text region image and the text region image included in the target reference image.

The 2D-2D correspondence may include a 2D-2D correspondence between a target text region image recognized in the environmental image shot by the terminal and the text region image recognized in the pre-shot target environmental image.

In an embodiment, the determining a target reference image in the candidate reference image includes:

determining an image similarity between each candidate reference image and the query image; and determining a candidate reference image whose image similarity is greater than or equal to a preset similarity threshold as the target reference image.

Candidate reference images may be screened based on image similarities.

In an embodiment, the determining a target reference image in the candidate reference image includes:

obtaining a global image feature of each candidate reference image;

determining a global image feature of the query image;

determining a distance between the global image feature of each candidate reference image and the global image feature of the query image; and determining a candidate reference image whose distance is less than or equal to a preset distance threshold as the target reference image.

Candidate reference images may be screened based on global image features.

In an embodiment, the determining a target reference image in the candidate reference image includes:

receiving location information sent by the terminal;

obtaining a shooting location corresponding to each candidate reference image; and determining, in each candidate reference image, a target reference image whose shooting location matches the location information.

The location information sent by the terminal may be used to assist in screening the candidate reference images.

In an embodiment, when N is greater than 1, the determining a target reference image in the candidate reference image includes:

determining, in each candidate reference image, a target reference image including the N text fields.

In a process of determining candidate reference images corresponding to a plurality of text fields, the text fields may be obtained one by one. Each time a text field is obtained, a candidate reference image corresponding to the currently obtained text field is determined. In this way, the candidate reference images corresponding to the text fields can be determined one by one. A target reference image including a plurality of text fields in the query image may be determined from the candidate reference images, so that the candidate reference images are further screened. If one target reference image includes a plurality of text fields included in the query image, it indicates that a probability that a shooting location of the target reference image and a shooting location of the query image are close is very high, and accuracy of the initial pose determined based on the target reference image is also high.

In an embodiment, the determining a target reference image in the candidate reference image includes:

when there is only one candidate reference image, determining the candidate reference image as the target reference image.

In an embodiment, the determining a candidate reference image based on a prestored correspondence between a reference image and a text field and based on the N text fields includes:

inputting the N text fields included in the query image into a pre-trained text classifier to obtain a text type of each text field included in the query image;

determining a text field whose text type is a preset salient type; and searching, based on the prestored correspondence between a reference image and a text field, for a candidate reference image corresponding to the text field of the salient type.

Screening processing may be performed on all the text fields detected in the query image to further extract the text field of the salient type, where the text field of the salient type is an identification field and can clearly or uniquely identify an environment. Alternatively, the terminal may be configured to complete the execution logic. Accuracy of the initial pose determined based on the text field of the salient type is higher.

According to a third aspect, an embodiment of the present disclosure provides a method for determining a pose, where the method includes:

obtaining, by a terminal, a query image at a first location, where a scene at the first location includes a scene in the query image;

sending the query image to a server, so that the server determines N text fields included in the query image and determines an initial pose of the terminal at the first location based on the N text fields and the query image, where N is greater than or equal to 1; and receiving the initial pose that is of the terminal at the first location and is returned by the server.

In an embodiment, the method further includes:
obtaining location information of the terminal; and
sending the location information to the server; and
the determining an initial pose of the terminal at the first location based on the N text fields and the query image includes:
determining the initial pose of the terminal at the first location based on the N text fields, the query image, and the location information.

In an embodiment, after the receiving the initial pose returned by the server, the method further includes:
obtaining a pose change of the terminal; and
determining a real-time pose based on the initial pose and the pose change of the terminal.

In an embodiment, after the receiving the initial pose returned by the server, the method further includes:
obtaining a preview stream of a current scene;
determining, based on the real-time pose, preset media content included in a digital map corresponding to the scene in the preview stream; and
rendering the media content in the preview stream.

According to a fourth aspect, an embodiment of the present disclosure provides a method for determining a pose, where the method includes:
receiving a query image sent by a terminal, where the query image is obtained based on an image captured by the terminal at a first location, and a scene at the first location includes a scene in the query image;
determining N text fields included in the query image, where N is greater than or equal to 1;
determining a candidate reference image based on a prestored correspondence between a reference image and a text field and based on the N text fields;
determining an initial pose of the terminal at the first location based on the query image and the candidate reference image; and
sending the initial pose to the terminal.

In an embodiment, the determining an initial pose of the terminal at the first location based on the query image and the candidate reference image includes:
determining a target reference image in the candidate reference image, where the scene at the first location includes a scene in the target reference image; and
determining the initial pose of the terminal at the first location based on the query image and the target reference image.

In an embodiment, the determining the initial pose of the terminal at the first location based on the query image and the target reference image includes:
determining a 2D-2D correspondence between the query image and the target reference image; and
determining the initial pose of the terminal at the first location based on the 2D-2D correspondence and a preset 2D-3D correspondence of the target reference image.

In an embodiment, the method further includes:
determining a target text region image included in the query image;
obtaining a text region image included in the target reference image; and
determining a 2D-2D correspondence between the target text region image and the text region image included in the target reference image.

In an embodiment, the determining a target reference image in the candidate reference image includes:
determining an image similarity between each candidate reference image and the query image; and
determining a candidate reference image whose image similarity is greater than or equal to a preset similarity threshold as the target reference image.

In an embodiment, the determining a target reference image in the candidate reference image includes:
obtaining a global image feature of each candidate reference image;
determining a global image feature of the query image;
determining a distance between the global image feature of each candidate reference image and the global image feature of the query image; and
determining a candidate reference image whose distance is less than or equal to a preset distance threshold as the target reference image.

In an embodiment, the determining a target reference image in the candidate reference image includes:
receiving location information sent by the terminal;
obtaining a shooting location corresponding to each candidate reference image; and
determining, in each candidate reference image, a target reference image whose shooting location matches the location information.

In an embodiment, when N is greater than 1, the determining a target reference image in the candidate reference image includes:
determining, in each candidate reference image, a target reference image including the N text fields.

In an embodiment, the determining a target reference image in the candidate reference image includes:
when there is only one candidate reference image, determining the candidate reference image as the target reference image.

In an embodiment, the determining a candidate reference image based on a prestored correspondence between a reference image and a text field and based on the N text fields includes:
inputting the N text fields included in the query image into a pre-trained text classifier to obtain a text type of each text field included in the query image;
determining a text field whose text type is a preset salient type; and
searching, based on the prestored correspondence between a reference image and a text field, for a candidate reference image corresponding to the text field of the salient type.

According to a fifth aspect, an embodiment of the present disclosure provides an apparatus for determining a pose, where the apparatus includes at least one module, and the at least one module is configured to implement the method for determining a pose according to the first aspect.

According to a sixth aspect, an embodiment of the present disclosure provides an apparatus for determining a pose, where the apparatus includes at least one module, and the at least one module is configured to implement the method for determining a pose according to the second aspect.

According to a seventh aspect, an embodiment of the present disclosure provides an apparatus for determining a pose, where the apparatus includes at least one module, and the at least one module is configured to implement the method for determining a pose according to the third aspect.

According to an eighth aspect, an embodiment of the present disclosure provides an apparatus for determining a pose, where the apparatus includes at least one module, and the at least one module is configured to implement the method for determining a pose according to the fourth aspect.

According to a ninth aspect, an embodiment of the present disclosure provides a terminal, where the terminal includes a processor, a memory, a transceiver, a camera, and a bus. The processor, the memory, the transceiver, and the camera are connected by using the bus; the camera is configured to shoot an image; the transceiver is configured to receive and send data; the memory is configured to store a computer program; the processor is configured to control the memory, the transceiver, and the camera; the processor is configured to execute instructions stored in the memory; and the processor implements, by executing the instructions, the method for determining a pose according to the first or third aspect.

According to a tenth aspect, an embodiment of the present disclosure provides a server, where the server includes a processor, a memory, a transceiver, and a bus. The processor, the memory, and the transceiver are connected by using the bus; the transceiver is configured to receive and send data; the processor is configured to execute instructions stored in the memory; and the processor implements, by executing the instructions, the method for determining a pose according to the second or fourth aspect.

According to an eleventh aspect, an embodiment of the present disclosure provides a system for determining a pose, where the system may include a terminal and a server, where the terminal may implement the method according to the first aspect, and the server may implement the method according to the second aspect.

According to a twelfth aspect, an embodiment of the present disclosure provides a system for determining a pose, where the system may include a terminal and a server, where the terminal may implement the method according to the third aspect, and the server may implement the method according to the fourth aspect.

According to a thirteenth aspect, an embodiment of the present disclosure provides a computer-readable storage medium including instructions. When the computer-readable storage medium is run on a terminal, the terminal is enabled to perform the method according to the first aspect or the third aspect.

According to a fourteenth aspect, an embodiment of the present disclosure provides a computer program product including instructions. When the computer program product is run on a terminal, the terminal is enabled to perform the method according to the first aspect or the third aspect.

According to a fifteenth aspect, an embodiment of the present disclosure provides a computer-readable storage medium including instructions. When the computer-readable storage medium is run on a server, the server is enabled to perform the method according to the second aspect or the fourth aspect.

According to a sixteenth aspect, an embodiment of the present disclosure provides a computer program product including instructions. When the computer program product runs on a server, the server is enabled to perform the method according to the second aspect or the fourth aspect.

According to a seventeenth aspect, an embodiment of the present disclosure provides a method for determining a pose, where the method includes:
obtaining pre-captured reference images;
determining a text field included in each reference image; and
storing a correspondence between the text field and each reference image.

In an embodiment, the determining a text field included in each reference image includes:
for each reference image, determining, by performing text detection processing on the reference image, a text region image included in the reference image; and determining a text field included in the text region image.

In an embodiment, the method further includes:
determining a 2D-3D correspondence of each text region image based on 2D points of the text region image included in each reference image and a pre-obtained 2D-3D correspondence of each reference image; and storing the 2D-3D correspondence of each text region image.

The technical solutions provided in the embodiments of the present disclosure may include the following beneficial effects.

According to the embodiments of the present disclosure, even if a plurality of similar environments exist at different positions in target venues, and there are a plurality of similar images among different images shot at different positions in the venues, a candidate reference image that matches the query image can be queried based on a text field included in the query image and text fields included in different reference images. Even if there is interference from the plurality of similar images, accuracy of the candidate reference image found based on the text field is high, and the initial pose of the terminal obtained by performing pose calculation processing based on the candidate reference image with higher accuracy is more accurate.

It should be understood that the foregoing general descriptions and the following detailed descriptions are merely illustrative and explanative, and are not intended to limit the present disclosure.

BRIEF DESCRIPTION OF DRAWINGS

The accompanying drawings herein are incorporated in the specification, become a part of the specification, show embodiments that are in accordance with the present disclosure, and are used with the specification to explain principles of the present disclosure. In the accompanying drawings.

The foregoing accompanying drawings show specific embodiments of the present disclosure, and more detailed descriptions are provided in the following. The accompanying drawings and text descriptions are not intended to limit the scope of the idea of the present disclosure in any manner, but are intended to describe the concept of the present disclosure to a person skilled in the art with reference to particular embodiments.

DESCRIPTION OF EMBODIMENTS

Example embodiments are described in detail herein, and examples thereof are shown in accompanying drawings. When the following description relates to the accompanying drawings, unless otherwise specified, same numbers in different accompanying drawings represent same or similar elements. Implementations described in the following example embodiments do not represent all implementations consistent with the present disclosure. On the contrary, they are only examples of apparatuses and methods that are described in the appended claims in detail and that are consistent with some aspects of the present disclosure.

Terms such as "initial", "first", "second", "$N^{th}$", "target", and "candidate" used in the following embodiments are only used to distinguish between different nouns, and the foregoing terms or similar terms shall not constitute any limitation on the embodiments of the present disclosure. The terms "first" and "second" or similar terms are only used to distinguish between different nouns and shall not constitute a sequence limitation.

Figure 1:
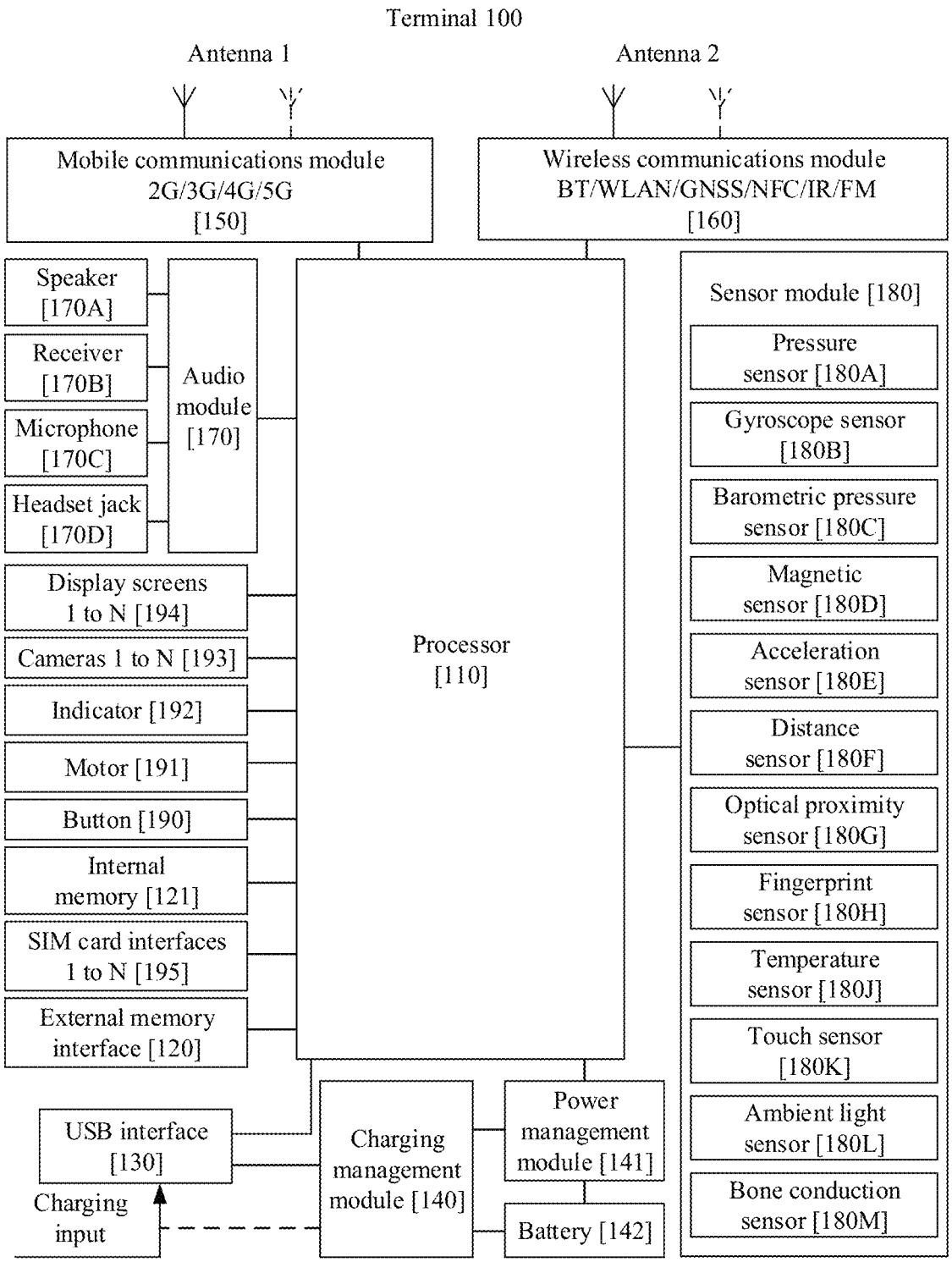
FIG. 1 is a schematic diagram of a structure of a terminal according to an example embodiment.

FIG. 1 is a schematic diagram of a structure of a terminal 100.

The terminal 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of the present disclosure does not constitute a specific limitation on the terminal 100. In some other embodiments of this application, the terminal 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural network processing unit (NPU). Different processing units may be independent components, or may be integrated into one or more processors.

The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory, to avoid repeated access and reduce waiting time of the processor 110, thereby improving system efficiency.

In some embodiments, the processor 110 may include one or more interfaces. The interfaces may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the terminal 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be configured to: perform audio communication, and sample, quantize, and encode an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through the Bluetooth headset.

The MIPI interface may be configured to connect the processor 110 to a peripheral component such as the display 194 or the camera 193. The MIPI interface includes a camera serial interface (CSI), a display serial interface (DSI), or the like. In some embodiments, the processor 110 and the camera 193 communicate through the CSI interface, to implement a photographing function of the terminal 100. The processor 110 and the display 194 communicate through the DSI interface, to implement a display function of the terminal 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, or the like. The GPIO interface may be further configured as the I2C interface, the I2S interface, the UART interface, the MIPI interface, or the like.

The USB interface 130 is an interface that conforms to a USB standard specification, and may be specifically a mini USB interface, a micro USB interface, a USB Type C interface, or the like. The USB interface 130 may be configured to connect to a charger to charge the terminal 100, and may also be used for data transmission between the terminal 100 and a peripheral device. The USB interface 130 may also be configured to connect to a headset to play audio through the headset. Alternatively, the interface may be used to connect to another electronic device, for example, an AR device.

It can be understood that an interface connection relationship between the modules shown in this embodiment of the present disclosure is merely an example for description, and does not constitute a limitation on the structure of the terminal 100. In some other embodiments of this application, the terminal 100 may alternatively use an interface connection manner different from that in this embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input of the wired charger through the USB interface 130. In some embodiments of wireless charging, the charging management module 140 may receive a wireless charging input by using a wireless charging coil of the terminal 100. The charging management module 140 may further supply power to the electronic device by using the power management module 141 while charging the battery 142.

The power management module 141 is configured to connect to the battery 142, the charging management module 140, and the processor 110. The power management module 141 receives an input of the battery 142 and/or an input of the charging management module 140, and supplies power to the processor 110, the internal memory 121, the display 194, the camera 193, the wireless communications module 160, and the like. The power management module 141 may be further configured to monitor parameters such as a battery capacity, a quantity of battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the terminal 100 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a wireless communication solution applicable to the terminal 100, for example, 2G, 3G, 4G, 5G, and the like. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transfer a processed electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules in the mobile communications module 150 and at least some modules in the processor 110 may be disposed in a same device.

The modem processor may include a modulator and a demodulator. The modulator is configured to modulate a to-be-sent low-frequency baseband signal into a medium- and high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers a processed signal to the application processor. The application processor outputs a sound signal through an audio device (which is not limited to the speaker 170A, the receiver 170B, or the like), or displays an image or a video through the display 194. In some embodiments, the modem processor may be an independent device. In some other embodiments, the modem processor may be independent of the processor 110, and is disposed in the same device as the mobile communications module 150 or another functional module.

The wireless communications module 160 may provide a wireless communication solution applicable to the terminal 100, for example, a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communications module 160 may be one or more components that integrate at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the terminal 100, the antenna 1 is coupled to the mobile communications module 150, and the antenna 2 is coupled to the wireless communications module 160, so that the terminal 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal 100 implements a display function through the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flex light-emitting diode (FLED), a mini LED, a micro LED, a micro-OLED, quantum dot light emitting diodes (QLED), or the like. In some embodiments, the terminal 100 may include one or N displays 194, where N is a positive integer greater than 1.

The terminal 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal, and may process another digital signal in addition to the digital image signal. For example, when the terminal 100 selects a frequency, the digital signal processor is configured to perform Fourier transform and the like on frequency energy.

The video codec is configured to compress or decompress a digital video. The terminal 100 may support one or more video codecs. Therefore, the terminal 100 may play or record videos in a plurality of coding formats, for example, moving picture experts group (MPEG)1, MPEG2, MPEG3, and MPEG4.

The NPU is a neural network (NN) computing processor that rapidly processes input information by referring to a structure of a biological neural network, for example, by referring to a transfer mode between human brain neurons, and can further perform self-learning continuously. The NPU can implement applications such as intelligent cognition of the terminal 100, such as image recognition, facial recognition, speech recognition, and text understanding.

The external memory interface 120 may be configured to connect to an external memory card, for example, a micro SD card, to expand a storage capability of the terminal 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and a phone book) and the like created when the terminal 100 is used. In addition, the internal memory 121 may include a high-speed random access memory, and may further include a nonvolatile memory, for example, at least one magnetic disk storage device, a flash memory, and a universal flash storage (UFS). The processor 110 runs the instructions stored in the internal memory 121 and/or the instructions stored in the memory disposed in the processor, to perform various function applications of the terminal 100 and data processing.

The terminal 100 may implement audio functions such as music playing and recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert an input analog audio into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "horn", is configured to convert an audio electrical signal into a sound signal. The terminal 100 may be used to listen to music or answer a call in a hands-free mode over the speaker 170A.

The receiver 170B, also referred to as an "earpiece", is configured to convert an audio electrical signal into a sound signal. When a call is answered or a voice message is listened to by using the terminal 100, the receiver 170B may be put close to a human ear to listen to a voice.

The microphone 170C, also referred to as a "mike" or a "mic", is configured to convert a sound signal into an electrical signal. When making a call or sending voice information, a user may make a sound by moving a human mouth close to the microphone 170C to input a sound signal to the microphone 170C. At least one microphone 170C may be disposed in the terminal 100. In some other embodiments, two microphones 170C may be disposed in the terminal 100, to collect a sound signal and implement a noise reduction function. In some other embodiments, three, four, or more microphones 170C may alternatively be disposed in the terminal 100, to collect a sound signal, implement noise reduction, and identify a sound source, so as to implement a directional recording function and the like.

The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The pressure sensor 180A is configured to sense a pressure signal, and convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 100 determines pressure intensity based on a capacitance change. When a touch operation is performed on the display 194, the terminal 100 detects intensity of the touch operation by using the pressure sensor 180A. The terminal 100 may also calculate a touch position based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an application icon "Messages", an instruction for viewing an SMS message is executed. When a touch operation whose touch operation intensity is greater than or equal to the first pressure threshold is performed on the application icon "Messages", an instruction for creating an SMS message is executed.

The gyro sensor 180B may be configured to determine a motion posture of the terminal 100. In some embodiments, an angular velocity of the terminal 100 around three axes (namely, x, y, and z axes) may be determined by using the gyro sensor 180B. The gyroscope sensor 180B may be configured to implement image stabilization during shooting. For example, when a shutter is pressed, the gyro sensor 180B detects a shaking angle of the terminal 100, calculates, based on the angle, a distance that a lens module needs to compensate, and allows the lens to cancel shaking of the terminal 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the terminal 100 calculates an altitude based on a barometric pressure value obtained through measurement by the barometric pressure sensor 180C, to assist in positioning and navigation.

The magnetic sensor 180D includes a Hall effect sensor. The terminal 100 may detect opening and closing of a flip carrying case by using the magnetic sensor 180D. In some embodiments, when the terminal 100 is a flip phone, the terminal 100 may detect opening and closing of a flip cover by using the magnetic sensor 180D. Further, a feature such as automatic unlocking upon opening of the flip cover is set based on a detected opening or closing state of the leather case or a detected opening or closing state of the flip cover.

The acceleration sensor 180E may detect magnitude of accelerations in various directions (usually on three axes) of the terminal 100. When the terminal 100 is still, a value and a direction of gravity may be detected. The acceleration sensor 180E may be further configured to recognize a posture of the electronic device, and is used in screen switching between a landscape mode and a portrait mode, a pedometer, or another application.

The distance sensor 180F is configured to measure a distance. The terminal 100 may measure a distance by using infrared or laser. In some embodiments, in a photographing scenario, the terminal 100 may measure a distance by using the distance sensor 180F, to implement fast focusing.

The optical proximity sensor 180G may include, for example, a light-emitting diode (LED) and an optical detector such as a photodiode. The light-emitting diode may be an infrared light-emitting diode. The terminal 100 emits infrared light by using the light emitting diode. The terminal 100 uses the photodiode to detect reflected infrared light from a nearby object. When sufficient reflected light is detected, it may be determined that there is an object near the terminal 100. When insufficient reflected light is detected, the terminal 100 may determine that there is no object near the terminal 100. The terminal 100 may detect, by using the optical proximity sensor 180G, that the user holds the terminal 100 close to an ear to make or answer a call, and therefore automatically turn off the screen to save power. The optical proximity sensor 180G may also be used in a leather case mode or a pocket mode to automatically unlock or lock the screen.

The ambient light sensor 180L is configured to sense ambient light brightness. The terminal 100 may adaptively adjust brightness of the display 194 based on the sensed ambient light intensity. The ambient light sensor 180L may also be configured to automatically adjust a white balance during photographing. The ambient light sensor 180L may further work with the optical proximity sensor 180G in detecting whether the terminal 100 is in a pocket, to prevent an accidental touch.

The fingerprint sensor 180H is configured to collect a fingerprint. The terminal 100 may use a collected fingerprint feature to implement fingerprint unlock, application access lock, fingerprint photographing, fingerprint call answering, and the like.

The temperature sensor 180J is configured to detect a temperature. In some embodiments, the terminal 100 executes a temperature processing policy based on a temperature detected by the temperature sensor 180J. For example, when a temperature reported by the temperature sensor 180J exceeds a threshold, the terminal 100 lowers performance of a processor close to the temperature sensor 180J, to reduce power consumption and implement thermal protection. In some other embodiments, when a temperature is less than another threshold, the terminal 100 heats the battery 142 to prevent abnormal shutdown of the terminal 100 caused by the low temperature. In some other embodiments, when a temperature is less than still another threshold, the terminal 100 boosts an output voltage of the battery 142 to prevent abnormal shutdown caused by the low temperature.

The touch sensor 180K is also referred to as a "touch control device". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. Visual output related to the touch operation may be provided on the display 194. In some other embodiments, the touch sensor 180K may be alternatively disposed on a surface of the terminal 100, in a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 100 may receive a key input, and generate a key signal input related to user setting and function control of the terminal 100.

The motor 191 may generate a vibration prompt. The motor 191 may be configured to provide an incoming call vibration prompt and a touch vibration feedback. For example, touch operations performed on different applications (for example, shooting and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the terminal 100. The terminal 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external storage card. The terminal 100 interacts with a network by using the SIM card, to implement functions such as conversation and data communication. In some embodiments, the terminal 100 uses an eSIM, namely, an embedded SIM card. The eSIM card may be embedded into the terminal 100, and cannot be separated from the terminal 100.

A software system of the terminal 100 may use a layered architecture, an event-driven architecture, a microkernel architecture, a micro service architecture, or a cloud architecture. In an embodiment of the present disclosure, an Android system with a layered architecture is used as an example to describe a software structure of the terminal 100.

Figure 2:
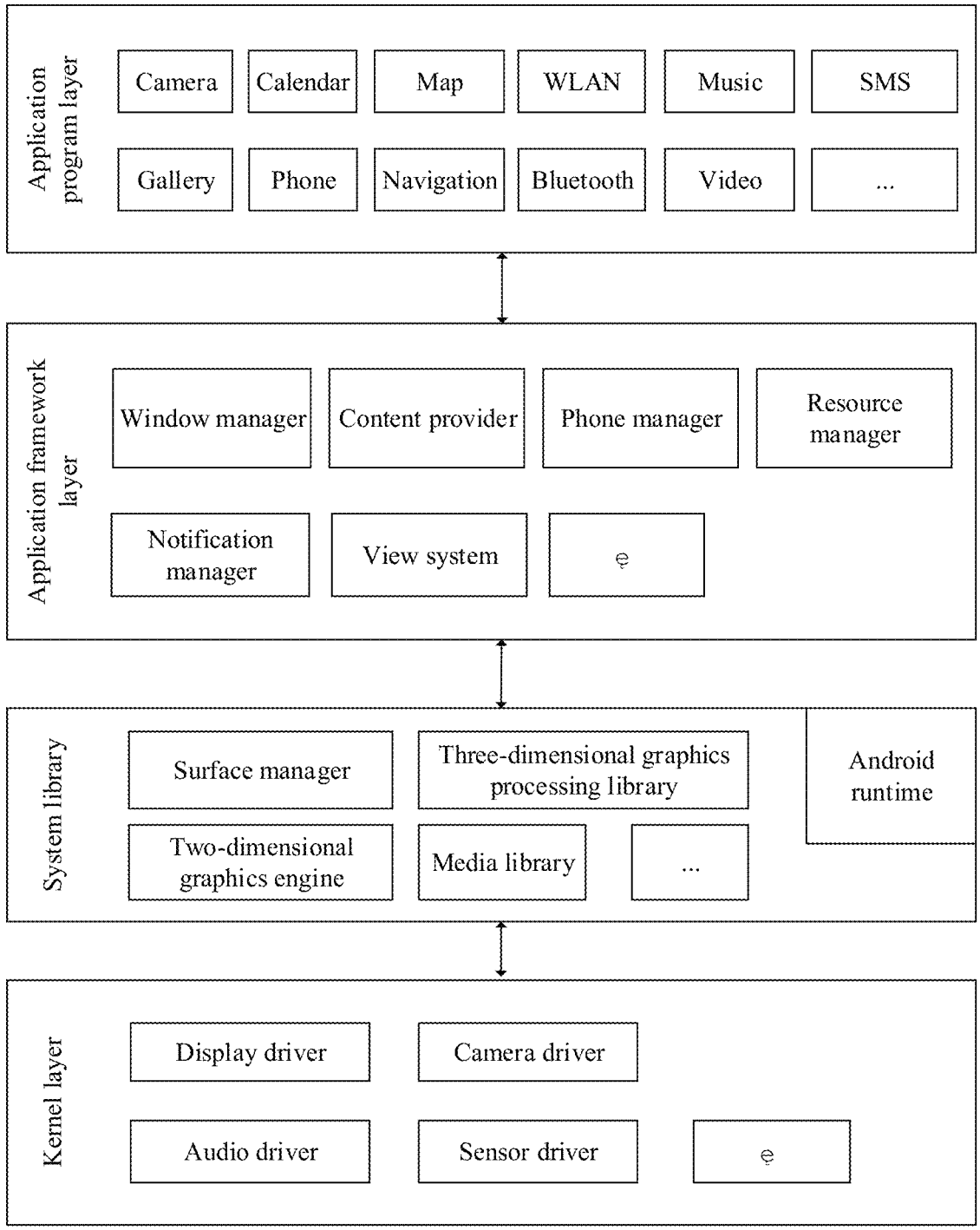
FIG. 2 is a schematic diagram of a structure of an application framework according to an example embodiment.

FIG. 2 is a block diagram of a software structure of the terminal 100 according to the embodiment of the present disclosure.

In a layered architecture, software is divided into several layers, and each layer has a clear role and task. The layers communicate with each other through a software interface. In some embodiments, an Android system is divided into four layers: an application layer, an application framework layer, an Android runtime and system library, and a kernel layer from top to bottom.

The application layer may include a series of application packages.

As shown in FIG. 2, the application package may include applications such as "camera", "gallery", "calendar", "phone", "maps", "navigation", "WLAN", "Bluetooth", "music", "videos", and "messages".

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a message notification icon may include a text display view and a picture display view.

The phone manager is configured to provide a communication function of the terminal 100, for example, management of a call status (including answering or declining a call).

The resource manager provides various resources for an application, such as a localized character string, an icon, a picture, a layout file, and a video file.

The notification manager enables an application to display notification information in a status bar, and may be configured to convey a notification type message, where the displayed notification information may automatically disappear after a short pause and require no user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an alert sound is played, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats, MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working procedure of software and hardware of the terminal 100 in a capture photographing scenario.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. An example in which the touch operation is a touch/tap operation and a control corresponding to the tap operation is a control of a camera application icon is used. A camera application invokes an interface of the application framework layer, so that the camera application is started. Then, a camera driver is started by invoking the kernel layer, and a static image or a video is captured by using the camera 193.

A method for determining a pose according to an embodiment of the present disclosure may be implemented based on components disposed in the terminal 100. For example, the terminal may implement communication with a server by using components such as the antenna 1, the antenna 2, the mobile communications module 150, and the wireless communications module 160, for example, transmit a query image and N text fields, and receive an initial pose returned by the server. The audio module 170, the speaker 170A, and the headset jack 170D may play some prompt information by voice to the user. The display 194 may display some prompt information to the user. The camera 193 may shoot the query image, an environmental image, an initial image, and the like. The gyroscope sensor 180B may assist in determining a motion posture of the terminal or the like. A function of determining the initial pose of the terminal 100 may be implemented by using the component disposed in the terminal 100 and a method provided in an embodiment of the present disclosure. The foregoing is merely an example, but is not limited.

Another example embodiment of the present disclosure provides a server 300.

Figure 3:
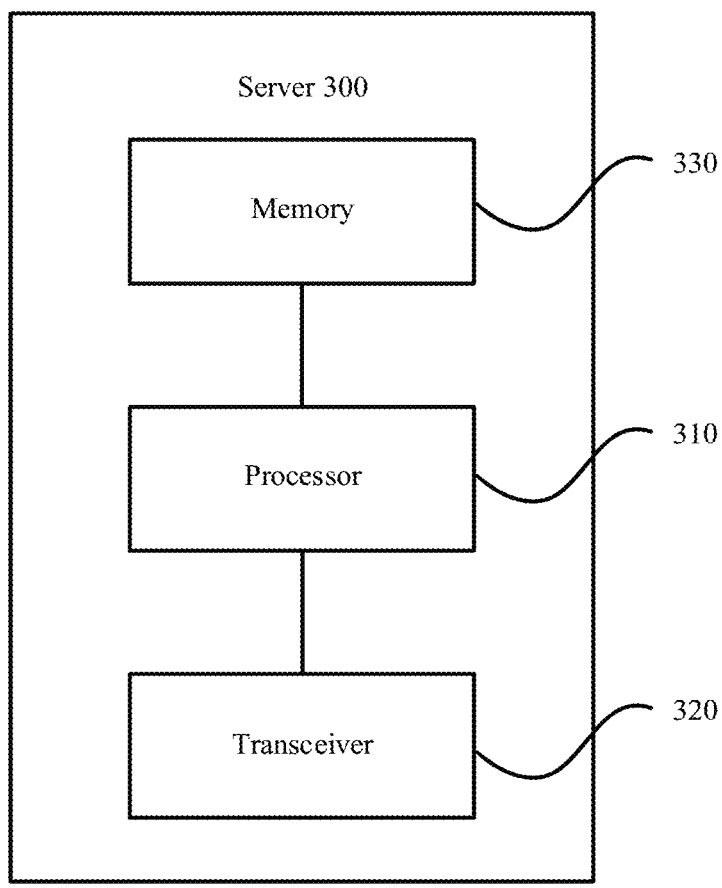
FIG. 3 is a schematic diagram of a structure of a server according to an example embodiment.

The server 300 may include a processor 310 and a transceiver 320. The transceiver 320 may be connected to the processor 310, as shown in FIG. 3. The transceiver 320 may include a receiver and a transmitter, and may be configured to receive or send a message or data. The transceiver 320 may be a network adapter. The server 300 may further include an acceleration component (which may be referred to as an accelerator). When the acceleration component is a network acceleration component, the acceleration component may be a network interface card. The processor 310 may be a control center of the server 300, and be connected to all parts, such as the transceiver 320, of the entire server 300 by using various interfaces and cables. In the present disclosure, the processor 310 may be a central processing unit (CPU). In an embodiment, the processor 310 may include one or more processing units. The processor 310 may alternatively be a digital signal processor, an application-specific integrated circuit, a field-programmable gate array, another programmable logic device, or the like. The server 300 may further include a memory 330. The memory 330 may be configured to store a software program and a module, and the processor 310 performs various function applications and data processing of the server 300 by reading software code and the module stored in the memory 330.

Figure 4:
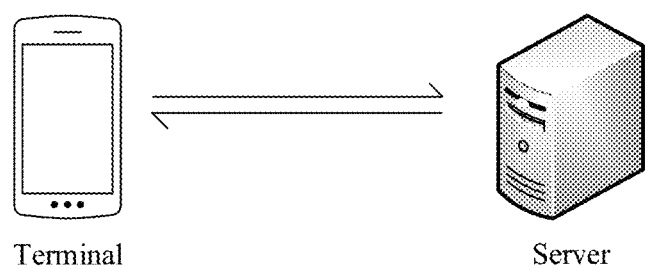
FIG. 4 is a schematic diagram of a structure of a system for determining a pose according to an example embodiment.

An example embodiment of the present disclosure provides a system for determining a pose. As shown in FIG. 4, the system may include a terminal and a server. The terminal may be a mobile terminal, a man-machine interaction device, or an in-vehicle visual perception device, such as a mobile phone, a sweeper, an intelligent robot, a self-driving car, an intelligent monitor, or an augmented reality (AR) wearable device. Correspondingly, a method provided in an embodiment of the present disclosure may be applied to application fields such as man-machine interaction, in-vehicle visual perception, augmented reality, intelligent monitoring, self driving, and garage car search.

In a process of moving the terminal, a camera in the terminal may capture a video stream of a target venue in real time, and the terminal may further extract a query image from the video stream. The query image may be considered as a video frame in the video stream, or may be considered as a text region image extracted from a video frame, or the like. The terminal may send the query image to the server, and the server determines an initial pose of the terminal based on the query image. Subsequently, the server may further send the determined initial pose to the terminal, and the terminal may determine, based on the received initial pose, a location and a posture of the terminal in the target venue, and perform processing such as navigation, route planning, and obstacle avoidance.

A process of determining the initial pose of the terminal may be considered as an online positioning process. Before online positioning is performed, offline calibration may be performed first. An environmental image shot at each position in the target venue may be captured through an offline calibration process, and a three-dimensional (3D) point cloud of the target venue is established based on the captured environmental image. The 3D point cloud includes three-dimensional location information of a physical point that is in actual space and corresponding to each pixel in each environmental image.

Figure 5:
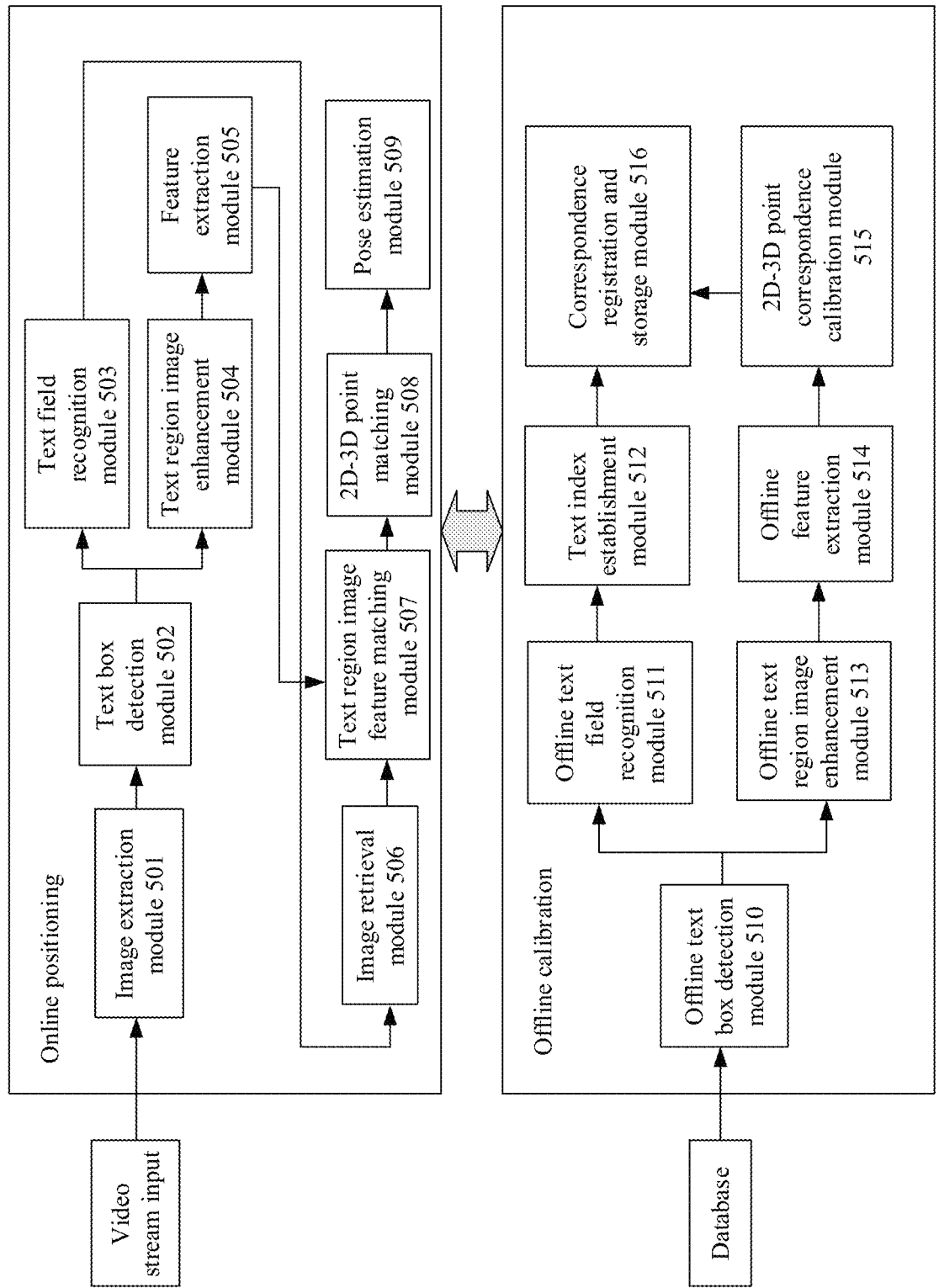
FIG. 5 is a schematic diagram of a structure of a system for determining a pose according to an example embodiment.

As shown in FIG. 5, modules used in the online positioning process include an image extraction module 501, a text box detection module 502, a text field recognition module 503, a text region image enhancement module 504, a feature extraction module 505, an image retrieval module 506, a text region image feature matching module 507, a 2D-3D point matching module 508, and a pose estimation module 509. Modules used in the offline calibration process include an offline text box detection module 510, an offline text field recognition module 511, a text index establishment module 512, an offline text region image enhancement module 513, an offline feature extraction module 514, a 2D-3D point correspondence calibration module 515, and a correspondence registration and storage module 516. Modules used in the online positioning process or the offline calibration process may be increased or reduced according to an actual requirement. Functions of the foregoing modules are different. A subsequently described method for determining a pose may be implemented in the foregoing modules.

In a processing procedure of the method described in the following embodiment of the present disclosure, a sequence of processing operations is not limited. The sequence of the operations may be freely changed, or the operations may be performed in parallel, without violating laws of nature. Operations of different embodiments may also be freely combined without violating the laws of nature.

Figure 6:
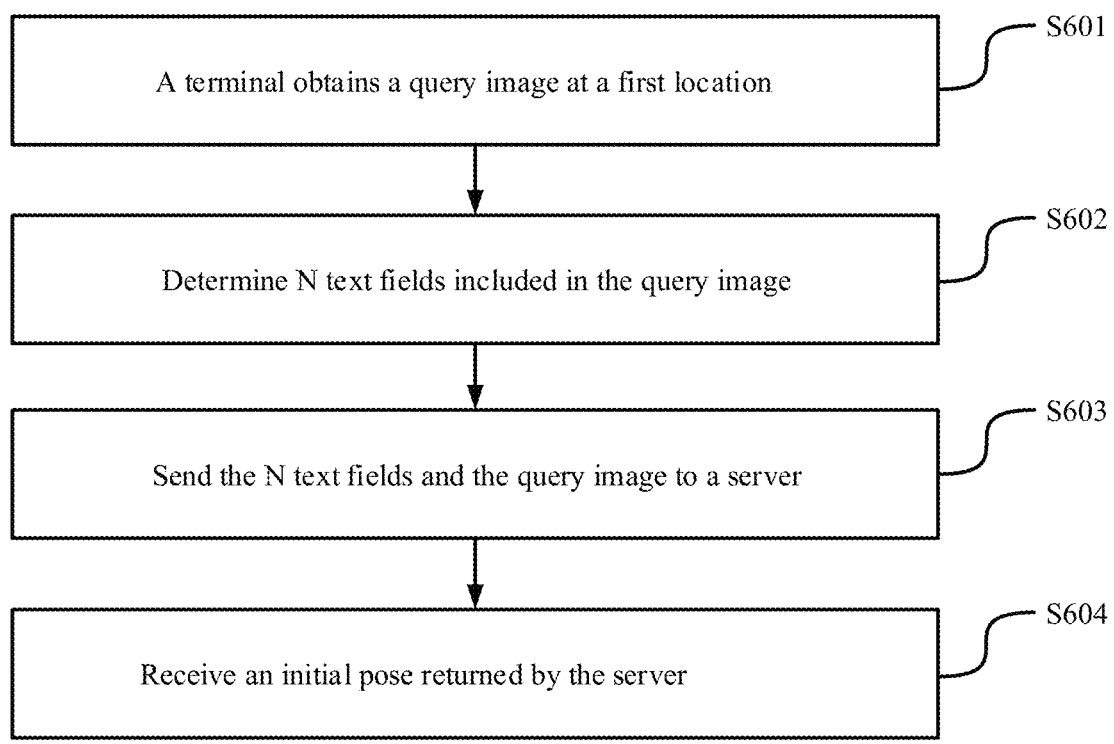
FIG. 6 is a schematic flowchart of a method for determining a pose according to an example embodiment.

An example embodiment of the present disclosure provides a method for determining a pose. The method may be applied to a terminal. As shown in FIG. 6, a processing procedure of the method may include the following operations.

Operation S601: A terminal obtains a query image at a first location.

The query image has a text. A scene at the first location includes a scene in the query image.

Operation S602: Determine N text fields included in the query image.

N is greater than or equal to 1.

Operation S603: Send the N text fields and the query image to a server, so that the server determines an initial pose of the terminal at the first location based on the N text fields and the query image.

Operation S604: Receive the initial pose returned by the server.

In an embodiment, the operation of obtaining the query image at the first location by the terminal may include: shooting a first initial image; when the first initial image has no text, displaying first prompt information or playing first prompt information by voice, where the first prompt information is used to indicate that no text is detected in the first initial image, and prompt a user to move a location of the terminal or adjust a shooting angle of the terminal; and when the terminal shoots, at the first location, a second initial image having a text, determining the second initial image as the query image.

In an embodiment, the operation of obtaining the query image at the first location by the terminal may include: shooting a third initial image; determining, by performing text detection processing on the third initial image, a text region image included in the third initial image; when the text region image included in the third initial image does not meet a preferred image condition, displaying second prompt information or playing second prompt information by voice, where the second prompt information is used to indicate that the text region image included in the third initial image does not meet the preferred image condition, and prompt a user to move the terminal in a direction of a real text; and when the terminal shoots, at the first location, a fourth initial image including a text region image that meets the preferred image condition, determining the fourth initial image as the query image.

The preferred image condition includes one or more of the following conditions:
- a size of the text region image is greater than or equal to a size threshold;
- definition of the text region image is higher than or equal to a definition threshold; and
- texture complexity of the text region image is less than or equal to a complexity threshold.

In an embodiment, the operation of obtaining the query image at the first location by the terminal may include:

shooting a fifth initial image; determining N text fields included in the fifth initial image; obtaining M text fields included in a reference image, where a time interval between a time at which the reference image is captured and a time at which the fifth initial image is captured is less than a duration threshold, and M is greater than or equal to 1; when any text field included in the fifth initial image is inconsistent with each of the M text fields, displaying third prompt information or playing third prompt information by voice, where the third prompt information is used to indicate that an incorrect text field is recognized in the fifth initial image, and prompt a user to move a location of the terminal or adjust a shooting angle of the terminal; and when the terminal shoots, at the first location, a sixth initial image including text fields that all belong to the M text fields, determining the sixth initial image as the query image.

In an embodiment, the operation of obtaining the query image may include: capturing a first image of a current scene, where the first image includes a text; performing text detection processing on the first image to obtain at least one text region image; and using the at least one text region image included in the first image as the query image.

In an embodiment, the method provided in this embodiment of the present disclosure may further include: determining a location region of the text region image in the query image; and sending the location region to the server; and that the server determines the initial pose of the terminal at the first location based on the N text fields and the query image includes: the server determines the initial pose of the terminal at the first location based on the location region of the text region image in the query image, the N text fields, and the query image.

In an embodiment, the method provided in this embodiment of the present disclosure may further include: obtaining location information of the terminal; and sending the location information to the server; and that the server determines the initial pose of the terminal based on the N text fields and the query image includes: the server determines the initial pose of the terminal based on the location information, the N text fields, and the query image.

In an embodiment, after receiving the initial pose returned by the server, the method provided in this embodiment of the present disclosure may further include: obtaining a pose change of the terminal; and determining a real-time pose based on the initial pose and the pose change of the terminal.

In an embodiment, after receiving the initial pose returned by the server, the method provided in this embodiment of the present disclosure may further include: obtaining a preview stream of the current scene; determining, based on the real-time pose, preset media content included in a digital map corresponding to the scene in the preview stream; and rendering the media content in the preview stream.

According to this embodiment of the present disclosure, even if a plurality of similar environments exist at different positions in target venues, and there are a plurality of similar images among different images shot at different positions in the venues, a candidate reference image that matches the query image can be queried based on a text field included in the query image and text fields included in different reference images. Even if there is interference from the plurality of similar images, accuracy of the candidate reference image found based on the text field is high, and the initial pose of the terminal obtained by performing pose calculation processing based on the candidate reference image with higher accuracy is more accurate.

Figure 7:
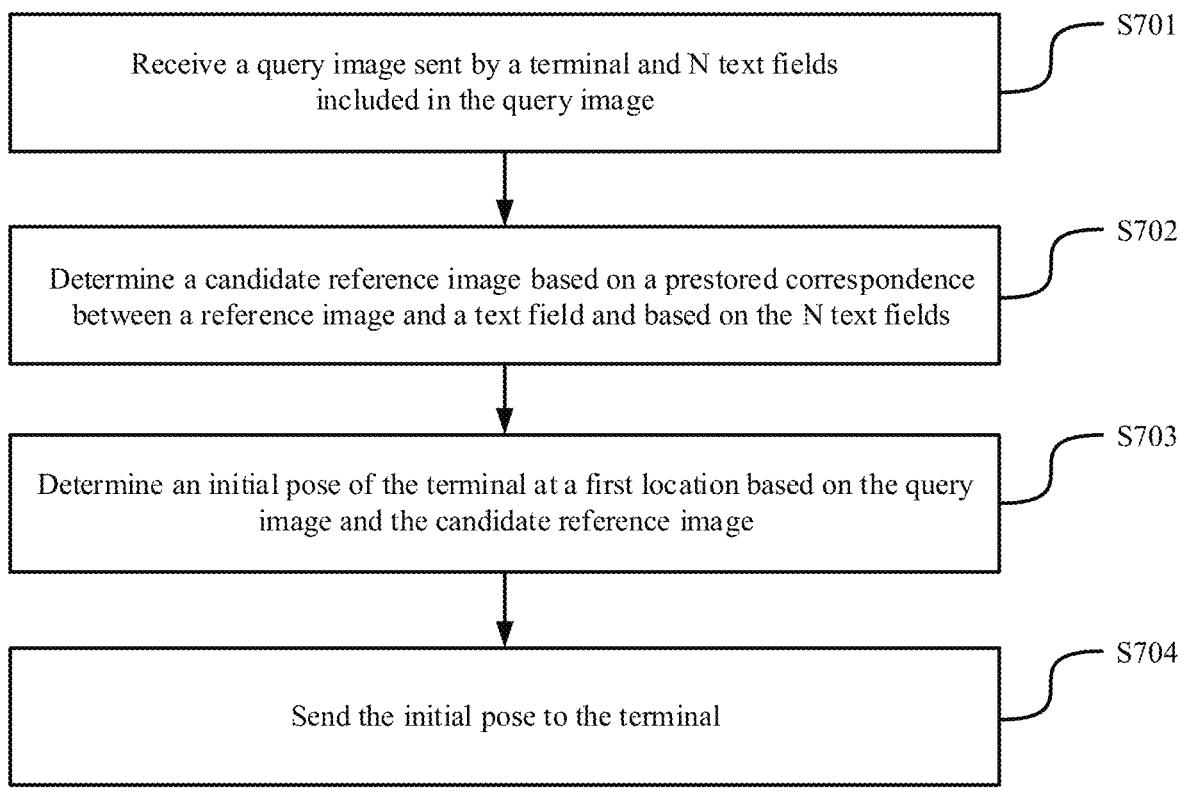
FIG. 7 is a schematic flowchart of a method for determining a pose according to an example embodiment.

An example embodiment of the present disclosure provides a method for determining a pose. The method may be applied to a server. As shown in FIG. 7, a processing procedure of the method may include the following operations.

Operation S701: Receive a query image sent by a terminal and N text fields included in the query image.

N is greater than or equal to 1. The query image is obtained based on an image captured by the terminal at a first location, and a scene at the first location includes a scene in the query image.

Operation S702: Determine a candidate reference image based on a prestored correspondence between a reference image and a text field and based on the N text fields.

Operation S703: Determine an initial pose of the terminal at the first location based on the query image and the candidate reference image.

Operation S704: Send the determined initial pose to the terminal.

In an embodiment, the operation of determining the initial pose of the terminal at the first location based on the query image and the candidate reference image may include: determining a target reference image in the candidate reference image, where the scene at the first location includes a scene in the target reference image; and determining the initial pose of the terminal at the first location based on the query image and the target reference image.

In an embodiment, the operation of determining the initial pose of the terminal at the first location based on the query image and the target reference image may include: determining a 2D-2D correspondence between the query image and the target reference image; and determining the initial pose of the terminal at the first location based on the 2D-2D correspondence and a preset 2D-3D correspondence of the target reference image.

In an embodiment, the method provided in this embodiment of the present disclosure may further include: receiving a location region of a text region image in the query image sent by the terminal; and the operation of determining the 2D-2D correspondence between the query image and the target reference image may include: determining, based on the location region, a target text region image included in the query image; obtaining a text region image included in the target reference image; and determining a 2D-2D correspondence between the target text region image and the text region image included in the target reference image.

In an embodiment, the operation of determining the target reference image in the candidate reference image may include: determining an image similarity between each candidate reference image and the query image; and determining a candidate reference image whose image similarity is greater than or equal to a preset similarity threshold as the target reference image.

In an embodiment, the operation of determining the target reference image in the candidate reference image may include: obtaining a global image feature of each candidate reference image; determining a global image feature of the query image; determining a distance between the global image feature of each candidate reference image and the global image feature of the query image; and determining a candidate reference image whose distance is less than or equal to a preset distance threshold as the target reference image.

In an embodiment, the operation of determining the target reference image in the candidate reference image may include: receiving location information sent by the terminal; obtaining a shooting location corresponding to each candidate reference image; and determining, in each candidate reference image, a target reference image whose shooting location matches the location information.

In an embodiment, when N is greater than 1, the operation of determining the target reference image in the candidate reference image may include: determining, in each candidate reference image, a target reference image including the N text fields.

In an embodiment, the operation of determining the target reference image in the candidate reference image may include: when there is only one candidate reference image, determining the candidate reference image as the target reference image.

In an embodiment, the operation of determining the candidate reference image based on the prestored correspondence between a reference image and a text field and based on the N text fields may include: inputting the N text fields included in the query image into a pre-trained text classifier to obtain a text type of each text field included in the query image; determining a text field whose text type is a preset salient type; and searching, based on the prestored correspondence between a reference image and a text field, for a candidate reference image corresponding to the text field of the salient type.

According to this embodiment of the present disclosure, even if a plurality of similar environments exist at different positions in target venues, and there are a plurality of similar images among different images shot at different positions in the venues, a candidate reference image that matches the query image can be queried based on a text field included in the query image and text fields included in different reference images. Even if there is interference from the plurality of similar images, accuracy of the candidate reference image found based on the text field is high, and the initial pose of the terminal obtained by performing pose calculation processing based on the candidate reference image with higher accuracy is more accurate.

Figure 8:
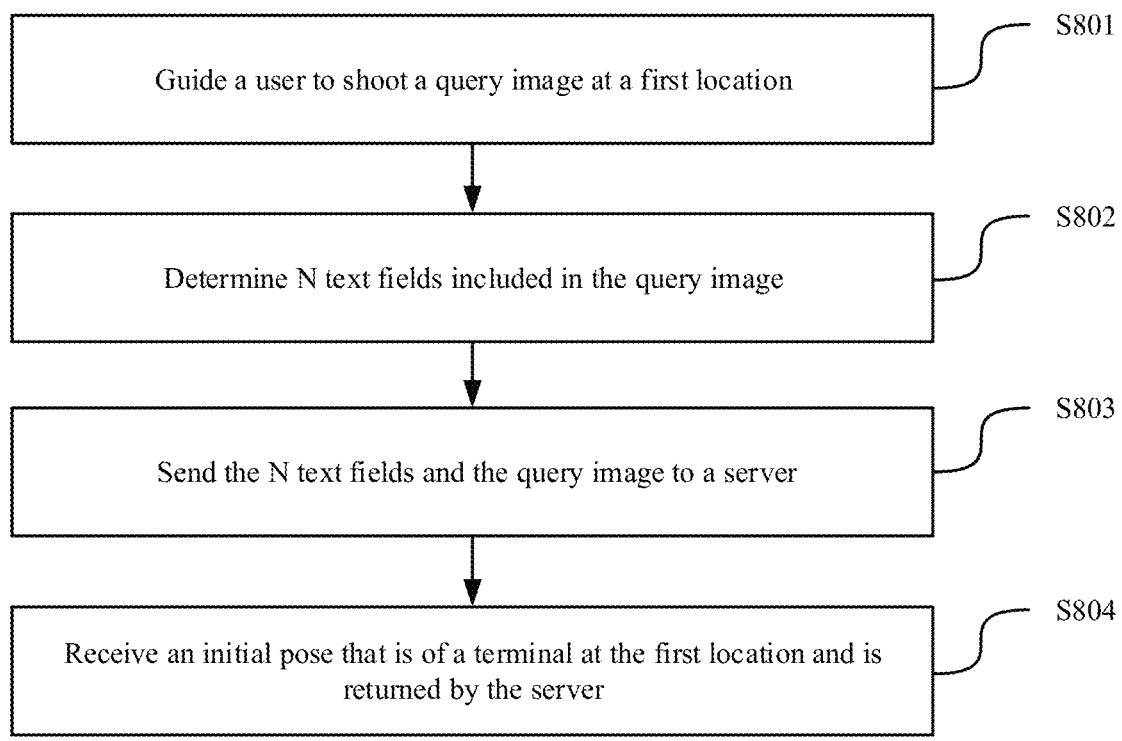
FIG. 8 is a schematic flowchart of a method for determining a pose according to an example embodiment.

An example embodiment of the present disclosure provides a method for determining a pose. The method may be applied to a terminal, and is implemented in cooperation with a server. As shown in FIG. 8, a processing procedure of the method may include the following operations.

Operation S801: Guide a user to shoot a query image at a first location.

A scene at the first location includes a scene in the query image.

In an implementation, the first location may include any geographical position or spatial position. The scene may be a scene or an environment in which a terminal device is used, for example, a room or a site. Alternatively, the scene may be an entirety or a part of a scene that can be captured by a camera of a terminal within a preset position range, and the scene may further include an environmental background, a physical object in the environment, and the like. A specific range and a size of the scene are freely defined according to an actual requirement, and are not limited in this embodiment of the present disclosure. The scene at the first location may be a specific scene around the first location, and may include a preset geographical range or a field of view. The query image may be an image captured by the terminal at the first location, a scene in the image is consistent with a physical scene, and the scene in the query image may be a part or an entirety of the scene at the first location. The first location is not limited to an accurate position, and an actual position is allowed to have an accuracy error.

If the query image is shot by the user by using the terminal, some means may be used to ensure image quality of the shot query image, and a user interface (UI) may be used to guide the user to perform shooting. This embodiment of the present disclosure provides three manners for guiding the user to shoot the query image.

In an embodiment, operation S801 may include: shooting a first initial image; when the first initial image has no text, displaying first prompt information or playing first prompt information by voice, where the first prompt information is used to indicate that no text is detected in the first initial image, and prompt the user to move a location of the terminal or adjust a shooting angle of the terminal; and when the terminal shoots, at the first location, a second initial image having a text, determining the second initial image as the query image.

Figure 9:
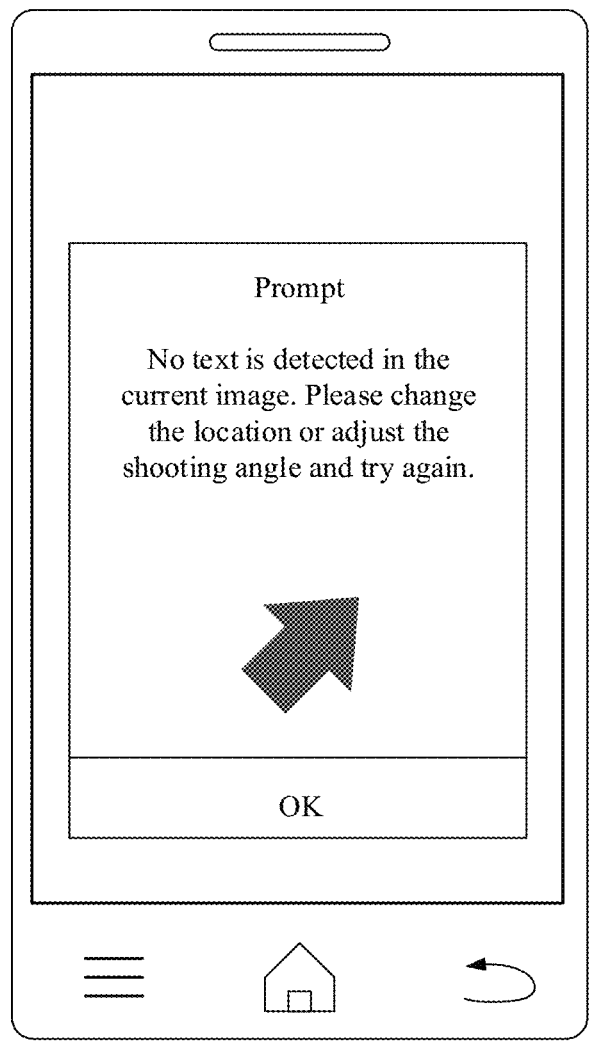
FIG. 9 is a schematic diagram of a user guidance interface according to an example embodiment.

In an implementation, when the user comes to a target venue, for example, a shopping mall, if the user comes to the shopping mall for the first time, and wants to view some description information of the shopping mall by using a mobile phone, the user may take out the mobile phone, stand at a second location, turn on a camera, and point the camera at an environment of the shopping mall for shooting. In this case, the terminal may obtain the first initial image, and may detect whether the first initial image has a text. When the first initial image has no text, as shown in FIG. 9, the terminal may display a prompt box or directly play the first prompt information by voice, for example, may display "No text is detected in the current image. Please change the location or adjust the shooting angle and try again." After receiving the prompt, the user moves the mobile phone to a location in which a real text is located. In the moving process, the terminal continuously shoots initial images until the user moves to the appropriate first location. Then the terminal detects the text in the second initial image, and may determine the second initial image as the query image, and send the query image to a server. In this case, the terminal may further display a prompt box to prompt the user that the text has been detected and that information query processing is being performed based on the shot image.

In an embodiment, operation S801 may include: shooting a third initial image; determining, by performing text detection processing on the third initial image, a text region image included in the third initial image; when the text region image included in the third initial image does not meet a preferred image condition, displaying second prompt information or playing second prompt information by voice, where the second prompt information is used to indicate that the text region image included in the third initial image does not meet the preferred image condition, and prompt the user to move the terminal in a direction of a real text; and when a fourth initial image including a text region image that meets the preferred image condition is shot at the first location, determining the fourth initial image as the query image.

The preferred image condition may include one or more of the following conditions: a size of the text region image is greater than or equal to a size threshold; definition of the text region image is higher than or equal to a definition threshold; and texture complexity of the text region image is less than or equal to a complexity threshold.

In an implementation, the terminal may detect the text region image in the third initial image, and determine a size of the text region image. If the size of the text region image is small, it indicates that the text region image may not be very clear, and further, the current image does not meet requirements. Alternatively, the terminal may directly determine the definition of the text region image. If the definition is lower than the definition threshold, it indicates that the text region image may not be very clear, and further, the current image does not meet requirements. The terminal may further determine the texture complexity of the text region image. If the texture complexity of the text region image is high, it indicates that there are a lot of texture features in the text region image, which may cause interference to subsequent recognition of a text field in the text region image, and further, the current image does not meet requirements. Another preferred image condition may be properly set according to an actual requirement on a basis of the preferred image condition provided in this embodiment of the present disclosure. When the text region image in the third initial image does not meet one or more of the preferred image conditions, an initial image is shot again.

Figure 10:
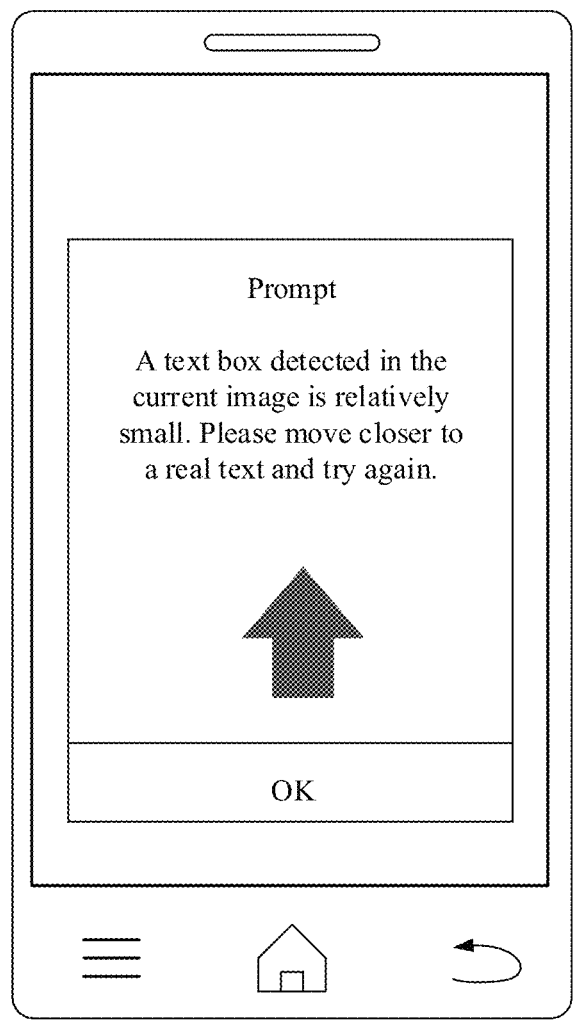
FIG. 10 is a schematic diagram of a user guidance interface according to an example embodiment.

In an actual application, when the user comes to a target venue, for example, a shopping mall, if the user comes to the shopping mall for the first time, and wants to view some description information of the shopping mall by using a mobile phone, the user may take out the mobile phone, stand at a second location, turn on a camera, and point the camera at an environment of the shopping mall for shooting. In this case, the terminal may obtain the third initial image, and may detect whether the text region image included in the third initial image meets the preferred image condition. When the size of the text region image included in the third initial image is less than the size threshold, as shown in FIG. 10, the terminal may display a prompt box or directly play the second prompt information by voice, for example, may display "A text box detected in the current image is small. Please move closer to a real text and try again." After receiving the prompt, the user moves the mobile phone to a location in which a real text is located. In the moving process, the terminal continuously shoots initial images until the user moves to the appropriate first location. Then the size of the text region image detected by the terminal in the fourth initial image is greater than the size threshold, and the fourth initial image may be determined as the query image and sent to the server. In this case, the terminal may further display a prompt box, to prompt the user that the current image meets requirements, and that information query processing is being performed based on the shot image. When the definition and texture complexity of the text region image included in the third initial image do not meet requirements, the user may also be prompted in the foregoing manner, so that the user is guided to shoot a query image with higher image quality.

In an embodiment, operation S801 may include: shooting a fifth initial image; determining N text fields included in the fifth initial image; obtaining M text fields included in a reference image, where a time interval between a time at which the reference image is captured and a time at which the fifth initial image is captured is less than a duration threshold, and M is greater than or equal to 1; when any text field included in the fifth initial image is inconsistent with each of the M text fields, displaying third prompt information or playing third prompt information by voice, where the third prompt information is used to indicate that an incorrect text field is recognized in the fifth initial image, and prompt the user to move a location of the terminal or adjust a shooting angle of the terminal; and when text fields included in a sixth initial image shot at the first location all belong to the M text fields, determining the sixth initial image as the query image.

In an implementation, if the fifth initial image includes one text field, a search may be performed to determine whether the text field exists among the M text fields included in the reference image. If the text field exists among the M text fields included in the reference image, it indicates that the text field recognized in the fifth initial image is a correct text field. If the fifth initial image includes at least two text fields, the text fields included in the fifth initial image may be obtained in sequence, and each time a text field is obtained, a search is performed to determine whether the currently obtained text field exists among the M text fields included in the reference image. If the currently obtained text field exists among the M text fields included in the reference image, it indicates that the currently obtained text field is a correct text field. However, because the fifth initial image includes at least two text fields, the foregoing determining needs to be performed for a plurality of times. As long as any text field included in the fifth initial image does not exist among the M text fields included in the reference image, an initial image may be shot again.

Figure 11:
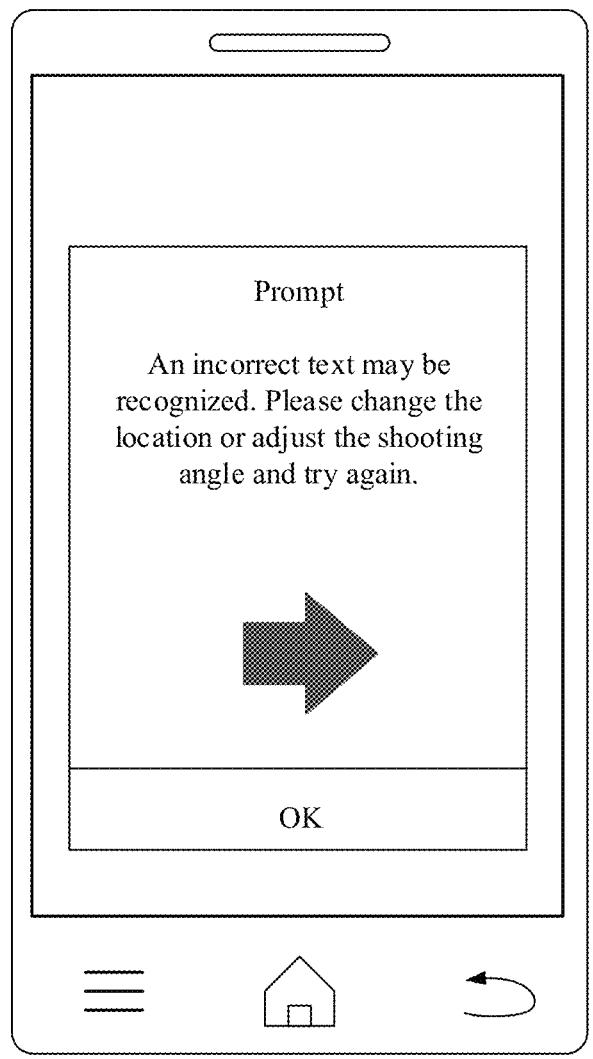
FIG. 11 is a schematic diagram of a user guidance interface according to an example embodiment.

In an actual application, when the user comes to a target venue, for example, a shopping mall, if the user comes to the shopping mall for the first time, and wants to view some description information of the shopping mall by using a mobile phone, the user may take out the mobile phone, stand at a second location, turn on a camera, and point the camera at an environment of the shopping mall for shooting. In this case, the terminal may obtain the fifth initial image, and the terminal may detect N text region images in the fifth initial image, and separately recognize a text field included in each text region image. Then the terminal may further determine, based on a previous/next video frame of the fifth initial image in a video stream, accuracy of the text field recognized in the fifth initial image. A time interval between the previous/next video frame and the fifth initial image is less than a duration threshold. For example, assuming that only one text field is detected in the image, text fields recognized in the previous video frame and the next video frame of the fifth initial image are both "A35", but a text field recognized in the fifth initial image is "A36". In this case, it indicates that the text field recognized in the fifth initial image may be an incorrect text field. Further, as shown in FIG. 11, a prompt box may be displayed, or the third prompt information may be directly played by voice, for example, "An incorrect text may be recognized. Please change the location or adjust the shooting angle and try again." After receiving the prompt, the user moves the mobile phone to a location in which a real text is located. In the moving process, the terminal continuously shoots initial images until the user moves to the appropriate first location. When the text fields recognized in the sixth initial image all belong to text fields that can be recognized in the previous/next video frame, the terminal may determine the sixth initial image as the query image, and send the query image to the server. In this case, the terminal may further display a prompt box to prompt the user that a correct text has been detected and that information query processing is being performed based on the shot image.

In the foregoing manner, after the user performs an operation every time, the terminal may evaluate and properly guide the operation of the user based on preset logic, to guide the user to shoot a query image with high image quality. The user may be guided in a UI guidance manner to photograph a scene that is more conducive to text recognition, and a final recognition result is verified by using a recognition result of the text field in the previous/next video frame. Therefore, text recognition is more accurate, and search accuracy is further improved.

The three manners provided above may be used independently, or any two or all of the three manners may be used in combination. In addition, another manner of guiding the user to shoot a query image with high image quality may be added and used with the foregoing manners.

In addition to the foregoing manners, if the query image is automatically shot by the terminal, in the process of moving the terminal, the camera in the terminal may shoot a video stream of the target venue in real time, and extract a query image from the video stream, where the query image may be a video frame in the video stream. Alternatively, in every preset shooting period, the terminal may shoot an environmental image of the target venue, and use a complete environmental image as a query image.

If the query image is automatically shot by the terminal and is a video frame in the video stream, in a video shooting process, an initial pose may be determined through frame extraction. For example, the terminal may shoot 60 video frames per second. To reduce an amount of calculation generated in the process of determining the initial pose, 60 video frames may be sampled at fixed intervals to obtain, for example, 30 video frames, and the initial pose of the terminal is determined based on the 30 video frames. Each time a video frame is obtained, the method provided in this embodiment of the present disclosure may be performed once, to determine an initial pose of the terminal at a moment when the terminal captures the corresponding video frame.

Query images obtained by the terminal by shooting with different postures are different. The initial pose of the terminal may be determined based on a feature of the shot query image. The pose mentioned in this application may be a global pose. The global pose includes a current initial location and a posture of the terminal. The posture may also be a rotation angle. The location may be represented by coordinates of the terminal in a world coordinate system. The posture may be represented by a rotation angle of the terminal relative to the world coordinate system. The world coordinate system may be a coordinate system in preset actual space. East and north directions in the actual space may be respectively used as an x-axis and a y-axis of the coordinate system, and a straight line that is perpendicular to a horizontal plane enclosed by the x-axis and the y-axis and passes through a preset origin is used as a z-axis, to establish the world coordinate system.

Operation S802: Determine N text fields included in the query image.

N is greater than or equal to 1.

In an implementation, after the query image is obtained, the N text fields included in the query image may be recognized based on an optical character recognition (OCR) technology. Specifically, N text region images may be determined in the query image by performing text detection processing, and a text included in each text region image is separately recognized, so that the N text fields are obtained. The text field may be one character or a plurality of characters. For example, the text field may be "A", "3", or "5", or the text field may be "A35". Each of "A", "3", and "5" represents one character, and "A35" represents three characters. One or more characters may be used as one text field. In an embodiment, characters included in continuous region image parts in the query image may be used as one text field. The text field may be stored in the terminal in a form of a character string.

In a process of recognizing a text field included in the query image, the terminal may first perform text detection processing on the query image, and output position coordinates of a text box corresponding to a text region image included in the query image. In this embodiment of the present disclosure, text detection processing may be performed by using a target detection algorithm based on deep learning (SSD). A plurality of text boxes may be detected in one query image, and each text box corresponds to one text field.

Figure 12:
FIG. 12 is a schematic diagram of an underground garage according to an example embodiment.
Figure 13:
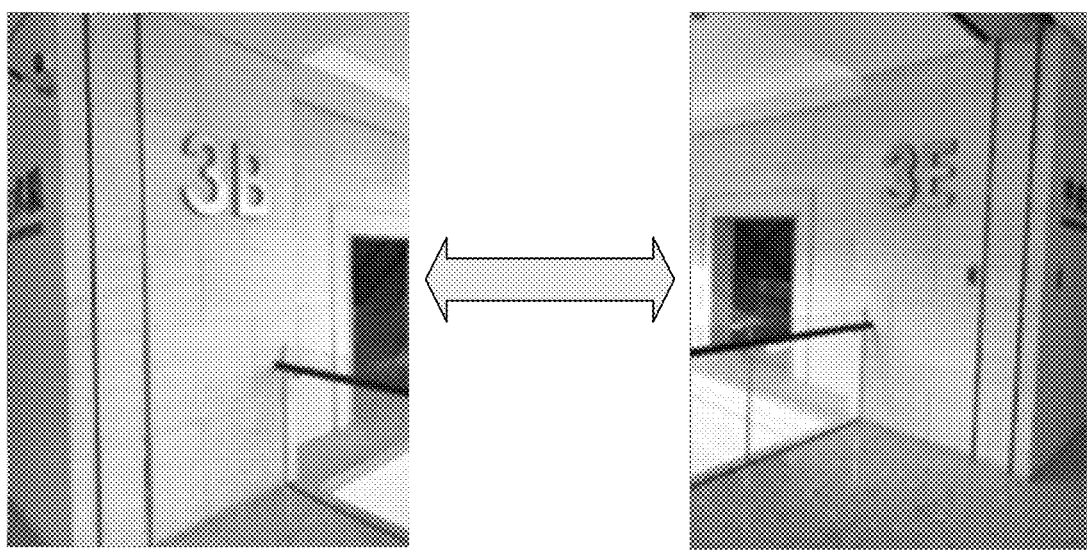
FIG. 13 is a schematic diagram of a corridor environment according to an example embodiment.

Assuming that the target venue is an underground garage, a parking region identifier may be set on a pillar of the underground garage. As shown in FIG. 12, a current parking region identifier "A35" is set on a pillar of the underground garage. When the terminal captures a query image in a current parking region, the captured query image may probably include the current parking region identifier "A35". When performing text detection processing on the query image that includes the current parking region identifier "A35", the terminal may output position coordinates of a text box corresponding to an "A35" region image. Alternatively, as shown in FIG. 13, when the terminal captures a query image in a corridor of a building, the captured query image may probably include a current floor identifier "3B" or "3E". When performing text detection processing on the query image that includes the current floor identifier "3B" or "3E", the terminal may output position coordinates of a text box corresponding to a "3B" or "3E" region image.

Figure 14:
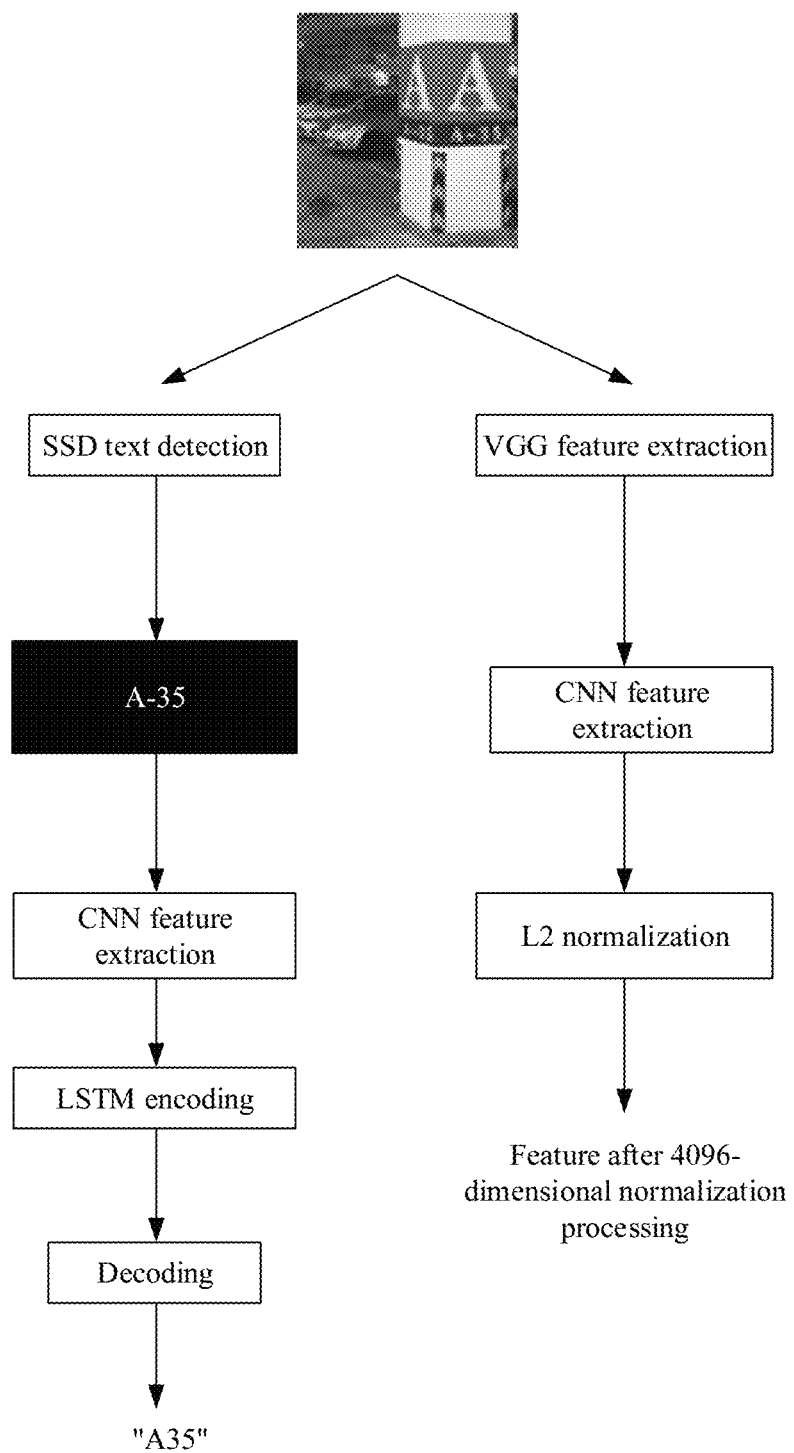
FIG. 14 is a schematic flowchart of a method for determining a pose according to an example embodiment.

In this embodiment of the present disclosure, as shown in FIG. 14, after the position coordinates of the text box corresponding to the text region image included in the query image are determined, the text region image may be cropped from the query image based on the position coordinates of the text box. Convolutional neural network (CNN) feature extraction is performed on the text region image, then an extracted CNN feature is input into a recursive neural network (LSTM) for encoding processing, then classification operation processing is performed on the encoded CNN feature, and finally, the text field in the text region image, such as "A35", may be output.

In an embodiment, screening processing may be performed on the N text fields detected in the query image to further extract a text field of a salient type, where the text field of the salient type is an identification field and can clearly or uniquely identify an environment. The terminal may input the N text fields included in the query image into a pre-trained text classifier, to obtain a text type of each text field included in the query image, and determine a text field whose text type is a preset salient type. Alternatively, the server may be configured to complete the execution logic, that is, the terminal sends all the text fields to the server, and the server screens out the text field of the salient type from the N text fields based on similar logic. If the terminal screens out the text field of the salient type from the N text fields, what the terminal finally sends to the server includes the query image and the text field of the salient type.

In an implementation, a large quantity of text fields may be included in the target venue. Some text fields help recognize the current environment, and some text fields may interfere with the process of recognizing the current environment. A text field that helps recognize the current environment may be used as the text field of the salient type. An effective text field capture rule may be predefined. In an application, an identification text field in the target venue, for example, a parking region identifier "A32" or "B405" in the underground garage, may be selected as a positive sample. In addition, a non-identification text field in the target venue may also be selected as a negative sample. The classifier is trained based on the positive sample and the negative sample.

After the N text fields are extracted from the query image, each of the N text fields may be input into the trained classifier. If a value output by the classifier is close or equal to 1, the current text field may be considered as a text field of the salient type. If an output value is close or equal to 0, the current text field may be considered as a text field of a non-salient type. Based on the text field of the salient type and the query image, accuracy of the determined initial pose is improved more advantageously.

Operation S803: Send N text fields and the query image to the server.

In an implementation, the server may determine the initial pose of the terminal based on the N text fields and the query image sent by the terminal, and then return the initial pose of the terminal to the terminal. A specific manner in which the server determines the initial pose of the terminal based on the N text fields and the query image sent by the terminal is described subsequently.

Operation S804: Receive the initial pose that is of the terminal at the first location and is returned by the server.

In an implementation, the terminal may perform processing such as navigation, route planning, and obstacle avoidance based on the received initial pose at the first location. The initial pose at the first location is determined by the server in real time based on the query image and the text fields sent by the terminal. It should be noted that, in this embodiment of the present disclosure, data sent by the terminal to the server, data received by the terminal from the server, data sent by the server to the terminal, and data received by the server from the terminal may all be carried in information transmitted between the terminal and the server. A message sent between the server and the terminal is in a form of information, and may carry indication information used to indicate some specific content. For example, when the terminal sends the N text fields and the query image to the server, the terminal may add the N text fields and the query image to the indication information and send the indication information to the server.

In an embodiment, after receiving the initial pose returned by the server, the method provided in this embodiment of the present disclosure may further include: obtaining a pose change of the terminal; and determining a real-time pose based on the initial pose and the pose change of the terminal.

In an implementation, if the initial pose is determined by using a query image in a video, the pose change of the terminal may be further determined subsequently by using a simultaneous localization and mapping (SLAM) tracking technology. The real-time pose is determined based on the initial pose and the pose change of the terminal. By using the SLAM tracking technology, computational overheads can be reduced. The terminal needs to send the query image and N text fields to the server only once. The server needs to return the initial pose of the terminal only once based on the query image and the N text fields. Subsequently, the real-time pose may be determined based on the initial pose and based on the SLAM tracking technology. The real-time pose may be a pose of the terminal at any geographical position that belongs to the target venue, such as the first location, the second position, or a third position. The terminal may perform processing such as navigation, route planning, and obstacle avoidance based on the real-time pose.

In an embodiment, in addition to processing such as navigation, route planning, and obstacle avoidance that may be performed based on the real-time pose, after receiving the initial pose returned by the server, the method provided in this embodiment of the present disclosure may further include: obtaining a preview stream of a current scene; determining, based on the real-time pose, preset media content included in a digital map corresponding to the scene in the preview stream; and rendering the media content in the preview stream.

In an implementation, if the terminal is a mobile phone, an AR wearable device, or the like, a virtual scene may be constructed based on the real-time pose. First, the terminal may obtain the preview stream of the current scene. For example, the user may shoot a preview stream of a current environment in a shopping mall. Then the terminal may determine the real-time pose according to the foregoing method. Subsequently, the terminal may obtain the digital map, where the digital map records three-dimensional coordinates of each position in a world coordinate system, and corresponding preset media content exists at a preset three-dimensional coordinate position. The terminal may determine, in the digital map, a target three-dimensional coordinates positon corresponding to the real-time pose, and if corresponding preset media content exists at the a target three-dimensional coordinates positon, obtain the preset media content. For example, when the user photographs a target store, the terminal recognizes a real-time pose, determines that a current camera is photographing the target store, and may obtain preset media content corresponding to the target store, where the preset media content corresponding to the target store may be description information of the target store, for example, which goods are worth buying in the target store. Based on this, the terminal may render the media content in the preview stream. In this case, the user may view, in a preset region near an image corresponding to the target store in the mobile phone, the preset media content corresponding to the target store. After viewing the preset media content corresponding to the target store, the user may have a general understanding of the target store.

Different digital maps may be set for different venues. In this way, when the user moves to another venue, preset media content corresponding to a real-time pose may also be obtained based on the media content rendering manner provided in this embodiment of the present disclosure, and the media content is rendered in a preview stream.

The following describes a specific manner in which the server determines the initial pose of the terminal based on the N text fields and the query image sent by the terminal.

The server may receive the query image sent by the terminal and the N text fields included in the query image; determine a candidate reference image based on a prestored correspondence between a reference image and a text field and based on the N text fields; determine the initial pose of the terminal at the first location based on the query image and the candidate reference image; and send the determined initial pose to the terminal. N is greater than or equal to 1. The query image is obtained based on an image captured by the terminal at the first location, and the scene at the first location includes the scene in the query image.

In an implementation, because there is a large amount of calculation in the process of determining the initial pose, and execution also needs to be based on large storage space, an actual process of determining the initial pose of the terminal based on the N text fields and the query image may be performed by the server.

Through an offline calibration process, the server may pre-establish a database, where the database may store reference images shot at each position in the target venue; and through the offline calibration process, the server may further obtain a pre-established 2D-3D correspondence. The 2D-3D correspondence includes a large quantity of 3D points and corresponding 2D points in a reference image. Each 3D point corresponds to one physical point in the target venue. Each 3D point corresponds to three-dimensional location information of one corresponding physical point in the actual space. In addition, the server may pre-recognize a text field in each reference image, and store a correspondence between each reference image and the text field. When the query image is a complete environmental image shot by the terminal, the reference image may be a complete environmental image pre-shot at each position in the target venue.

To increase a speed of searching for a text field, a search index may be further established based on the text field in the database, and a correspondence between each reference image, the text field, and the search index is stored.

After receiving the query image sent by the terminal and the N text fields included in the query image, the server may perform, based on the search index, retrieval processing on the N text fields included in the query image, to determine candidate reference images corresponding to the N text fields. The candidate reference image may be a target environmental image among pre-shot environmental images. In the process of determining the candidate reference images corresponding to the N text fields, the text fields may be obtained one by one. Each time a text field is obtained, a candidate reference image corresponding to the currently obtained text field is determined. In this way, the candidate reference images corresponding to the text fields can be determined one by one.

If two or more text fields included in a candidate reference image are all the same as the text fields in the query image, the candidate reference image of this type may be determined for two or more times based on the foregoing determining manner. To be specific, a first candidate reference image may be determined by using a first text field in the query image, and the first candidate reference image may also be determined by using a second text field in the query image. Therefore, the first candidate reference image includes both the first text field and the second text field. Therefore, a deduplication operation may be performed on all determined candidate reference images to remove candidate reference images that are determined for a plurality of times. After determining the candidate reference image, the server may determine the initial pose of the terminal based on the query image and the candidate reference image, and send the determined initial pose to the terminal.

The foregoing describes a case in which the terminal sends only one query image and N text fields to the server. In an embodiment, if the terminal sends a plurality of query images and N text fields included in each query image to the server, one initial pose of the terminal may be determined based on each query image and the corresponding N text fields, and finally, a plurality of initial poses may be obtained. A target initial pose is determined in the plurality of initial poses based on probability statistics, and the target initial pose is sent to the terminal. The operation of determining the target initial pose in the plurality of initial poses based on probability statistics may include: determining, in the plurality of initial poses, a target initial pose that repeatedly occurs for a largest quantity of times.

In an embodiment, the operation of determining the initial pose of the terminal based on the query image and the candidate reference image may include: determining a target reference image in the candidate reference image, where the scene at the first location includes a scene in the target reference image; and determining the initial pose of the terminal based on the query image and the target reference image.

In an implementation, because some of candidate reference images are still interfering images, that is, the candidate reference images are not necessarily images pre-shot near the first location at which the query image is shot, but text fields corresponding to the candidate reference images are exactly consistent with the text fields corresponding to the query image, the interfering images are also used as candidate reference images to determine the initial pose of the terminal, and this affects accuracy of the initial pose. Therefore, screening processing may be performed on the candidate reference images to determine the target reference image. Four manners of performing screening processing on the candidate reference images are described in the method provided in this embodiment of the present disclosure, and details are described later. When there is only one candidate reference image, the candidate reference image may be directly determined as the target reference image. After the target reference image is determined, the initial pose of the terminal may be determined based on the query image and the target reference image.

In an embodiment, the operation of determining the initial pose of the terminal based on the query image and the target reference image may include: determining a 2D-2D correspondence between the query image and the target reference image; and determining the initial pose of the terminal based on the 2D-2D correspondence and a preset 2D-3D correspondence of the target reference image.

In an implementation, in the offline calibration process, the server may pre-extract a local image feature of each reference image, and store a correspondence between each environmental image, the local image feature, and the foregoing text field. The local image feature may include image key points, for example, corner points and other pixels having features in the image. The server may determine, based on a correspondence between a reference image and a local image feature, a local image feature of the target reference image. After receiving the query image sent by the terminal, the server may extract a local image feature of the query image, and perform feature matching between the local image feature of the query image and the local image feature of the target reference image. To be specific, an image key point corresponding to the query image is matched with an image key point corresponding to the target reference image, where the image key point is a 2D point, and a 2D-2D correspondence between the query image and the target reference image may be obtained. The 2D-2D correspondence between the query image and the target reference image may include a 2D-2D correspondence between a complete environmental image shot by the terminal and a target environmental image among pre-shot complete environmental images.

For example, the query image has three image key points (including A1, B1, and C1), and the target reference image has five image key points (including A2, B2, C2, D2, and E2). Three groups of correspondences are determined through feature matching: A1-B2, Bl-E2, and C1-A2. Certainly, in an actual application, a process of performing feature matching is much more complex, and a quantity of used image key points is also larger. Herein, only several image key points are used as an example for description. It should be noted that, theoretically, an image key point corresponding to the matched query image and an image key point corresponding to the target environmental image should correspond to a same physical point.

In the offline calibration process, the server may establish a 3D point cloud of the target venue based on a reference image shot at each position in the target venue, where each pixel in each reference image corresponds to one 3D point in the 3D point cloud, and the correspondence may be recorded as an initial 2D-3D correspondence. After determining image key points of each reference image, the server may determine, based on the initial 2D-3D correspondence, a 3D point that is in the 3D point cloud and corresponding to each image key point in the target reference image, and the correspondence may be recorded as a 2D-3D correspondence of the target reference image. The 2D-3D correspondence of the target reference image may be a 2D-3D correspondence of the target reference image corresponding to the first location at which the terminal captures the query image. In an online positioning process, the server may determine a 2D-2D correspondence between the query image and the target reference image, that is, a correspondence between image key points of the query image and image key points of the target environmental image. Then the server may determine, based on the 2D-2D correspondence between the query image and the target reference image and the 2D-3D correspondence of the target reference image, 3D points that are in the 3D point cloud and corresponding to the image key points of the query image.

After the 3D points that are in the 3D point cloud and corresponding to the image key points of the query image are determined, the 3D points that are in the 3D point cloud and corresponding to the image key points of the query image, location information of each image key point of the query image, and three-dimensional location information of each corresponding 3D point may be input into a pose estimation module. The pose estimation module may calculate the pose of the terminal and output the initial pose of the terminal.

The following describes the four manners of performing screening processing on the candidate reference images in the method provided in this embodiment of the present disclosure.

In an embodiment, the operation of determining the target reference image in the candidate reference image may include: determining an image similarity between each candidate reference image and the query image; and determining a candidate reference image whose image similarity is greater than or equal to a preset similarity threshold as the target reference image.

In an implementation, the server may calculate the image similarity between each candidate reference image and the query image based on a preset image similarity algorithm, and then may determine, in each candidate reference image, an image whose image similarity is greater than the preset similarity threshold as the target reference image. One or more target reference images may be determined. Alternatively, the candidate reference images may be sorted in descending order of image similarities, and a preset quantity of top-ranked images are determined as the target reference images. The image similarity algorithm may include a K-nearest neighbor algorithm or the like. The preset similarity threshold may be set to a value based on experience, or may be set to an appropriate value based on experience.

In an embodiment, the operation of determining the target reference image in the candidate reference image may include: obtaining a global image feature of each candidate reference image; determining a global image feature of the query image; determining a distance between the global image feature of each candidate reference image and the global image feature of the query image; and determining a candidate reference image whose distance is less than or equal to a preset distance threshold as the target reference image.

In an implementation, the server may determine, based on a prestored correspondence between a reference image and a global image feature, the global image feature of each candidate reference image, and may also extract the global image feature of the query image, where the global image feature may be data represented in a vector form. Therefore, the distance between the global image feature of each candidate reference image and the global image feature of the query image may be calculated. The distance may be a Euclidean distance or the like. After the distance is calculated, a candidate reference image whose distance is less than or equal to the preset distance threshold may be determined as the target reference image. The preset distance threshold may be set to a value based on experience, or may be set to an appropriate value based on experience. Alternatively, after the distance is calculated, the candidate reference images may be sorted in ascending order of distances, and a preset quantity of top-ranked candidate reference images are selected as the target reference images.

As shown in FIG. 14, in the method provided in this embodiment of the present disclosure, a VGG network (a network structure proposed by the Visual Geometry Group) may be used to extract a global image feature. An environmental image may be input into the VGG network, and the VGG network may perform CNN feature extraction on the environmental image. The VGG network includes a plurality of network layers, and an output of a penultimate fully connected layer in the plurality of network layers may be selected as an extracted CNN feature. Then L2 normalization processing is performed on the extracted CNN feature to obtain a feature after 4096-dimensional normalization processing. This feature is a global image feature of the environmental image. In an actual application, alternatively, the global image feature of the environmental image may be extracted in another manner. This is not limited in this embodiment of the present disclosure.

Figure 15:
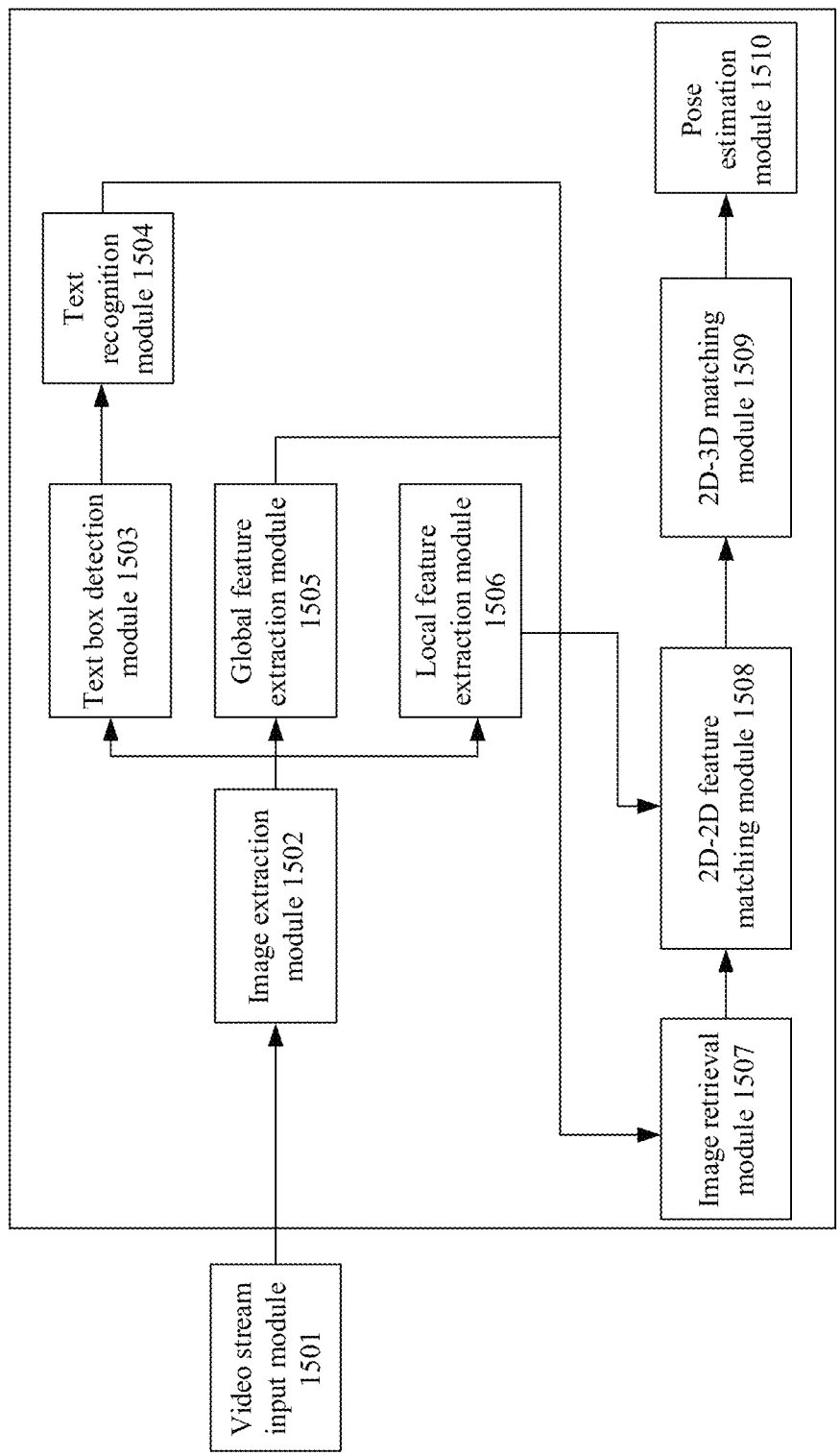
FIG. 15 is a schematic diagram of a structure of a system for determining a pose according to an example embodiment.

As shown in FIG. 15, a system provided in this embodiment of the present disclosure may include a video stream input module 1501, an image extraction module 1502, a text box detection module 1503, a text recognition module 1504, a global feature extraction module 1505, a local feature extraction module 1506, an image retrieval module 1507, a 2D-2D feature matching module 1508, a 2D-3D matching module 1509, and a pose estimation module 1510. The video stream input module 1501 may be configured to obtain a video stream. The image extraction module 1502 may be configured to extract a video frame from the video stream. The text box detection module 1503 may be configured to detect a text region image in the video frame. The text recognition module 1504 may be configured to determine a text field in the text region image. The global feature extraction module 1505 may be configured to extract a global image feature of the video frame. The local feature extraction module 1506 may be configured to extract a local image feature of the video frame, such as an image key point. Operation processing in the global feature extraction module 1505 and operation processing in the local feature extraction module 1506 may be performed in parallel. The image retrieval module 1507 may be configured to search for a target reference image based on the text field and the global image feature of the video frame. The 2D-2D feature matching module 1508 may be configured to determine a 2D-2D correspondence between the video frame and the target reference image based on the local image feature of the video frame and a local image feature of the target reference image. The 2D-3D matching module 1509 may be configured to determine a 2D-3D correspondence of the video frame based on the 2D-2D correspondence between the video frame and the target reference image. The pose estimation module 1510 may be configured to determine an initial pose based on the 2D-3D correspondence of the video frame.

The video stream input module 1501, the image extraction module 1502, the text box detection module 1503, and the text recognition module 1504 may be deployed on a terminal in the system. The global feature extraction module 1505, the local feature extraction module 1506, the image retrieval module 1507, the 2D-2D feature matching module 1508, the 2D-3D matching module 1509, and the pose estimation module 1510 may be deployed on a server in the system. The video stream input module 1501 and the image extraction module 1502 may be implemented by using an obtaining module 1701 of a terminal-side apparatus. The text box detection module 1503 and the text recognition module 1504 may be implemented by using a determining module 1702 of the terminal-side apparatus. The global feature extraction module 1505, the local feature extraction module 1506, the image retrieval module 1507, the 2D-2D feature matching module 1508, the 2D-3D matching module 1509, and the pose estimation module 1510 may be implemented by using a determining module 1802 of a server-side apparatus.

In an embodiment, the candidate reference images may be further screened based on location information of the terminal. The method provided in this embodiment of the present disclosure may further include: the terminal obtains the location information of the terminal, and sends the location information to the server. Correspondingly, the operation of determining the target reference image in the candidate reference image in the server may include: receiving the location information sent by the terminal; obtaining a shooting location corresponding to each candidate reference image; and determining, in each candidate reference image, a target reference image whose shooting location matches the location information.

In an implementation, the server may divide the target venue based on a preset unit area, for example, may divide the target venue by using 100 m×100 m as a unit, to obtain a plurality of subregions. In a process of subregion division, boundaries of adjacent subregions may be allowed to overlap each other to some extent. The server may calibrate a subregion to which each reference image belongs. In the online positioning process, the terminal may first capture current location information of the terminal based on a global positioning system (GPS) or a location based service (LBS), and send the location information to the server. The server may determine a target subregion to which the location belongs. Then, in each candidate reference image, a target reference image whose shooting location also belongs to the target subregion, that is, a target reference image whose shooting location matches the location information, may be determined.

For example, third floors of two adjacent buildings both have a "301" identifier, but there is a distance between the two adjacent buildings. Even if there are duplicate identifiers, the location of the terminal may be first determined within a range through positioning. Then a search is performed within a range for a target reference image matching the identifier "301".

In an embodiment, when the quantity of text fields included in the query image is greater than 1, the operation of determining the target reference image in the candidate reference image may include: determining, in each candidate reference image, a target reference image including the N text fields.

In an implementation, in a process of determining candidate reference images corresponding to a plurality of text fields, the text fields may be obtained one by one. Each time a text field is obtained, a candidate reference image corresponding to the currently obtained text field is determined. In this way, the candidate reference images corresponding to the text fields can be determined one by one. A target reference image including a plurality of text fields in the query image may be determined from the candidate reference images, so that the candidate reference images are further screened. If one target reference image includes a plurality of text fields included in the query image, it indicates that a probability that a shooting location of the target reference image and a shooting location of the query image are close is very high, and accuracy of the initial pose determined based on the target reference image is also high.

In an embodiment, the operation of determining the candidate reference image based on the prestored correspondence between a reference image and a text field and based on the N text fields may include: inputting the N text fields included in the query image into a pre-trained text classifier to obtain a text type of each text field included in the query image; determining a text field whose text type is a preset salient type; and searching, based on the prestored correspondence between a reference image and a text field, for a candidate reference image corresponding to the text field of the salient type.

In an implementation, the process of screening the N text fields may be set on the terminal or the server. A large quantity of text fields may be included in the target venue. Some text fields help recognize the current environment, and some text fields may interfere with the process of recognizing the current environment. A text field that helps recognize the current environment may be used as the text field of the salient type. An effective text field capture rule may be predefined. In an application, an identification text field in the target venue may be selected as a positive sample. In addition, a non-identification text field in the target venue may also be selected as a negative sample. The classifier is trained based on the positive sample and the negative sample.

Segmentation accuracy of a text field recognition algorithm and template (such as an AI segmentation template) may be determined according to a requirement of the user, that is, several characters are used as one text field through segmentation. One character may be used as one text field, all characters included in continuous image regions may be used as one text field, or all characters included in a region may be used as one text field.

After the N text fields are extracted from the query image, each of the N text fields may be input into the trained classifier. If a value output by the classifier is close or equal to 1, the current text field may be considered as a text field of the salient type. If an output value is close or equal to 0, the current text field may be considered as a text field of a non-salient type. Determining the initial pose based on the text field of the salient type and the query image can improve accuracy of the initial pose.

In an embodiment, the operation of determining the initial pose of the terminal based on the query image and the target reference image may include: for each target reference image, determining an initial correspondence between image key points in the query image and image key points in the target reference image; performing geometric verification processing on each pair of image key points in the initial correspondence to eliminate image key points that are incorrectly matched in the initial correspondence and obtain a target correspondence, where if a quantity of pairs of image key points included in the target correspondence is greater than or equal to a preset threshold, it indicates that the target reference image and the query image are images captured in the same environment; and determining the initial pose of the terminal based on the query image and the target reference image.

In an implementation, the initial correspondence between image key points in the query image and image key points in the target reference image may be determined, where the initial correspondence includes a plurality of pairs of image key points. Then geometric verification processing may be performed on each pair of image key points to eliminate image key points that are incorrectly matched in the initial correspondence. For example, 150 pairs of image key points are included in the initial correspondence in total, 30 pairs of image key points may be eliminated through geometric verification processing, where the 30 pairs of image key points are not image key points that actually match each other, and the target correspondence may be obtained. Finally, whether the quantity of pairs of image key points included in the target correspondence is greater than or equal to the preset threshold may be determined. In this embodiment of the present disclosure, for example, the preset threshold is 100. After the 30 pairs of image key points are eliminated from the 150 pairs of image key points, 120 pairs of remaining image key points are more than the preset threshold 100 pairs. Therefore, the target reference image to which the 120 pairs of remaining image key points belong and the query image are images captured in the same environment. If the quantity of pairs of image key points included in the target correspondence is less than the preset threshold, it indicates that the target reference image and the query image are not environmental images captured in the same environment, and further, the initial pose may not be determined by using the target reference image.

According to this embodiment of the present disclosure, in some scenes with weak textures or high texture similarities (for example, a corridor or a wall occupying a large area of the query image), a candidate reference image matching the query image may be queried based on a text field included in the query image and text fields included in different reference images. Even if textures in the query image are weak or there are few textures, a candidate reference image with higher accuracy can still be found based on the text field. The initial pose of the terminal obtained by performing pose calculation processing based on the candidate reference image with higher accuracy is more accurate. Because retrieval and accurate positioning are performed based on text field retrieval and feature matching of text region images, and text semantic information in a scene can be used, a success rate of positioning in some regions with similar textures or duplicate textures can be increased. In addition, because the 2D-3D correspondence of the reference image to which the text region image belongs is used, positioning accuracy is higher.

According to this embodiment of the present disclosure, a text field may be fused into a visual feature without perception. Therefore, a recall rate and accuracy of image retrieval are higher, the process is not perceived by the user, a positioning process is also more intelligent, and user experience is better.

According to this embodiment of the present disclosure, even if a plurality of similar environments exist at different positions in target venues, and there are a plurality of similar images among different images shot at different positions in the venues, a candidate reference image that matches the query image can be queried based on a text field included in the query image and text fields included in different reference images. Even if there is interference from the plurality of similar images, accuracy of the candidate reference image found based on the text field is high, and the initial pose of the terminal obtained by performing pose calculation processing based on the candidate reference image with higher accuracy is more accurate.

Figure 16:
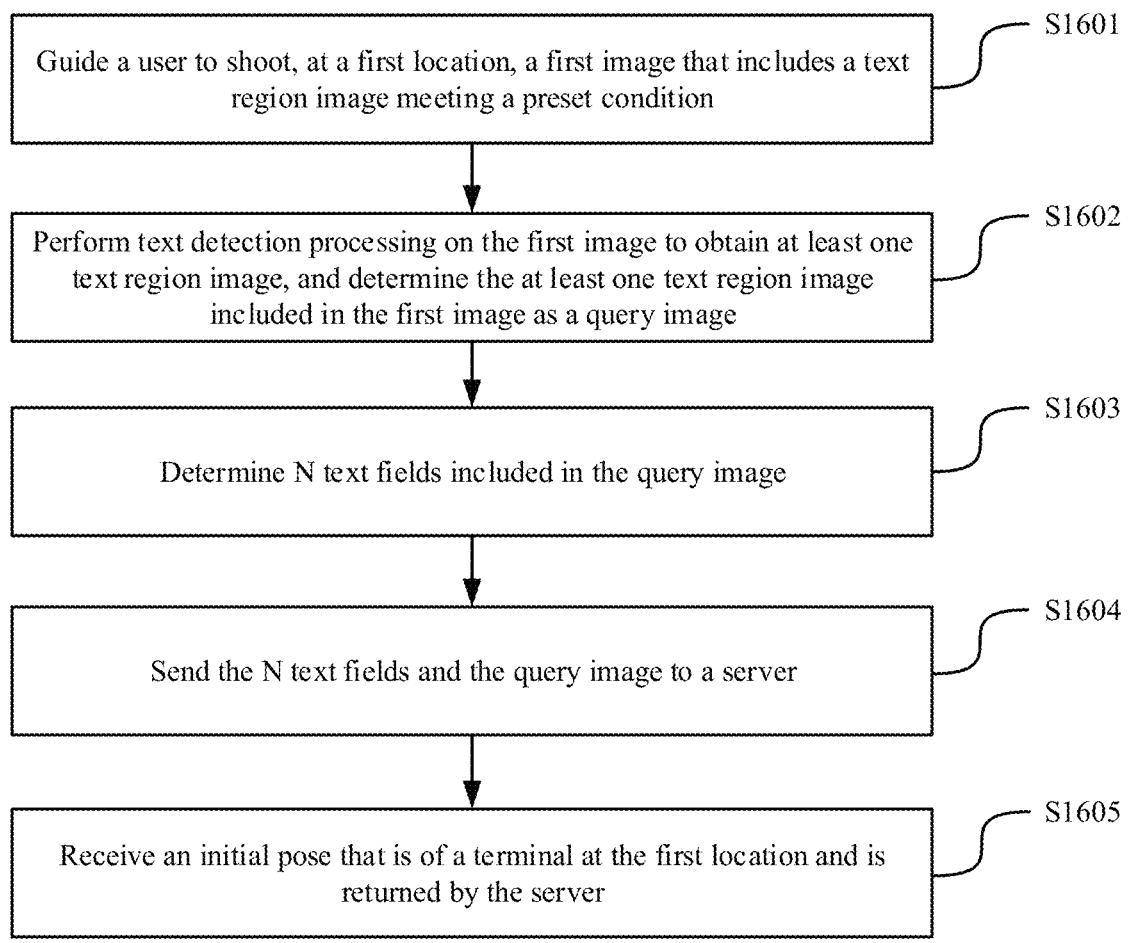
FIG. 16 is a schematic flowchart of a method for determining a pose according to an example embodiment.

Based on the same inventive idea as the foregoing embodiment of the present disclosure, an example embodiment of the present disclosure provides a method for determining a pose. The method may be applied to a terminal, and is implemented in cooperation with a server. As shown in FIG. 16, a processing procedure of the method may include the following operations.

Operation S1601: Guide a user to shoot, at a first location, a first image that includes a text region image meeting a preset condition.

A scene at the first location includes a scene in a query image.

In an implementation, the first location may include any geographical position or spatial position. The scene may be a scene or an environment in which a terminal device is used, for example, a room or a site. Alternatively, the scene may be an entirety or a part of a scene that can be captured by a camera of a terminal within a preset position range, and the scene may further include an environmental background, a physical object in the environment, and the like. A specific range and a size of the scene are freely defined according to an actual requirement, and are not limited in this embodiment of the present disclosure. The scene at the first location may be a specific scene around the first location, and may include a preset geographical range or a field of view. The query image may be an image captured by the terminal at the first location, a scene in the image is consistent with a physical scene, and the scene in the query image may be a part or an entirety of the scene at the first location. The first location is not limited to an accurate position, and an actual position is allowed to have an accuracy error.

If the first image is shot by the user by using the terminal, some means may be used to ensure image quality of the text region image included in the shot first image, and a user interface may be used to guide the user to perform shooting. The first image may be an entire environmental image shot by the terminal, and the text region image may be extracted from the first image. This embodiment of the present disclosure provides three manners for guiding the user to obtain a high-quality text region image.

In an embodiment, operation S1601 may include: shooting a first initial image; when the first initial image has no text, displaying first prompt information or playing first prompt information by voice, where the first prompt information is used to indicate that no text is detected in the first initial image, and prompt the user to move a location of the terminal or adjust a shooting angle of the terminal; and when the terminal shoots, at the first location, a second initial image having a text, determining a text region image included in the second initial image as the query image.

In an implementation, when the user comes to a target venue, for example, a shopping mall, if the user comes to the shopping mall for the first time, and wants to view some description information of the shopping mall by using a mobile phone, the user may take out the mobile phone, stand at a second location, turn on a camera, and point the camera at an environment of the shopping mall for shooting. In this case, the terminal may obtain the first initial image, and may detect whether the first initial image has a text. When the first initial image has no text, as shown in FIG. 9, the terminal may display a prompt box or directly play the first prompt information by voice, for example, may display "No text is detected in the current image. Please change the location or adjust the shooting angle and try again." After receiving the prompt, the user moves the mobile phone to a location in which a real text is located. In the moving process, the terminal continuously shoots initial images until the user moves to the appropriate first location. Then the terminal detects the text in the second initial image, and may determine the text region image included in the second initial image as the query image, and send the query image to a server. In this case, the terminal may further display a prompt box to prompt the user that the text has been detected and that information query processing is being performed based on the shot image.

If the first initial image has no text, it indicates that no text region image exists in the first initial image either. Therefore, the first initial image does not meet requirements.

In an embodiment, operation S1601 may include: shooting a third initial image; determining, by performing text detection processing on the third initial image, a text region image included in the third initial image; when the text region image included in the third initial image does not meet a preferred image condition, displaying second prompt information or playing second prompt information by voice, where the second prompt information is used to indicate that the text region image included in the third initial image does not meet the preferred image condition, and prompt the user to move the terminal in a direction of a real text; and when a fourth initial image including a text region image that meets the preferred image condition is shot at the first location, determining the text region image included in the fourth initial image as the query image.

The preferred image condition may include one or more of the following conditions: a size of the text region image is greater than or equal to a size threshold; definition of the text region image is higher than or equal to a definition threshold; and texture complexity of the text region image is less than or equal to a complexity threshold.

In an implementation, the terminal may detect the text region image in the third initial image, and determine a size of the text region image. If the size of the text region image is small, it indicates that the text region image may not be very clear, and further, the current image does not meet requirements. Alternatively, the terminal may directly determine the definition of the text region image. If the definition is lower than the definition threshold, it indicates that the text region image may not be very clear, and further, the current image does not meet requirements. The terminal may further determine the texture complexity of the text region image. If the texture complexity of the text region image is high, it indicates that there are a lot of texture features in the text region image, which may cause interference to subsequent recognition of a text field in the text region image, and further, the current image does not meet requirements. Another preferred image condition may be properly set according to an actual requirement on a basis of the preferred image condition provided in this embodiment of the present disclosure. When the text region image in the third initial image does not meet one or more of the preferred image conditions, an initial image is shot again.

In an actual application, when the user comes to a target venue, for example, a shopping mall, if the user comes to the shopping mall for the first time, and wants to view some description information of the shopping mall by using a mobile phone, the user may take out the mobile phone, stand at a second location, turn on a camera, and point the camera at an environment of the shopping mall for shooting. In this case, the terminal may obtain the third initial image, and may detect whether the text region image included in the third initial image meets the preferred image condition. When the size of the text region image included in the third initial image is less than the size threshold, as shown in FIG. 10, the terminal may display a prompt box or directly play the second prompt information by voice, for example, may display "A text box detected in the current image is small. Please move closer to a real text and try again." After receiving the prompt, the user moves the mobile phone to a location in which a real text is located. In the moving process, the terminal continuously shoots initial images until the user moves to the appropriate first location. Then the size of the text region image detected by the terminal in the fourth initial image is greater than the size threshold, and the text region image included in the fourth initial image may be determined as the query image, and sent to the server. In this case, the terminal may further display a prompt box, to prompt the user that the current image meets requirements, and that information query processing is being performed based on the shot image. When the definition and texture complexity of the text region image included in the third initial image do not meet requirements, the user may also be prompted in the foregoing manner, so that the user is guided to shoot a query image with higher image quality.

In an embodiment, operation S1601 may include: shooting a fifth initial image; determining N text fields included in the fifth initial image; obtaining M text fields included in a reference image, where a time interval between a time at which the reference image is captured and a time at which the fifth initial image is captured is less than a duration threshold, and M is greater than or equal to 1; when any text field included in the fifth initial image is inconsistent with each of the M text fields, displaying third prompt information or playing third prompt information by voice, where the third prompt information is used to indicate that an incorrect text field is recognized in the fifth initial image, and prompt the user to move a location of the terminal or adjust a shooting angle of the terminal; and when text fields included in a sixth initial image shot at the first location all belong to the M text fields, determining a text region image included in the sixth initial image as the query image.

In an implementation, if the fifth initial image includes one text field, a search may be performed to determine whether the text field exists among the M text fields included in the reference image. If the text field exists among the M text fields included in the reference image, it indicates that the text field recognized in the fifth initial image is a correct text field. If the fifth initial image includes at least two text fields, the text fields included in the fifth initial image may be obtained in sequence, and each time a text field is obtained, a search is performed to determine whether the currently obtained text field exists among the M text fields included in the reference image. If the currently obtained text field exists among the M text fields included in the reference image, it indicates that the currently obtained text field is a correct text field. However, because the fifth initial image includes at least two text fields, the foregoing determining needs to be performed for a plurality of times. As long as any text field included in the fifth initial image does not exist among the M text fields included in the reference image, an initial image may be shot again.

In an actual application, when the user comes to a target venue, for example, a shopping mall, if the user comes to the shopping mall for the first time, and wants to view some description information of the shopping mall by using a mobile phone, the user may take out the mobile phone, stand at a second location, turn on a camera, and point the camera at an environment of the shopping mall for shooting. In this case, the terminal may obtain the fifth initial image, and the terminal may detect N text region images in the fifth initial image, and separately recognize a text field included in each text region image. Then the terminal may further determine, based on a previous/next video frame of the fifth initial image in a video stream, accuracy of the text field recognized in the fifth initial image. A time interval between the previous/next video frame and the fifth initial image is less than a duration threshold. For example, assuming that only one text field is detected in the image, text fields recognized in the previous video frame and the next video frame of the fifth initial image are both "A35", but a text field recognized in the fifth initial image is "A36". In this case, it indicates that the text field recognized in the fifth initial image may be an incorrect text field. Further, as shown in FIG. 11, a prompt box may be displayed, or the third prompt information may be directly played by voice, for example, "An incorrect text may be recognized. Please change the location or adjust the shooting angle and try again." change the location After receiving the prompt, the user moves the mobile phone to a location in which a real text is located. In the moving process, the terminal continuously shoots initial images until the user moves to the appropriate first location. When the text fields recognized in the sixth initial image all belong to text fields that can be recognized in the previous/next video frame, the terminal may determine the text region image included in the sixth initial image as the query image, and send the query image to the server. In this case, the terminal may further display a prompt box to prompt the user that a correct text has been detected and that information query processing is being performed based on the shot image.

When the sixth initial image includes N text region images, each text region image corresponds to one text field. When the text fields included in the sixth initial image all belong to the text fields that can be recognized in the previous/next video frame, all the N text region images may be determined as query images, and sent to the server. Alternatively, when target text fields included in the sixth initial image belong to the text fields that can be recognized in the previous/next video frame, text region images corresponding to the target text fields may be determined as query images, and sent to the server. Incorrect text fields included in the sixth initial image do not belong to the text fields that can be recognized in the previous/next video frame, and text region images corresponding to the incorrect text fields may not be sent to the server.

In the foregoing manner, after the user performs an operation every time, the terminal may evaluate and properly guide the operation of the user based on preset logic, to guide the user to shoot a query image with high image quality. The three manners provided above may be used independently, or any two or all of the three manners may be used in combination. In addition, another manner of guiding the user to shoot a query image with high image quality may be added and used with the foregoing manners.

In addition to the foregoing manners, if the query image is automatically shot by the terminal, in the process of moving the terminal, the camera in the terminal may shoot a video stream of the target venue in real time, extract one image from the video stream, and determine a text region image in the image as a query image, where the query image may be a text region image in a video frame in the video stream. Alternatively, in every preset shooting period, the terminal may shoot an environmental image of the target venue, and use a text region image in the environmental image as a query image.

Query images obtained by the terminal with different postures are different. An initial pose of the terminal may be determined based on a feature of the obtained query image. The initial pose includes a current initial position and a posture of the terminal.

Operation S1602: Perform text detection processing on the first image to obtain at least one text region image, and determine the at least one text region image included in the first image as the query image.

In an implementation, after the user is guided to shoot the first image including the text region image that meets the preset condition, cropping or matting processing may be performed on the first image to obtain the text region image in the first image from the first image. When the query image is subsequently sent to the server, only the text region image obtained through cropping or matting processing needs to be sent, and there is no need to send the entire first image.

Operation S1603: Determine N text fields included in the query image.

N is greater than or equal to 1.

In an implementation, the query image may be a text region image recognized in the environmental image shot by the terminal, and there may be a plurality of text region images. Therefore, the query image may be a plurality of text region images, and each text region image corresponds to one text field. Therefore, the query image may include a plurality of text fields. Certainly, if the query image is one text region image, the query image may also include only one text field.

The text field may be one character or a plurality of characters. For example, the text field may be "A", "3", or "5", or the text field may be "A35". Each of "A", "3", and "5" represents one character, and "A35" represents three characters. One or more characters may be used as one text field. In an embodiment, characters included in same text regions included in continuous images may be used as one text field. The text field may be stored in the terminal in a form of a character string.

In an embodiment, screening processing may be performed on the N text fields detected in the query image to further extract a text field of a salient type, where the text field of the salient type is an identification field and can clearly or uniquely identify an environment. The terminal may input the N text fields included in the query image into a pre-trained text classifier, to obtain a text type of each text field included in the query image, and determine a text field whose text type is a preset salient type. Alternatively, the server may be configured to complete the execution logic, that is, the terminal sends all the text fields to the server, and the server screens out the text field of the salient type from the N text fields based on similar logic. If the terminal screens out the text field of the salient type from the N text fields, what the terminal finally sends to the server includes the text field of the salient type and a corresponding text region image.

Based on the text field of the salient type and the corresponding text region image, accuracy of the determined initial pose is improved more advantageously.

Operation S1604: Send the N text fields and the query image to the server.

In an implementation, the server may determine the initial pose of the terminal at the first location based on the N text fields and the query image sent by the terminal, and then return the initial pose of the terminal to the terminal.

Operation S1605: Receive the initial pose that is of the terminal at the first location and is returned by the server.

In an implementation, the terminal may perform processing such as navigation, route planning, and obstacle avoidance based on the received initial pose at the first location. The initial pose at the first location is determined by the server in real time based on the query image and the text fields sent by the terminal.

In an embodiment, after receiving the initial pose returned by the server, the method provided in this embodiment of the present disclosure may further include: obtaining a pose change of the terminal; and determining a real-time pose based on the initial pose and the pose change of the terminal.

In an implementation, if the initial pose is determined by using a query image in a video, the pose change of the terminal may be further determined subsequently by using a simultaneous localization and mapping (SLAM) tracking technology. The real-time pose is determined based on the initial pose and the pose change of the terminal.

In an embodiment, in addition to processing such as navigation, route planning, and obstacle avoidance that may be performed based on the real-time pose, after receiving the initial pose returned by the server, the method provided in this embodiment of the present disclosure may further include: obtaining a preview stream of a current scene; determining, based on the real-time pose, preset media content included in a digital map corresponding to the scene in the preview stream; and rendering the media content in the preview stream.

In an implementation, if the terminal is a mobile phone, an AR wearable device, or the like, a virtual scene may be constructed based on the real-time pose. First, the terminal may obtain the preview stream of the current scene. For example, the user may shoot a preview stream of a current environment in a shopping mall. Then the terminal may determine the real-time pose according to the foregoing method. Subsequently, the terminal may obtain the digital map, where the digital map records three-dimensional coordinates of each position in a world coordinate system, and corresponding preset media content exists at a preset three-dimensional coordinate position. The terminal may determine, in the digital map, a target three-dimensional coordinates positon corresponding to the real-time pose, and if corresponding preset media content exists at the a target three-dimensional coordinates positon, obtain the preset media content. For example, when the user photographs a target store, the terminal recognizes a real-time pose, determines that a current camera is photographing the target store, and may obtain preset media content corresponding to the target store, where the preset media content corresponding to the target store may be description information of the target store, for example, which goods are worth buying in the target store. Based on this, the terminal may render the media content in the preview stream. In this case, the user may view, in a preset region near an image corresponding to the target store in the mobile phone, the preset media content corresponding to the target store. After viewing the preset media content corresponding to the target store, the user may have a general understanding of the target store.

Different digital maps may be set for different venues. In this way, when the user moves to another venue, preset media content corresponding to a real-time pose may also be obtained based on the media content rendering manner provided in this embodiment of the present disclosure, and the media content is rendered in a preview stream.

The following describes a specific manner in which the server determines the initial pose of the terminal based on the N text fields and the query image sent by the terminal.

The server may receive the query image sent by the terminal and the N text fields included in the query image; determine a candidate reference image based on a prestored correspondence between a reference image and a text field and based on the N text fields; determine the initial pose of the terminal based on the query image and the candidate reference image; and send the determined initial pose to the terminal. N is greater than or equal to 1. The query image is obtained based on an image captured by the terminal at the first location, and the scene at the first location includes the scene in the query image.

In an implementation, through an offline calibration process, the server may pre-establish a database, where the database may store environmental images pre-shot at each position in the target venue; and through the offline calibration process, the server may further predetermine a text region image in each pre-shot environmental image, and obtain a pre-established 2D-3D correspondence. The 2D-3D correspondence includes a large quantity of 3D points and corresponding 2D points in the environmental image. Each 3D point corresponds to one physical point near a location in which a real text is located in the target venue. Each 3D point corresponds to three-dimensional location information of a corresponding physical point in actual space. In addition, the server may pre-recognize a text field in the text region image in each pre-shot environmental image, and store a correspondence between each text region image and the text field. When the query image is a text region image in a complete environmental image shot by the terminal, the reference image may be a text region image recognized in the pre-shot environmental image.

To increase a search speed of searching for a text field, a search index (global index) may be further established based on the text field in the database, and a correspondence between each pre-recognized text region image, the text field, and the search index is stored.

After receiving the query image sent by the terminal and the N text fields included in the query image, the server may perform, based on the search index, retrieval processing on the N text fields included in the query image, to determine candidate reference images corresponding to the N text fields. The candidate reference image may be a text region image recognized in a candidate environmental image, and the candidate environmental image may be an image among pre-shot environmental images. In the process of determining the candidate reference images corresponding to the N text fields, the text fields may be obtained one by one. Each time a text field is obtained, a candidate reference image corresponding to the currently obtained text field is determined. In this way, the candidate reference images corresponding to the text fields can be determined one by one.

In an embodiment, the operation of determining the initial pose of the terminal at the first location based on the query image and the candidate reference image may include: determining a target reference image in the candidate reference image, where the scene at the first location includes a scene in the target reference image; and determining the initial pose of the terminal at the first location based on the query image and the target reference image.

In an implementation, because some of candidate reference images are still interfering images, that is, the candidate reference images are not necessarily images pre-shot near the first location at which the query image is shot, but text fields corresponding to the candidate reference images are exactly consistent with the text fields corresponding to the query image, the interfering images are also used as candidate reference images to determine the initial pose of the terminal, and this affects accuracy of the initial pose. Therefore, screening processing may be performed on the candidate reference images to determine the target reference image. Three manners of performing screening processing on the candidate reference images are described in the method provided in this embodiment of the present disclosure, and details are described later. When there is only one candidate reference image, the candidate reference image may be directly determined as the target reference image. After the target reference image is determined, the initial pose of the terminal may be determined based on the query image and the target reference image.

In an embodiment, the operation of determining the initial pose of the terminal at the first location based on the query image and the target reference image may include: determining a 2D-2D correspondence between the query image and the target reference image; and determining the initial pose of the terminal at the first location based on the 2D-2D correspondence and a preset 2D-3D correspondence of the target reference image.

In an implementation, the 2D-2D correspondence between the query image and the target reference image may include a 2D-2D correspondence between a text region image in a complete environmental image shot by the terminal and a target text region image recognized in a target environmental image among the pre-shot environmental images. The 2D-3D correspondence of the target reference image may include a 2D-3D correspondence of the target text region image.

After the 2D-2D correspondence between the query image and the target reference image is determined, the 2D-2D correspondence and the 2D-3D correspondence of the target reference image may be input into a pose estimation module, and the pose estimation module may calculate the initial pose of the terminal, and output the initial pose of the terminal.

In an embodiment, before the 2D-2D correspondence between the query image and the target reference image is determined, image enhancement processing may be further performed on the query image to obtain a query image after the image enhancement processing, and then a 2D-2D correspondence between the query image after the image enhancement processing and the target reference image is determined.

In an implementation, the image enhancement processing is performed on the query image, so that the determined 2D-2D correspondence between the query image and the target reference image is more accurate. The 2D-2D correspondence between the query image and the target reference image may include a correspondence between image key points of the query image and image key points of the target reference image. After the image enhancement processing is performed on the query image, the determined image key points of the query image are more accurate. Further, the determined 2D-2D correspondence between the query image and the target reference image is more accurate.

The following describes the three manners of performing screening processing on the candidate reference images in the method provided in this embodiment of the present disclosure.

In an embodiment, the operation of determining the target reference image in the candidate reference image may include: determining an image similarity between each candidate reference image and the query image; and determining a candidate reference image whose image similarity is greater than or equal to a preset similarity threshold as the target reference image.

In an implementation, the server may calculate, based on a preset image similarity algorithm, an image similarity between a candidate text region image recognized in each candidate environmental image among the pre-shot environmental images and the text region image in the environmental image shot by the terminal, and may subsequently determine, in each candidate text region image, an image whose image similarity is greater than the preset similarity threshold as the target text region image. One or more target text region images may be determined. Alternatively, the candidate text region images may be sorted in descending order of image similarities, and a preset quantity of top-ranked images are determined as the target text region images. The image similarity algorithm may include a K-nearest neighbor algorithm or the like. The preset similarity threshold may be set to a value based on experience, or may be set to an appropriate value based on experience.

In an embodiment, the operation of determining the target reference image in the candidate reference image may include: obtaining a global image feature of each candidate reference image; determining a global image feature of the query image; determining a distance between the global image feature of each candidate reference image and the global image feature of the query image; and determining a candidate reference image whose distance is less than or equal to a preset distance threshold as the target reference image.

In an implementation, the server may determine, based on a prestored correspondence between a text region image recognized in an environmental image and a global image feature, a global image feature of the candidate text region image recognized in each candidate environmental image, and may further extract a global image feature of the environmental image shot by the terminal, where the global image feature may be data represented in a vector form. Therefore, a distance between the global image feature of each candidate text region image and the global image feature of the environmental image shot by the terminal may be calculated. The distance may be a Euclidean distance or the like. After the distance is calculated, a candidate text region image whose distance is less than or equal to the preset distance threshold may be determined as the target text region image. The preset distance threshold may be set to a value based on experience, or may be set to an appropriate value based on experience. Alternatively, after the distance is calculated, the candidate text region images may be sorted in ascending order of distances, and a preset quantity of top-ranked candidate text region images are selected as the target text region images.

In an embodiment, the candidate reference images may be further screened based on location information of the terminal. The method provided in this embodiment of the present disclosure may further include: the terminal obtains the location information of the terminal, and sends the location information to the server. Correspondingly, the operation of determining the target reference image in the candidate reference image in the server may include: receiving the location information sent by the terminal; obtaining a shooting location corresponding to each candidate reference image; and determining, in each candidate reference image, a target reference image whose shooting location matches the location information.

In an embodiment, the operation of determining the candidate reference image based on the prestored correspondence between a reference image and a text field and based on the N text fields may include: inputting the N text fields included in the query image into a pre-trained text classifier to obtain a text type of each text field included in the query image; determining a text field whose text type is a preset salient type; and searching, based on the prestored correspondence between a reference image and a text field, for a candidate reference image corresponding to the text field of the salient type.

In an implementation, the process of screening the N text fields may be set on the terminal or the server. A large quantity of text fields may be included in the target venue. Some text fields help recognize the current environment, and some text fields may interfere with the process of recognizing the current environment. A text field that helps recognize the current environment may be used as the text field of the salient type. Determining the initial pose based on the text field of the salient type and the query image can improve accuracy of the initial pose.

In an embodiment, the operation of determining the initial pose of the terminal based on the query image and the target reference image may include: for each target reference image, determining an initial correspondence between image key points in the query image and image key points in the target reference image; performing geometric verification processing on each pair of image key points in the initial correspondence to eliminate image key points that are incorrectly matched in the initial correspondence and obtain a target correspondence, where if a quantity of pairs of image key points included in the target correspondence is greater than or equal to a preset threshold, it indicates that the target reference image and the query image are images captured in the same environment; and determining the initial pose of the terminal based on the query image and the target reference image.

In an implementation, the initial correspondence between image key points in the query image and image key points in the target reference image may be determined, where the initial correspondence includes a plurality of pairs of image key points. Then geometric verification processing may be performed on each pair of image key points to eliminate image key points that are incorrectly matched in the initial correspondence.

Some processing by the terminal and some processing by the server in this embodiment of the present disclosure are the same as some processing by the terminal and some processing by the server in the foregoing embodiment of the present disclosure, and the same parts are not described in detail in this embodiment of the present disclosure. For details, refer to descriptions of processing by the terminal and processing by the server in the foregoing embodiment of the present disclosure.

According to this embodiment of the present disclosure, in some scenes with weak textures or high texture similarities (for example, a corridor or a wall occupying a large area of the query image), a candidate reference image matching the query image may be queried based on a text field included in the query image and text fields included in different reference images. Even if textures in the query image are weak or there are few textures, a candidate reference image with higher accuracy can still be found based on the text field. The initial pose of the terminal obtained by performing pose calculation processing based on the candidate reference image with higher accuracy is more accurate. Because retrieval and accurate positioning are performed based on text field retrieval and feature matching of text region images, and text semantic information in a scene can be used, a success rate of positioning in some regions with similar textures or duplicate textures can be increased. In addition, because the 2D-3D correspondence of the reference image to which the text region image belongs is used, positioning accuracy is higher.

According to this embodiment of the present disclosure, a text field may be fused into a visual feature without perception. Therefore, a recall rate and accuracy of image retrieval are higher, the process is not perceived by the user, a positioning process is also more intelligent, and user experience is better.

According to this embodiment of the present disclosure, even if a plurality of similar environments exist at different positions in target venues, and there are a plurality of similar images among different images shot at different positions in the venues, a candidate reference image that matches the query image can be queried based on a text field included in the query image and text fields included in different reference images. Even if there is interference from the plurality of similar images, accuracy of the candidate reference image found based on the text field is high, and the initial pose of the terminal obtained by performing pose calculation processing based on the candidate reference image with higher accuracy is more accurate.

Figure 17:
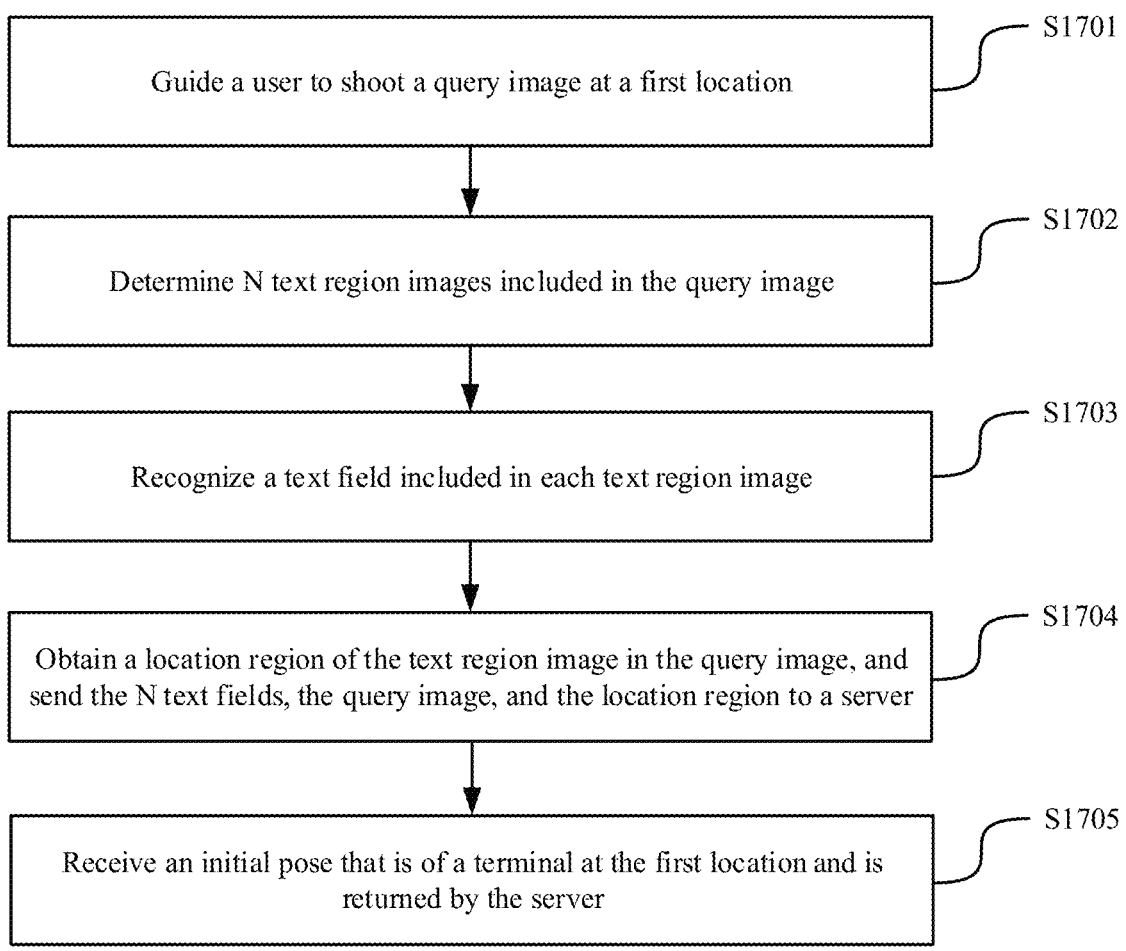
FIG. 17 is a schematic flowchart of a method for determining a pose according to an example embodiment.

An example embodiment of the present disclosure provides a method for determining a pose. The method may be applied to a terminal, and is implemented in cooperation with a server. As shown in FIG. 17, a processing procedure of the method may include the following operations.

Operation S1701: Guide a user to shoot a query image at a first location.

A scene at the first location includes a scene in the query image.

In an implementation, the first location may include any geographical position or spatial position. The scene may be a scene or an environment in which a terminal device is used, for example, a room or a site. Alternatively, the scene may be an entirety or a part of a scene that can be captured by a camera of a terminal within a preset position range, and the scene may further include an environmental background, a physical object in the environment, and the like. A specific range and a size of the scene are freely defined according to an actual requirement, and are not limited in this embodiment of the present disclosure. The scene at the first location may be a specific scene around the first location, and may include a preset geographical range or a field of view. The query image may be an image captured by the terminal at the first location, a scene in the image is consistent with a physical scene, and the scene in the query image may be a part or an entirety of the scene at the first location. The first location is not limited to an accurate position, and an actual position is allowed to have an accuracy error.

If the query image is shot by the user by using the terminal, some means may be used to ensure image quality of the shot query image, and a user interface may be used to guide the user to perform shooting. This embodiment of the present disclosure provides three manners for guiding the user to shoot the query image.

In an embodiment, operation S1701 may include: shooting a first initial image; when the first initial image has no text, displaying first prompt information or playing first prompt information by voice, where the first prompt information is used to indicate that no text is detected in the first initial image, and prompt the user to move a location of the terminal or adjust a shooting angle of the terminal; and when the terminal shoots, at the first location, a second initial image having a text, determining the second initial image as the query image.

In an implementation, when the user comes to a target venue, for example, a shopping mall, if the user comes to the shopping mall for the first time, and wants to view some description information of the shopping mall by using a mobile phone, the user may take out the mobile phone, stand at a second location, turn on a camera, and point the camera at an environment of the shopping mall for shooting. In this case, the terminal may obtain the first initial image, and may detect whether the first initial image has a text. When the first initial image has no text, as shown in FIG. 9, the terminal may display a prompt box or directly play the first prompt information by voice, for example, may display "No text is detected in the current image. Please change the location or adjust the shooting angle and try again." After receiving the prompt, the user moves the mobile phone to a location in which a real text is located. In the moving process, the terminal continuously shoots initial images until the user moves to the appropriate first location. Then the terminal detects the text in the second initial image, and may determine the second initial image as the query image, and send the query image to a server. In this case, the terminal may further display a prompt box to prompt the user that the text has been detected and that information query processing is being performed based on the shot image.

In an embodiment, operation S1701 may include: shooting a third initial image; determining, by performing text detection processing on the third initial image, a text region image included in the third initial image; when the text region image included in the third initial image does not meet a preferred image condition, displaying second prompt information or playing second prompt information by voice, where the second prompt information is used to indicate that the text region image included in the third initial image does not meet the preferred image condition, and prompt the user to move the terminal in a direction of a real text; and when a fourth initial image including a text region image that meets the preferred image condition is shot at the first location, determining the fourth initial image as the query image.

The preferred image condition may include one or more of the following conditions: a size of the text region image is greater than or equal to a size threshold; definition of the text region image is higher than or equal to a definition threshold; and texture complexity of the text region image is less than or equal to a complexity threshold.

In an implementation, the terminal may detect the text region image in the third initial image, and determine a size of the text region image. If the size of the text region image is small, it indicates that the text region image may not be very clear, and further, the current image does not meet requirements. Alternatively, the terminal may directly determine the definition of the text region image. If the definition is lower than the definition threshold, it indicates that the text region image may not be very clear, and further, the current image does not meet requirements. The terminal may further determine the texture complexity of the text region image. If the texture complexity of the text region image is high, it indicates that there are a lot of texture features in the text region image, which may cause interference to subsequent recognition of a text field in the text region image, and further, the current image does not meet requirements. Another preferred image condition may be properly set according to an actual requirement on a basis of the preferred image condition provided in this embodiment of the present disclosure. When the text region image in the third initial image does not meet one or more of the preferred image conditions, an initial image is shot again.

In an actual application, when the user comes to a target venue, for example, a shopping mall, if the user comes to the shopping mall for the first time, and wants to view some description information of the shopping mall by using a mobile phone, the user may take out the mobile phone, stand at a second location, turn on a camera, and point the camera at an environment of the shopping mall for shooting. In this case, the terminal may obtain the third initial image, and may detect whether the text region image included in the third initial image meets the preferred image condition. When the size of the text region image included in the third initial image is less than the size threshold, as shown in FIG. 10, the terminal may display a prompt box or directly play the second prompt information by voice, for example, may display "A text box detected in the current image is small. Please move closer to a real text and try again." After receiving the prompt, the user moves the mobile phone to a location in which a real text is located. In the moving process, the terminal continuously shoots initial images until the user moves to the appropriate first location. Then the size of the text region image detected by the terminal in the fourth initial image is greater than the size threshold, and the fourth initial image may be determined as the query image and sent to the server. In this case, the terminal may further display a prompt box, to prompt the user that the current image meets requirements, and that information query processing is being performed based on the shot image. When the definition and texture complexity of the text region image included in the third initial image do not meet requirements, the user may also be prompted in the foregoing manner, so that the user is guided to shoot a query image with higher image quality.

In an embodiment, operation S1701 may include: shooting a fifth initial image; determining N text fields included in the fifth initial image; obtaining M text fields included in a reference image, where a time interval between a time at which the reference image is captured and a time at which the fifth initial image is captured is less than a duration threshold, and M is greater than or equal to 1; when any text field included in the fifth initial image is inconsistent with each of the M text fields, displaying third prompt information or playing third prompt information by voice, where the third prompt information is used to indicate that an incorrect text field is recognized in the fifth initial image, and prompt the user to move a location of the terminal or adjust a shooting angle of the terminal; and when text fields included in a sixth initial image shot at the first location all belong to the M text fields, determining the sixth initial image as the query image.

In an implementation, if the fifth initial image includes one text field, a search may be performed to determine whether the text field exists among the M text fields included in the reference image. If the text field exists among the M text fields included in the reference image, it indicates that the text field recognized in the fifth initial image is a correct text field. If the fifth initial image includes at least two text fields, the text fields included in the fifth initial image may be obtained in sequence, and each time a text field is obtained, a search is performed to determine whether the currently obtained text field exists among the M text fields included in the reference image. If the currently obtained text field exists among the M text fields included in the reference image, it indicates that the currently obtained text field is a correct text field. However, because the fifth initial image includes at least two text fields, the foregoing determining needs to be performed for a plurality of times. As long as any text field included in the fifth initial image does not exist among the M text fields included in the reference image, an initial image may be shot again.

In an actual application, when the user comes to a target venue, for example, a shopping mall, if the user comes to the shopping mall for the first time, and wants to view some description information of the shopping mall by using a mobile phone, the user may take out the mobile phone, stand at a second location, turn on a camera, and point the camera at an environment of the shopping mall for shooting. In this case, the terminal may obtain the fifth initial image, and the terminal may detect N text region images in the fifth initial image, and separately recognize a text field included in each text region image. Then the terminal may further determine, based on a previous/next video frame of the fifth initial image in a video stream, accuracy of the text field recognized in the fifth initial image. A time interval between the previous/next video frame and the fifth initial image is less than a duration threshold. For example, assuming that only one text field is detected in the image, text fields recognized in the previous video frame and the next video frame of the fifth initial image are both "A35", but a text field recognized in the fifth initial image is "A36". In this case, it indicates that the text field recognized in the fifth initial image may be an incorrect text field. Further, as shown in FIG. 11, a prompt box may be displayed, or the third prompt information may be directly played by voice, for example, "An incorrect text may be recognized. Please change the location or adjust the shooting angle and try again." change the location After receiving the prompt, the user moves the mobile phone to a location in which a real text is located. In the moving process, the terminal continuously shoots initial images until the user moves to the appropriate first location. When the text fields recognized in the sixth initial image all belong to text fields that can be recognized in the previous/next video frame, the terminal may determine the sixth initial image as the query image, and send the query image to the server. In this case, the terminal may further display a prompt box to prompt the user that a correct text has been detected and that information query processing is being performed based on the shot image.

In the foregoing manner, after the user performs an operation every time, the terminal may evaluate and properly guide the operation of the user based on preset logic, to guide the user to shoot a query image with high image quality. The three manners provided above may be used independently, or any two or all of the three manners may be used in combination. In addition, another manner of guiding the user to shoot a query image with high image quality may be added and used with the foregoing manners.

In addition to the foregoing manners, if the query image is automatically shot by the terminal, in the process of moving the terminal, the camera in the terminal may shoot a video stream of the target venue in real time, and extract a query image from the video stream, where the query image may be a video frame in the video stream. Alternatively, in every preset shooting period, the terminal may shoot an environmental image of the target venue, and use a complete environmental image as a query image.

Query images obtained by the terminal by shooting with different postures are different. An initial pose of the terminal may be determined based on a feature of the shot query image. The initial pose includes a current initial position and a posture of the terminal.

Operation S1702: Determine N text region images included in the query image.

N is greater than or equal to 1.

In an implementation, after the query image is obtained, the N text region images may be determined in the query image by performing text detection processing.

Operation S1703: Recognize a text field included in each text region image.

In an implementation, a text included in each text region image may be recognized separately, so that N text fields are obtained. The text field may be one character or a plurality of characters. For example, the text field may be "A", "3", or "5", or the text field may be "A35". Each of "A", "3", and "5" represents one character, and "A35" represents three characters. One or more characters may be used as one text field. In an embodiment, characters included in continuous region image parts in the query image may be used as one text field. The text field may be stored in the terminal in a form of a character string.

In an embodiment, screening processing may be performed on the N text fields detected in the query image to further extract a text field of a salient type, where the text field of the salient type is an identification field and can clearly or uniquely identify an environment. The terminal may input the N text fields included in the query image into a pre-trained text classifier, to obtain a text type of each text field included in the query image, and determine a text field whose text type is a preset salient type. Alternatively, the server may be configured to complete the execution logic, that is, the terminal sends all the text fields to the server, and the server screens out the text field of the salient type from the N text fields based on similar logic. If the terminal screens out the text field of the salient type from the N text fields, what the terminal finally sends to the server includes the query image and the text field of the salient type.

In an implementation, determining the initial pose based on the text field of the salient type and the query image can improve accuracy of the initial pose.

Operation S1704: Obtain a location region of the text region image in the query image, and send the N text fields, the query image, and the location region to the server.

In an implementation, the location region may be position coordinates of a text box corresponding to the text region image. If the text box is a square text box, the location region may be position coordinates of four vertex angles of the text box, or may be position coordinates of two opposite angles. If the text box is a circle, the location region may be position coordinates of a center of the circle and a radius of the circle.

The server may determine the initial pose of the terminal based on the N text fields, the query image, and the location region that are sent by the terminal, and then return the initial pose of the terminal to the terminal. A specific manner in which the server determines the initial pose of the terminal based on the N text fields, the query image, and the location region that are sent by the terminal is described subsequently.

Operation S1705: Receive the initial pose that is of the terminal at the first location and is returned by the server.

In an implementation, the terminal may perform processing such as navigation, route planning, and obstacle avoidance based on the received initial pose at the first location. The initial pose at the first location is determined by the server in real time based on the N text fields, the query image, and the location region that are sent by the terminal.

In an embodiment, after receiving the initial pose returned by the server, the method provided in this embodiment of the present disclosure may further include: determining a real-time pose based on the initial pose and a pose change of the terminal.

In an implementation, if the initial pose is determined by using a query image in a video, the pose change of the terminal may be further determined subsequently by using a SLAM tracking technology. The real-time pose is determined based on the initial pose and the pose change of the terminal.

In an embodiment, in addition to processing such as navigation, route planning, and obstacle avoidance that may be performed based on the real-time pose, after receiving the initial pose returned by the server, the method provided in this embodiment of the present disclosure may further include: obtaining a preview stream of a current scene; determining, based on the real-time pose, preset media content included in a digital map corresponding to the scene in the preview stream; and rendering the media content in the preview stream.

In an implementation, if the terminal is a mobile phone, an AR wearable device, or the like, a virtual scene may be constructed based on the real-time pose. First, the terminal may obtain the preview stream of the current scene. For example, the user may shoot a preview stream of a current environment in a shopping mall. Then the terminal may determine the real-time pose according to the foregoing method. Subsequently, the terminal may obtain the digital map, where the digital map records three-dimensional coordinates of each position in a world coordinate system, and corresponding preset media content exists at a preset three-dimensional coordinate position. The terminal may determine, in the digital map, a target three-dimensional coordinates positon corresponding to the real-time pose, and if corresponding preset media content exists at the a target three-dimensional coordinates positon, obtain the preset media content. For example, when the user photographs a target store, the terminal recognizes a real-time pose, determines that a current camera is photographing the target store, and may obtain preset media content corresponding to the target store, where the preset media content corresponding to the target store may be description information of the target store, for example, which goods are worth buying in the target store. Based on this, the terminal may render the media content in the preview stream. In this case, the user may view, in a preset region near an image corresponding to the target store in the mobile phone, the preset media content corresponding to the target store. After viewing the preset media content corresponding to the target store, the user may have a general understanding of the target store.

Different digital maps may be set for different venues. In this way, when the user moves to another venue, preset media content corresponding to a real-time pose may also be obtained based on the media content rendering manner provided in this embodiment of the present disclosure, and the media content is rendered in a preview stream.

The following describes a specific manner in which the server determines the initial pose of the terminal based on the N text fields, the query image, and the location region that are sent by the terminal.

The server may receive the N text fields, the query image, and the location region that are sent by the terminal, and determine a candidate reference image based on a prestored correspondence between a reference image and a text field and based on the N text fields. The server may further determine a target text region image in the query image based on the location region. In this case, the query image may be a complete environmental image shot by the terminal. A text region image included in the candidate reference image is obtained. In this case, the candidate reference image may be a candidate environmental image among pre-shot complete environmental images. Then the initial pose of the terminal may be determined based on the target text region image and the text region image included in the candidate reference image, and the determined initial pose is sent to the terminal. N is greater than or equal to 1. The query image is obtained based on an image captured by the terminal at the first location, and the scene at the first location includes the scene in the query image.

In an implementation, through an offline calibration process, the server may pre-establish a database, where the database may store environmental images pre-shot at each position in the target venue; and through the offline calibration process, the server may further predetermine a text region image in each pre-shot environmental image, and obtain a pre-established 2D-3D correspondence. The 2D-3D correspondence includes a large quantity of 3D points and corresponding 2D points in the environmental image. Each 3D point corresponds to one physical point near a location in which a real text is located in the target venue. Each 3D point corresponds to three-dimensional location information of a corresponding physical point in actual space. In addition, the server may pre-recognize a text field in the text region image in each pre-shot environmental image, and store a correspondence between each text region image and the text field.

To increase a search speed of searching for a text field, a search index may be further established based on the text field in the database, and a correspondence between each pre-recognized text region image, the text field, and the search index is stored.

The server may perform, based on the search index, retrieval processing on the N text fields sent by the terminal, to determine candidate reference images corresponding to the N text fields. In the process of determining the candidate reference images corresponding to the N text fields, the text fields may be obtained one by one. Each time a text field is obtained, a candidate reference image corresponding to the currently obtained text field is determined. In this way, the candidate reference images corresponding to the text fields can be determined one by one. Then the text region image included in the candidate reference image may be obtained, and the initial pose of the terminal at the first location is determined based on the text region image included in the candidate reference image and the target text region image.

In an embodiment, the operation of determining the initial pose of the terminal at the first location based on the target text region image and the text region image in the candidate reference image may include: determining a target reference image in the candidate reference image, where the scene at the first location includes a scene in the target reference image; and determining the initial pose of the terminal at the first location based on the target text region image and a text region image in the target reference image.

In an implementation, screening processing may be performed on the candidate reference images to determine the target reference image. Three manners of performing screening processing on the candidate reference images are described in the method provided in this embodiment of the present disclosure, and details are described later. When there is only one candidate reference image, the candidate reference image may be directly determined as the target reference image. After the target reference image is determined, the initial pose of the terminal may be determined based on the query image and the target reference image.

In an embodiment, the operation of determining the initial pose of the terminal at the first location based on the query image and the target reference image may include: determining a 2D-2D correspondence between the query image and the target reference image; and determining the initial pose of the terminal at the first location based on the 2D-2D correspondence and a preset 2D-3D correspondence of the target reference image.

In an implementation, the 2D-2D correspondence between the query image and the target reference image may include a 2D-2D correspondence between the target text region image and the text region image included in the target reference image. The 2D-3D correspondence of the target reference image may include a 2D-3D correspondence of the text region image included in the target reference image.

After the 2D-2D correspondence between the target text region image and the text region image included in the target reference image is determined, the 2D-2D correspondence and the 2D-3D correspondence of the text region image included in the target reference image may be input to a pose estimation module, and the pose estimation module may calculate the initial pose of the terminal, and output the initial pose of the terminal at the first location.

In an embodiment, before the 2D-2D correspondence between the target text region image and the text region image included in the target reference image is determined, image enhancement processing may be further performed on the target text region image to obtain a target text region image after the image enhancement processing. Then a 2D-2D correspondence between the target text region image after the image enhancement processing and the text region image included in the target reference image is determined.

The following describes the three manners of performing screening processing on the candidate reference images in the method provided in this embodiment of the present disclosure.

In an embodiment, the operation of determining the target reference image in the candidate reference image may include: determining an image similarity between each candidate reference image and the query image; and determining a candidate reference image whose image similarity is greater than or equal to a preset similarity threshold as the target reference image.

In an embodiment, the operation of determining the target reference image in the candidate reference image may include: obtaining a global image feature of each candidate reference image; determining a global image feature of the query image; determining a distance between the global image feature of each candidate reference image and the global image feature of the query image; and determining a candidate reference image whose distance is less than or equal to a preset distance threshold as the target reference image.

In an embodiment, the candidate reference images may be further screened based on location information of the terminal. The method provided in this embodiment of the present disclosure may further include: the terminal obtains the location information of the terminal, and sends the location information to the server. Correspondingly, the operation of determining the target reference image in the candidate reference image in the server may include: receiving the location information sent by the terminal; obtaining a shooting location corresponding to each candidate reference image; and determining, in each candidate reference image, a target reference image whose shooting location matches the location information.

In an embodiment, when the quantity of text fields included in the query image is greater than 1, the operation of determining the target reference image in the candidate reference image may include: determining, in each candidate reference image, a target reference image including the N text fields.

In an embodiment, the operation of determining the candidate reference image based on the prestored correspondence between a reference image and a text field and based on the N text fields may include: inputting the N text fields included in the query image into a pre-trained text classifier to obtain a text type of each text field included in the query image; determining a text field whose text type is a preset salient type; and searching, based on the prestored correspondence between a reference image and a text field, for a candidate reference image corresponding to the text field of the salient type.

In an embodiment, the operation of determining the initial pose of the terminal based on the target text region image and the text region image included in the target reference image may include: for a text region image included in each target reference image, determining an initial correspondence between image key points in the target text region image and image key points in the text region image included in the current target reference image; performing geometric verification processing on each pair of image key points in the initial correspondence to eliminate image key points that are incorrectly matched in the initial correspondence and obtain a target correspondence, where if a quantity of pairs of image key points included in the target correspondence is greater than or equal to a preset threshold, it indicates that the target reference image and the query image are images captured near the first location; and determining the initial pose of the terminal based on the query image and the target reference image.

Figure 18:
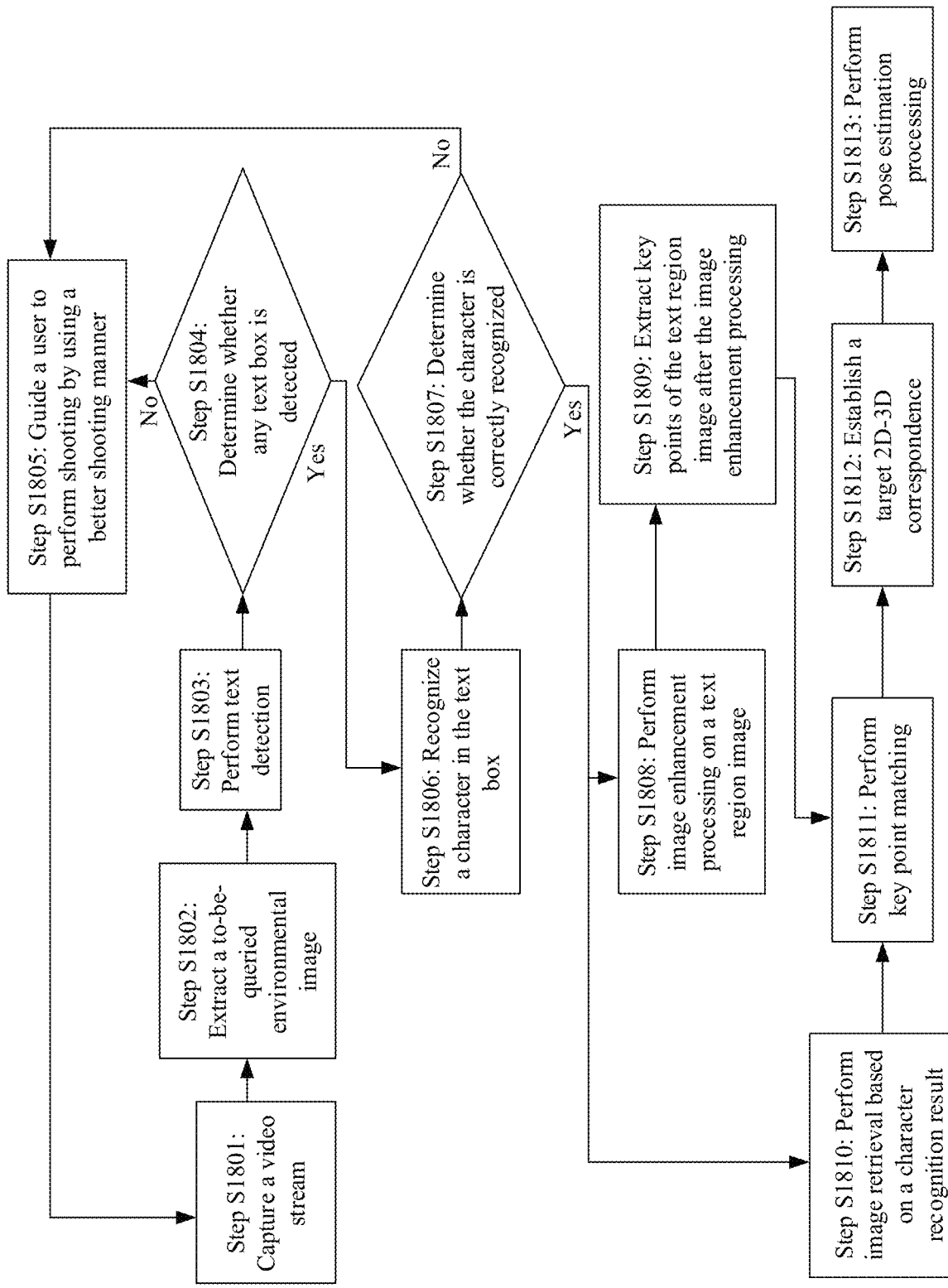
FIG. 18 is a schematic flowchart of a method for determining a pose according to an example embodiment.

Based on the foregoing content, FIG. 18 is a schematic flowchart of a method for determining a pose according to an embodiment of the present disclosure. A procedure of the method for determining a pose may include the following operations.

Operation S1801: Capture a video stream.

Operation S1802: Extract a query image from the video stream.

Operation S1803: Perform text detection processing on the query image.

Operation S1804: Determine whether any text box is detected.

Operation S1805: If no text box is detected, guide a user to perform shooting by using a better shooting manner.

Operation S1806: If a text box is detected, recognize a character in the text box.

Operation S1807: Determine, by using a character corresponding to a previous/next video frame of the query image, whether the character corresponding to the query image is correctly recognized. If no, the procedure goes to operation S1805.

Operation S1808: If the character corresponding to the query image is correctly recognized, perform image enhancement processing on a text region image.

Operation S1809: Extract image key points of the text region image after the image enhancement processing.

Operation S1810: If the character corresponding to the query image is correctly recognized, perform image retrieval based on a character recognition result to obtain a target environmental image.

Operation S1811: Perform key point matching based on the image key points of the text region image after the image enhancement processing and image key points of a text region image of the target environmental image.

Operation S1812: Establish a target 2D-3D correspondence based on a key point matching result.

Operation S1813: Perform pose estimation processing based on the target 2D-3D correspondence.

Some processing by a terminal and some processing by a server in this embodiment of the present disclosure are the same as some processing by the terminal and some processing by the server in the foregoing embodiment of the present disclosure, and parts that may be shared are not described in detail in this embodiment of the present disclosure. For details, refer to descriptions of processing by the terminal and processing by the server in the foregoing embodiment of the present disclosure. It should be noted that processing of operations S1801 to S1813 may be performed by the terminal or by the server. There are various possible interaction combinations thereof, which are not listed one by one herein. In any one of the foregoing possible interaction combinations, when the foregoing operations are implemented based on the inventive idea, a person skilled in the art can construct a communication process between the server and the terminal, for example, necessary information to be exchanged and transmitted between the server and the terminal. No exhaustive or repeated description is provided in the present disclosure.

According to this embodiment of the present disclosure, in some scenes with weak textures or high texture similarities (for example, a corridor or a wall occupying a large area of the query image), a candidate reference image matching the query image may be queried based on a text field included in the query image and text fields included in different reference images. Even if textures in the query image are weak or there are few textures, a candidate reference image with higher accuracy can still be found based on the text field. An initial pose of the terminal obtained by performing pose calculation processing based on the candidate reference image with higher accuracy is more accurate. Because retrieval and accurate positioning are performed based on text field retrieval and feature matching of text region images, and text semantic information in a scene can be used, a success rate of positioning in some regions with similar textures or duplicate textures can be increased. In addition, because the 2D-3D correspondence of the reference image to which the text region image belongs is used, positioning accuracy is higher.

According to this embodiment of the present disclosure, a text field may be fused into a visual feature without perception. Therefore, a recall rate and accuracy of image retrieval are higher, the process is not perceived by the user, a positioning process is also more intelligent, and user experience is better.

According to this embodiment of the present disclosure, even if a plurality of similar environments exist at different positions in target venues, and there are a plurality of similar images among different images shot at different positions in the venues, a candidate reference image that matches the query image can be queried based on a text field included in the query image and text fields included in different reference images. Even if there is interference from the plurality of similar images, accuracy of the candidate reference image found based on the text field is high, and the initial pose of the terminal obtained by performing pose calculation processing based on the candidate reference image with higher accuracy is more accurate.

Figure 19:
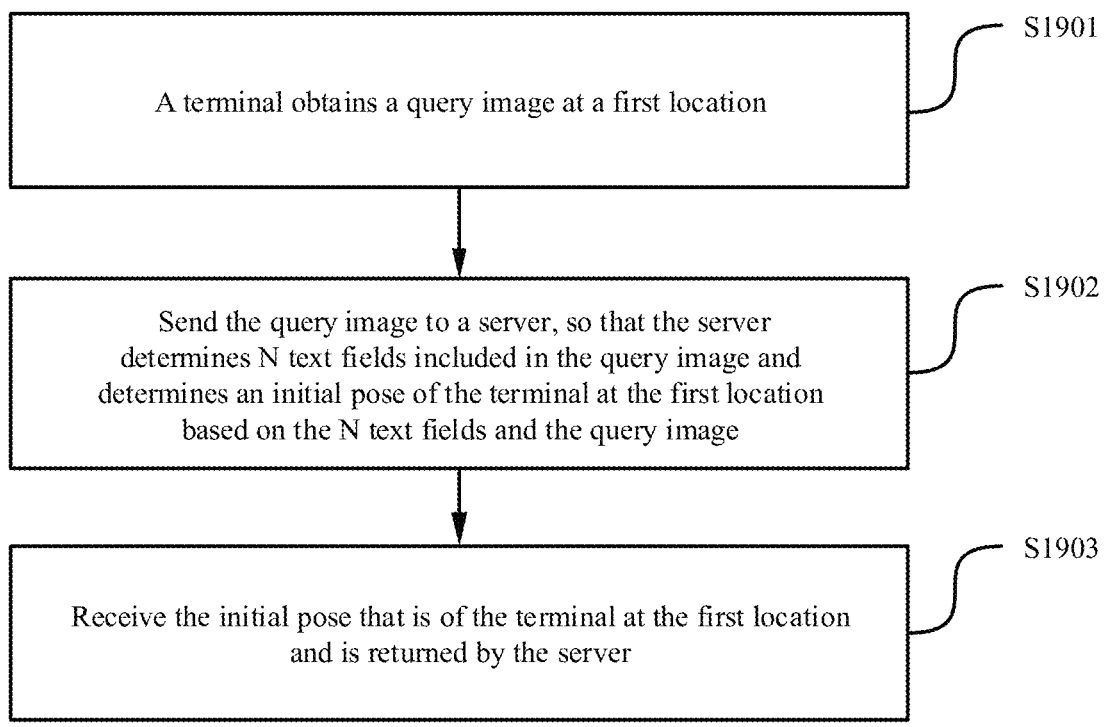
FIG. 19 is a schematic flowchart of a method for determining a pose according to an example embodiment.

An example embodiment of the present disclosure provides a method for determining a pose. The method may be applied to a terminal. As shown in FIG. 19, a processing procedure of the method may include the following operations.

Operation S1901: A terminal obtains a query image at a first location.

A scene at the first location includes a scene in the query image.

Operation S1902: Send the query image to a server, so that the server determines N text fields included in the query image and determines an initial pose of the terminal at the first location based on the N text fields and the query image.

N is greater than or equal to 1.

Operation S1903: Receive the initial pose that is of the terminal at the first location and is returned by the server.

In an embodiment, the method further includes: obtaining location information of the terminal; and sending the location information to the server; and the determining an initial pose of the terminal at the first location based on the N text fields and the query image includes: determining the initial pose of the terminal at the first location based on the N text fields, the query image, and the location information.

In an embodiment, after receiving the initial pose returned by the server, the method provided in this embodiment of the present disclosure may further include: determining a real-time pose based on the initial pose and a pose change of the terminal.

In an embodiment, after receiving the initial pose returned by the server, the method provided in this embodiment of the present disclosure may further include: obtaining a preview stream of a current scene; determining, based on the real-time pose, preset media content included in a digital map corresponding to the scene in the preview stream; and rendering the media content in the preview stream.

According to this embodiment of the present disclosure, even if a plurality of similar environments exist at different positions in target venues, and there are a plurality of similar images among different images shot at different positions in the venues, a candidate reference image that matches the query image can be queried based on a text field included in the query image and text fields included in different reference images. Even if there is interference from the plurality of similar images, accuracy of the candidate reference image found based on the text field is high, and the initial pose of the terminal obtained by performing pose calculation processing based on the candidate reference image with higher accuracy is more accurate.

Figure 20:
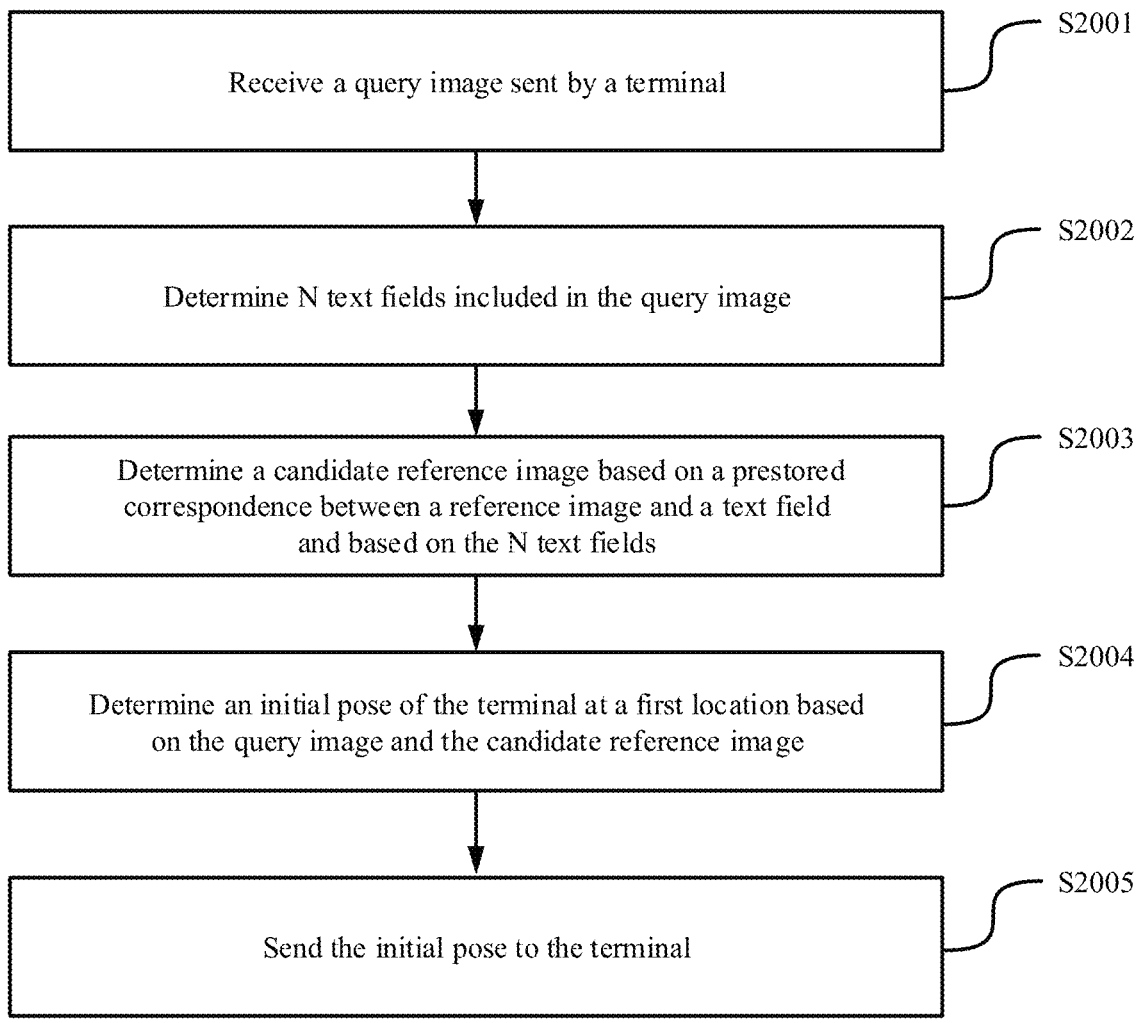
FIG. 20 is a schematic flowchart of a method for determining a pose according to an example embodiment.

An example embodiment of the present disclosure provides a method for determining a pose. The method may be applied to a server, and is implemented in cooperation with a terminal. As shown in FIG. 20, a processing procedure of the method may include the following operations.

Operation S2001: Receive a query image sent by a terminal.

The query image is obtained based on an image captured by the terminal at a first location, and a scene at the first location includes a scene in the query image.

The first location may include any geographical position or spatial position. The scene may be a scene or an environment in which a terminal device is used, for example, a room or a site. Alternatively, the scene may be an entirety or a part of a scene that can be captured by a camera of the terminal within a preset position range, and the scene may further include an environmental background, a physical object in the environment, and the like. A specific range and size of the scene are freely defined according to an actual requirement, and are not limited in this embodiment of the present disclosure. The scene at the first location may be a specific scene around the first location, and may include a preset geographical range or a field of view. The query image may be an image captured by the terminal at the first location, a scene in the image is consistent with a physical scene, and the scene in the query image may be a part or an entirety of the scene at the first location. The first location is not limited to an accurate position, and an actual position is allowed to have an accuracy error.

In an implementation, a user may shoot the query image by using the terminal, and send the query image to a server. In this case, the server may receive the query image sent by the terminal.

To ensure quality of the query image received by the server, some means may be used to ensure image quality of the shot query image. For example, prompt information may be displayed in a user interface, where the prompt information is used to prompt that the user needs to shoot a query image including a text.

In an embodiment, if the terminal has a text detection function, the three manners of guiding the user to shoot the query image that are provided in the foregoing operation S801 may also be used to ensure quality of the query image.

In addition, when shooting the query image, the terminal may further obtain location information of the terminal, and send the location information of the terminal to the server. In this case, the server may receive the location information sent by the terminal.

Operation S2002: Determine N text fields included in the query image.

N is greater than or equal to 1.

In an implementation, after the query image is obtained, the N text fields included in the query image may be recognized based on an OCR technology. Specifically, N text region images may be determined in the query image by performing text detection processing, and a text included in each text region image is separately recognized, so that the N text fields are obtained. The text field may be one character or a plurality of characters. For example, the text field may be "A", "3", or "5", or the text field may be "A35". Each of "A", "3", and "5" represents one character, and "A35" represents three characters. One or more characters may be used as one text field. In an embodiment, characters included in continuous region image parts in the query image may be used as one text field. The text field may be stored in the server in a form of a character string.

In a process of recognizing a text field included in the query image, the server may first perform text detection processing on the query image, and output position coordinates of a text box corresponding to a text region image included in the query image. In this embodiment of the present disclosure, text detection processing may be performed by using a target detection algorithm based on deep learning (SSD). A plurality of text boxes may be detected in one query image, and each text box corresponds to one text field.

Assuming that a target venue is an underground garage, a parking region identifier may be set on a pillar of the underground garage. As shown in FIG. 12, a current parking region identifier "A35" is set on a pillar of the underground garage. When the terminal captures a query image in a current parking region, the captured query image may probably include the current parking region identifier "A35". When performing text detection processing on the query image that includes the current parking region identifier "A35", the server may output position coordinates of a text box corresponding to an "A35" region image. Alternatively, as shown in FIG. 13, when the terminal captures a query image in a corridor of a building, the captured query image may probably include a current floor identifier "3B" or "3E". When performing text detection processing on the query image that includes the current floor identifier "3B" or "3E", the server may output position coordinates of a text box corresponding to a "3B" or "3E" region image.

In this embodiment of the present disclosure, as shown in FIG. 14, after the position coordinates of the text box corresponding to the text region image included in the query image are determined, the text region image may be cropped from the query image based on the position coordinates of the text box. Convolutional neural network (CNN) feature extraction is performed on the text region image, then an extracted CNN feature is input into a recursive neural network (LSTM) for encoding processing, then classification operation processing is performed on the encoded CNN feature, and finally, the text field in the text region image, such as "A35", may be output.

In an embodiment, screening processing may be performed on the N text fields detected in the query image to further extract a text field of a salient type, where the text field of the salient type is an identification field and can clearly or uniquely identify an environment. The server may input the N text fields included in the query image into a pre-trained text classifier, to obtain a text type of each text field included in the query image, and determine a text field whose text type is a preset salient type.

In an implementation, a large quantity of text fields may be included in the target venue. Some text fields help recognize the current environment, and some text fields may interfere with the process of recognizing the current environment. A text field that helps recognize the current environment may be used as the text field of the salient type. An effective text field capture rule may be predefined. In an application, an identification text field in the target venue, for example, a parking region identifier "A32" or "B405" in the underground garage, may be selected as a positive sample. In addition, a non-identification text field in the target venue may also be selected as a negative sample. The classifier is trained based on the positive sample and the negative sample.

After the N text fields are extracted from the query image, each of the N text fields may be input into the trained classifier. If a value output by the classifier is close or equal to 1, the current text field may be considered as a text field of the salient type. If an output value is close or equal to 0, the current text field may be considered as a text field of a non-salient type. Based on the text field of the salient type and the query image, accuracy of a determined initial pose is improved more advantageously.

Operation S2003: Determine a candidate reference image based on a prestored correspondence between a reference image and a text field and based on the N text fields.

In an implementation, through an offline calibration process, the server may pre-establish a database, where the database may store reference images shot at each position in the target venue; and through the offline calibration process, the server may further obtain a pre-established 2D-3D correspondence. The 2D-3D correspondence includes a large quantity of 3D points and corresponding 2D points in a reference image. Each 3D point corresponds to one physical point in the target venue. Each 3D point corresponds to three-dimensional location information of one corresponding physical point in the actual space. In addition, the server may pre-recognize a text field in each reference image, and store a correspondence between each reference image and the text field. When the query image is a complete environmental image shot by the terminal, the reference image may be a complete environmental image pre-shot at each position in the target venue.

To increase a search speed of searching for a text field, a search index (global index) may be further established based on the text field in the database, and a correspondence between each reference image, the text field, and the search index is stored.

After determining the N text fields in the query image, the server may perform, based on the search index, retrieval processing on the N text fields included in the query image, to determine candidate reference images corresponding to the N text fields. The candidate reference image may be a target environmental image among pre-shot environmental images. In the process of determining the candidate reference images corresponding to the N text fields, the text fields may be obtained one by one. Each time a text field is obtained, a candidate reference image corresponding to the currently obtained text field is determined. In this way, the candidate reference images corresponding to the text fields can be determined one by one.

If two or more text fields included in a candidate reference image are all the same as the text fields in the query image, the candidate reference image of this type may be determined for two or more times based on the foregoing determining manner. To be specific, a first candidate reference image may be determined by using a first text field in the query image, and the first candidate reference image may also be determined by using a second text field in the query image. Therefore, the first candidate reference image includes both the first text field and the second text field. Therefore, a deduplication operation may be performed on all determined candidate reference images to remove candidate reference images that are determined for a plurality of times. After determining the candidate reference image, the server may determine the initial pose of the terminal based on the query image and the candidate reference image, and send the determined initial pose to the terminal.

The foregoing describes a case in which the terminal sends only one query image to the server. In an embodiment, if the terminal sends a plurality of query images to the server, one initial pose of the terminal may be determined based on each query image, and finally, a plurality of initial poses may be obtained. A target initial pose is determined in the plurality of initial poses based on probability statistics, and the target initial pose is sent to the terminal. The operation of determining the target initial pose in the plurality of initial poses based on probability statistics may include: determining, in the plurality of initial poses, a target initial pose that repeatedly occurs for a largest quantity of times.

In an embodiment, the operation of determining the initial pose of the terminal based on the query image and the candidate reference image may include: determining a target reference image in the candidate reference image, where the scene at the first location includes a scene in the target reference image; and determining the initial pose of the terminal based on the query image and the target reference image.

In an implementation, because some of candidate reference images are still interfering images, that is, the candidate reference images are not necessarily images pre-shot near the first location at which the query image is shot, but text fields corresponding to the candidate reference images are exactly consistent with the text fields corresponding to the query image, the interfering images are also used as candidate reference images to determine the initial pose of the terminal, and this affects accuracy of the initial pose. Therefore, screening processing may be performed on the candidate reference images to determine the target reference image. Four manners of performing screening processing on the candidate reference images are described in the method provided in this embodiment of the present disclosure, and details are described later. When there is only one candidate reference image, the candidate reference image may be directly determined as the target reference image. After the target reference image is determined, the initial pose of the terminal may be determined based on the query image and the target reference image.

In an embodiment, the operation of determining the initial pose of the terminal based on the query image and the target reference image may include: determining a 2D-2D correspondence between the query image and the target reference image; and determining the initial pose of the terminal based on the 2D-2D correspondence and a preset 2D-3D correspondence of the target reference image.

In an implementation, in the offline calibration process, the server may pre-extract a local image feature of each reference image, and store a correspondence between each environmental image, the local image feature, and the foregoing text field. The local image feature may include image key points, for example, corner points and other pixels having features in the image. The server may determine, based on a correspondence between a reference image and a local image feature, a local image feature of the target reference image. After receiving the query image sent by the terminal, the server may extract a local image feature of the query image, and perform feature matching between the local image feature of the query image and the local image feature of the target reference image. To be specific, an image key point corresponding to the query image is matched with an image key point corresponding to the target reference image, where the image key point is a 2D point, and a 2D-2D correspondence between the query image and the target reference image may be obtained. The 2D-2D correspondence between the query image and the target reference image may include a 2D-2D correspondence between a complete environmental image shot by the terminal and a target environmental image among pre-shot complete environmental images.

For example, the query image has three image key points (including A1, B1, and C1), and the target reference image has five image key points (including A2, B2, C2, D2, and E2). Three groups of correspondences are determined through feature matching: A1-B2, B1-E2, and C1-A2. Certainly, in an actual application, a process of performing feature matching is much more complex, and a quantity of used image key points is also larger. Herein, only several image key points are used as an example for description. It should be noted that, theoretically, an image key point corresponding to the matched query image and an image key point corresponding to the target environmental image should correspond to a same physical point.

In the offline calibration process, the server may establish a 3D point cloud of the target venue based on a reference image shot at each position in the target venue, where each pixel in each reference image corresponds to one 3D point in the 3D point cloud, and the correspondence may be recorded as an initial 2D-3D correspondence. After determining image key points of each reference image, the server may determine, based on the initial 2D-3D correspondence, a 3D point that is in the 3D point cloud and corresponding to each image key point in the target reference image, and the correspondence may be recorded as a 2D-3D correspondence of the target reference image. The 2D-3D correspondence of the target reference image may be a 2D-3D correspondence of the target reference image corresponding to the first location at which the terminal captures the query image. In an online positioning process, the server may determine a 2D-2D correspondence between the query image and the target reference image, that is, a correspondence between image key points of the query image and image key points of the target environmental image. Then the server may determine, based on the 2D-2D correspondence between the query image and the target reference image and the 2D-3D correspondence of the target reference image, 3D points that are in the 3D point cloud and corresponding to the image key points of the query image.

After the 3D points that are in the 3D point cloud and corresponding to the image key points of the query image are determined, the 3D points that are in the 3D point cloud and corresponding to the image key points of the query image, location information of each image key point of the query image, and three-dimensional location information of each corresponding 3D point may be input into a pose estimation module. The pose estimation module may calculate the pose of the terminal and output the initial pose of the terminal.

The following describes the four manners of performing screening processing on the candidate reference images in the method provided in this embodiment of the present disclosure.

In an embodiment, the operation of determining the target reference image in the candidate reference image may include: determining an image similarity between each candidate reference image and the query image; and determining a candidate reference image whose image similarity is greater than or equal to a preset similarity threshold as the target reference image.

In an implementation, the server may calculate the image similarity between each candidate reference image and the query image based on a preset image similarity algorithm, and then may determine, in each candidate reference image, an image whose image similarity is greater than the preset similarity threshold as the target reference image. One or more target reference images may be determined. Alternatively, the candidate reference images may be sorted in descending order of image similarities, and a preset quantity of top-ranked images are determined as the target reference images. The image similarity algorithm may include a K-nearest neighbor algorithm or the like. The preset similarity threshold may be set to a value based on experience, or may be set to an appropriate value based on experience.

In an embodiment, the operation of determining the target reference image in the candidate reference image may include: obtaining a global image feature of each candidate reference image; determining a global image feature of the query image; determining a distance between the global image feature of each candidate reference image and the global image feature of the query image; and determining a candidate reference image whose distance is less than or equal to a preset distance threshold as the target reference image.

In an implementation, the server may determine, based on a prestored correspondence between a reference image and a global image feature, the global image feature of each candidate reference image, and may also extract the global image feature of the query image, where the global image feature may be data represented in a vector form. Therefore, the distance between the global image feature of each candidate reference image and the global image feature of the query image may be calculated. The distance may be a Euclidean distance or the like. After the distance is calculated, a candidate reference image whose distance is less than or equal to the preset distance threshold may be determined as the target reference image. The preset distance threshold may be set to a value based on experience, or may be set to an appropriate value based on experience. Alternatively, after the distance is calculated, the candidate reference images may be sorted in ascending order of distances, and a preset quantity of top-ranked candidate reference images are selected as the target reference images.

As shown in FIG. 14, in the method provided in this embodiment of the present disclosure, a VGG network may be used to extract a global image feature. An environmental image may be input into the VGG network, and the VGG network may perform CNN feature extraction on the environmental image. The VGG network includes a plurality of network layers, and an output of a penultimate fully connected layer in the plurality of network layers may be selected as an extracted CNN feature. Then L2 normalization processing is performed on the extracted CNN feature to obtain a feature after 4096-dimensional normalization processing. This feature is a global image feature of the environmental image. In an actual application, alternatively, the global image feature of the environmental image may be extracted in another manner. This is not limited in this embodiment of the present disclosure.

As shown in FIG. 15, a system provided in this embodiment of the present disclosure may include a video stream input module 1501, an image extraction module 1502, a text box detection module 1503, a text recognition module 1504, a global feature extraction module 1505, a local feature extraction module 1506, an image retrieval module 1507, a 2D-2D feature matching module 1508, a 2D-3D matching module 1509, and a pose estimation module 1510. The video stream input module 1501 may be configured to obtain a video stream. The image extraction module 1502 may be configured to extract a video frame from the video stream. The text box detection module 1503 may be configured to detect a text region image in the video frame. The text recognition module 1504 may be configured to determine a text field in the text region image. The global feature extraction module 1505 may be configured to extract a global image feature of the video frame. The local feature extraction module 1506 may be configured to extract a local image feature of the video frame, such as an image key point. Operation processing in the global feature extraction module 1505 and operation processing in the local feature extraction module 1506 may be performed in parallel. The image retrieval module 1507 may be configured to search for a target reference image based on the text field and the global image feature of the video frame. The 2D-2D feature matching module 1508 may be configured to determine a 2D-2D correspondence between the video frame and the target reference image based on the local image feature of the video frame and a local image feature of the target reference image. The 2D-3D matching module 1509 may be configured to determine a 2D-3D correspondence of the video frame based on the 2D-2D correspondence between the video frame and the target reference image. The pose estimation module 1510 may be configured to determine an initial pose based on the 2D-3D correspondence of the video frame.

The video stream input module 1501 and the image extraction module 1502 may be deployed on a terminal in the system. The text box detection module 1503, the text recognition module 1504, the global feature extraction module 1505, the local feature extraction module 1506, the image retrieval module 1507, the 2D-2D feature matching module 1508, the 2D-3D matching module 1509, and the pose estimation module 1510 may be deployed on a server in the system. The video stream input module 1501 and the image extraction module 1502 may be implemented by using an obtaining module 2701 of a terminal-side apparatus. The text box detection module 1503, the text recognition module 1504, the global feature extraction module 1505, the local feature extraction module 1506, the image retrieval module 1507, the 2D-2D feature matching module 1508, the 2D-3D matching module 1509, and the pose estimation module 1510 may be implemented by using a determining module 2802 of a server-side apparatus.

In an embodiment, the candidate reference images may be further screened based on location information of the terminal. The method provided in this embodiment of the present disclosure may further include: receiving location information sent by the terminal; obtaining a shooting location corresponding to each candidate reference image; and determining, in each candidate reference image, a target reference image whose shooting location matches the location information.

In an implementation, the server may divide the target venue based on a preset unit area, for example, may divide the target venue by using 100 m×100 m as a unit, to obtain a plurality of subregions. In a process of subregion division, boundaries of adjacent subregions may be allowed to overlap each other to some extent. The server may calibrate a subregion to which each reference image belongs. In the online positioning process, the terminal may first capture current location information of the terminal based on a global positioning system (GPS) or a location based service (LBS), and send the location information to the server. The server may determine a target subregion to which the location belongs. Then, in each candidate reference image, a target reference image whose shooting location also belongs to the target subregion, that is, a target reference image whose shooting location matches the location information, may be determined.

For example, third floors of two adjacent buildings both have a "301" identifier, but there is a distance between the two adjacent buildings. Even if there are duplicate identifiers, the location of the terminal may be first determined within a range through positioning. Then a search is performed within a range for a target reference image matching the identifier "301".

In an embodiment, when the quantity of text fields included in the query image is greater than 1, the operation of determining the target reference image in the candidate reference image may include: determining, in each candidate reference image, a target reference image including the N text fields.

In an implementation, in a process of determining candidate reference images corresponding to a plurality of text fields, the text fields may be obtained one by one. Each time a text field is obtained, a candidate reference image corresponding to the currently obtained text field is determined. In this way, the candidate reference images corresponding to the text fields can be determined one by one. A target reference image including a plurality of text fields in the query image may be determined from the candidate reference images, so that the candidate reference images are further screened. If one target reference image includes a plurality of text fields included in the query image, it indicates that a probability that a shooting location of the target reference image and a shooting location of the query image are close is very high, and accuracy of the initial pose determined based on the target reference image is also high.

In an embodiment, the operation of determining the candidate reference image based on the prestored correspondence between a reference image and a text field and based on the N text fields may include: inputting the N text fields included in the query image into a pre-trained text classifier to obtain a text type of each text field included in the query image; determining a text field whose text type is a preset salient type; and searching, based on the prestored correspondence between a reference image and a text field, for a candidate reference image corresponding to the text field of the salient type.

In an implementation, a large quantity of text fields may be included in the target venue. Some text fields help recognize the current environment, and some text fields may interfere with the process of recognizing the current environment. A text field that helps recognize the current environment may be used as the text field of the salient type. An effective text field capture rule may be predefined. In an application, an identification text field in the target venue may be selected as a positive sample. In addition, a non-identification text field in the target venue may also be selected as a negative sample. The classifier is trained based on the positive sample and the negative sample.

Segmentation accuracy of a text field recognition algorithm and template (such as an AI segmentation template) may be determined according to a requirement of the user, that is, several characters are used as one text field through segmentation. One character may be used as one text field, all characters included in a continuous image region may be used as one text field, or all characters included in a region may be used as one text field.

After the N text fields are extracted from the query image, each of the N text fields may be input into the trained classifier. If a value output by the classifier is close or equal to 1, the current text field may be considered as a text field of the salient type. If an output value is close or equal to 0, the current text field may be considered as a text field of a non-salient type. Determining the initial pose based on the text field of the salient type and the query image can improve accuracy of the initial pose.

Operation S2004: Determine the initial pose of the terminal at the first location based on the query image and the candidate reference image.

In an implementation, for each target reference image, an initial correspondence between image key points in the query image and image key points in the target reference image may be determined; geometric verification processing is performed on each pair of image key points in the initial correspondence to eliminate image key points that are incorrectly matched in the initial correspondence and obtain a target correspondence, where if a quantity of pairs of image key points included in the target correspondence is greater than or equal to a preset threshold, it indicates that the target reference image and the query image are images captured in the same environment; and the initial pose of the terminal is determined based on the query image and the target reference image.

In an implementation, the initial correspondence between image key points in the query image and image key points in the target reference image may be determined, where the initial correspondence includes a plurality of pairs of image key points. Then geometric verification processing may be performed on each pair of image key points to eliminate image key points that are incorrectly matched in the initial correspondence. For example, 150 pairs of image key points are included in the initial correspondence in total, 30 pairs of image key points may be eliminated through geometric verification processing, where the 30 pairs of image key points are not image key points that actually match each other, and the target correspondence may be obtained. Finally, whether the quantity of pairs of image key points included in the target correspondence is greater than or equal to the preset threshold may be determined. In this embodiment of the present disclosure, for example, the preset threshold is 100. After the 30 pairs of image key points are eliminated from the 150 pairs of image key points, 120 pairs of remaining image key points are more than the preset threshold 100 pairs. Therefore, the target reference image to which the 120 pairs of remaining image key points belong and the query image are images captured in the same environment. If the quantity of pairs of image key points included in the target correspondence is less than the preset threshold, it indicates that the target reference image and the query image are not environmental images captured in the same environment, and further, the initial pose may not be determined by using the target reference image.

Operation S2005: Send the initial pose to the terminal.

In an implementation, the terminal receives the initial pose sent by the server.

After receiving the initial pose, the terminal may perform processing such as navigation, route planning, and obstacle avoidance based on the received initial pose.

In an embodiment, after receiving the initial pose returned by the server, the method provided in this embodiment of the present disclosure may further include: the terminal determines a real-time pose based on the initial pose and a pose change of the terminal.

In an implementation, if the initial pose is determined by using a query image in a video, the pose change of the terminal may be further determined subsequently by using a simultaneous localization and SLAM tracking technology. The real-time pose is determined based on the initial pose and the pose change of the terminal.

In an embodiment, in addition to processing such as navigation, route planning, and obstacle avoidance that may be performed based on the real-time pose, after receiving the initial pose returned by the server, the method provided in this embodiment of the present disclosure may further include: the terminal obtains a preview stream of a current scene; determines, based on the real-time pose, preset media content included in a digital map corresponding to the scene in the preview stream; and renders the media content in the preview stream.

In an implementation, if the terminal is a mobile phone, an AR wearable device, or the like, a virtual scene may be constructed based on the real-time pose. First, the terminal may obtain the preview stream of the current scene. For example, the user may shoot a preview stream of a current environment in a shopping mall. Then the terminal may determine the real-time pose according to the foregoing method. Subsequently, the terminal may obtain the digital map, where the digital map records three-dimensional coordinates of each position in a world coordinate system, and corresponding preset media content exists at a preset three-dimensional coordinate position. The terminal may determine, in the digital map, a target three-dimensional coordinates positon corresponding to the real-time pose, and if corresponding preset media content exists at the a target three-dimensional coordinates positon, obtain the preset media content. For example, when the user photographs a target store, the terminal recognizes a real-time pose, determines that a current camera is photographing the target store, and may obtain preset media content corresponding to the target store, where the preset media content corresponding to the target store may be description information of the target store, for example, which goods are worth buying in the target store. Based on this, the terminal may render the media content in the preview stream. In this case, the user may view, in a preset region near an image corresponding to the target store in the mobile phone, the preset media content corresponding to the target store. After viewing the preset media content corresponding to the target store, the user may have a general understanding of the target store.

Different digital maps may be set for different venues. In this way, when the user moves to another venue, preset media content corresponding to a real-time pose may also be obtained based on the media content rendering manner provided in this embodiment of the present disclosure, and the media content is rendered in a preview stream.

According to this embodiment of the present disclosure, in some scenes with weak textures or high texture similarities (for example, a corridor or a wall occupying a large area of the query image), a candidate reference image matching the query image may be queried based on a text field included in the query image and text fields included in different reference images. Even if textures in the query image are weak or there are few textures, a candidate reference image with higher accuracy can still be found based on the text field. The initial pose of the terminal obtained by performing pose calculation processing based on the candidate reference image with higher accuracy is more accurate. Because retrieval and accurate positioning are performed based on text field retrieval and feature matching of text region images, and text semantic information in a scene can be used, a success rate of positioning in some regions with similar textures or duplicate textures can be increased. In addition, because the 2D-3D correspondence of the reference image to which the text region image belongs is used, positioning accuracy is higher.

According to this embodiment of the present disclosure, a text field may be fused into a visual feature without perception. Therefore, a recall rate and accuracy of image retrieval are higher, the process is not perceived by the user, a positioning process is also more intelligent, and user experience is better.

According to this embodiment of the present disclosure, even if a plurality of similar environments exist at different positions in target venues, and there are a plurality of similar images among different images shot at different positions in the venues, a candidate reference image that matches the query image can be queried based on a text field included in the query image and text fields included in different reference images. Even if there is interference from the plurality of similar images, accuracy of the candidate reference image found based on the text field is high, and the initial pose of the terminal obtained by performing pose calculation processing based on the candidate reference image with higher accuracy is more accurate.

It should be additionally noted that, in the methods for determining a pose as shown in FIG. 19 and FIG. 20, because the terminal may not perform processing of determining the N text fields included in the query image, the terminal may not send the prompt information in real time to prompt the user to shoot a query image including a text. Therefore, the query image sent to the server may include no text. In this case, the server cannot detect a text field in the query image, and the candidate reference image cannot be determined based on the text field. In this case, the candidate reference image may be determined according to some methods in a related technology. For example, a global feature in the query image may be extracted, and the candidate reference image may be determined by using the global feature.

When the query image includes no text, a method for determining a subsequent reference image of the query image may include the following solutions:

In an embodiment, a global image feature of each candidate reference image is obtained; a global image feature of the query image is determined; a distance between the global image feature of each candidate reference image and the global image feature of the query image is determined; and a reference image whose distance is the shortest is determined as a target candidate reference image.

In an embodiment, an image similarity between each reference image and the query image is determined; and a candidate reference image whose image similarity is the greatest is determined as a target candidate reference image.

In an embodiment, location information sent by the terminal is received; a shooting location corresponding to each reference image is obtained; and in each reference image, a target reference image whose shooting location matches the location information is determined.

Figure 21:
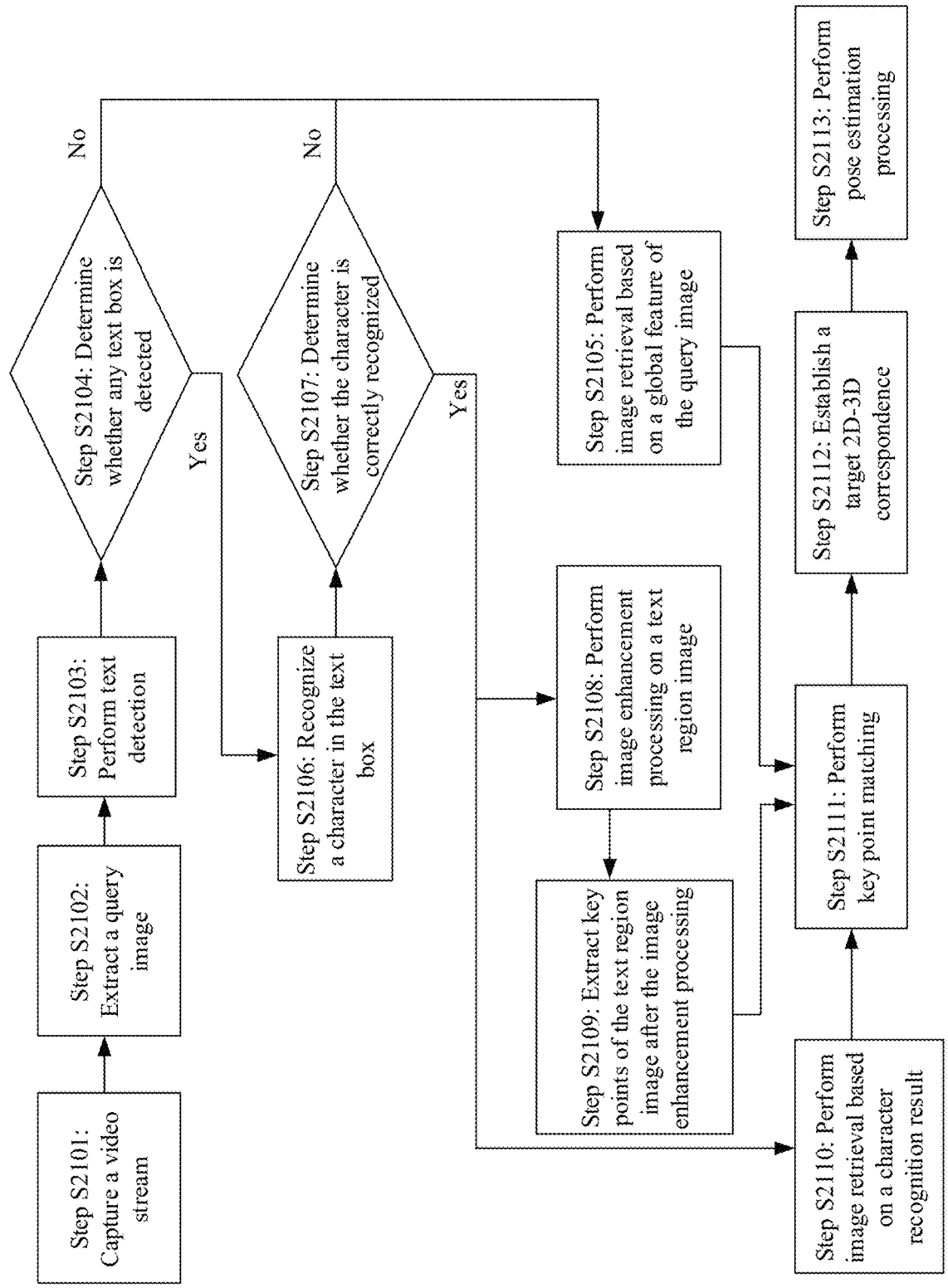
FIG. 21 is a schematic flowchart of a method for determining a pose according to an example embodiment.

Based on the foregoing content, FIG. 21 is a schematic flowchart of a method for determining a pose according to an embodiment of the present disclosure. A procedure of the method for determining a pose may include the following operations.

Operation S2101: Capture a video stream.

Operation S2102: Extract a query image from the video stream.

Operation S2103: Perform text detection processing on the query image.

Operation S2104: Determine whether any text box is detected.

Operation S2105: If no text box is detected, perform image retrieval based on a global feature of the query image to obtain a target environmental image.

Operation S2106: If a text box is detected, recognize a character in the text box.

Operation S2107: Determine, by using a character corresponding to a previous/next video frame of the query image, whether the character corresponding to the query image is correctly recognized. If no, the procedure goes to operation S2105.

Operation S2108: If a character recognition result corresponding to the query image is correct, perform image enhancement processing on a text region image.

Operation S2109: Extract image key points of the text region image after the image enhancement processing.

Operation S2110: If a character recognition result corresponding to the query image is correct, perform image retrieval based on the character recognition result to obtain a target environmental image.

Operation S2111: Perform key point matching based on the image key points of the text region image after the image enhancement processing and image key points of a text region image of the target environmental image; or perform key point matching based on image key points of the target environmental image determined in operation S2105 and image key points of the query image.

Operation S2112: Establish a target 2D-3D correspondence based on a key point matching result.

Operation S2113: Perform pose estimation processing based on the target 2D-3D correspondence.

Some processing by a terminal and some processing by a server in this embodiment of the present disclosure are the same as some processing by the terminal and some processing by the server in the foregoing embodiment of the present disclosure, and parts that may be shared are not described in detail in this embodiment of the present disclosure. For details, refer to descriptions of processing by the terminal and processing by the server in the foregoing embodiment of the present disclosure. It should be noted that processing of operations S2101 to S2113 may be performed by the terminal or by the server. There are various possible interaction combinations thereof, which are not listed one by one herein. In any one of the foregoing possible interaction combinations, when the foregoing operations are implemented based on the inventive idea, a person skilled in the art can construct a communication process between the server and the terminal, for example, necessary information to be exchanged and transmitted between the server and the terminal. No exhaustive or repeated description is provided in the present disclosure.

According to this embodiment of the present disclosure, in some scenes with weak textures or high texture similarities (for example, a corridor or a wall occupying a large area of the query image), a candidate reference image matching the query image may be queried based on a text field included in the query image and text fields included in different reference images. Even if textures in the query image are weak or there are few textures, a candidate reference image with higher accuracy can still be found based on the text field. An initial pose of the terminal obtained by performing pose calculation processing based on the candidate reference image with higher accuracy is more accurate. Because retrieval and accurate positioning are performed based on text field retrieval and feature matching of text region images, and text semantic information in a scene can be used, a success rate of positioning in some regions with similar textures or duplicate textures can be increased. In addition, because the 2D-3D correspondence of the reference image to which the text region image belongs is used, positioning accuracy is higher.

According to this embodiment of the present disclosure, a text field may be fused into a visual feature without perception. Therefore, a recall rate and accuracy of image retrieval are higher, the process is not perceived by a user, a positioning process is also more intelligent, and user experience is better.

According to this embodiment of the present disclosure, even if a plurality of similar environments exist at different positions in target venues, and there are a plurality of similar images among different images shot at different positions in the venues, a candidate reference image that matches the query image can be queried based on a text field included in the query image and text fields included in different reference images. Even if there is interference from the plurality of similar images, accuracy of the candidate reference image found based on the text field is high, and the initial pose of the terminal obtained by performing pose calculation processing based on the candidate reference image with higher accuracy is more accurate.

Figure 22:
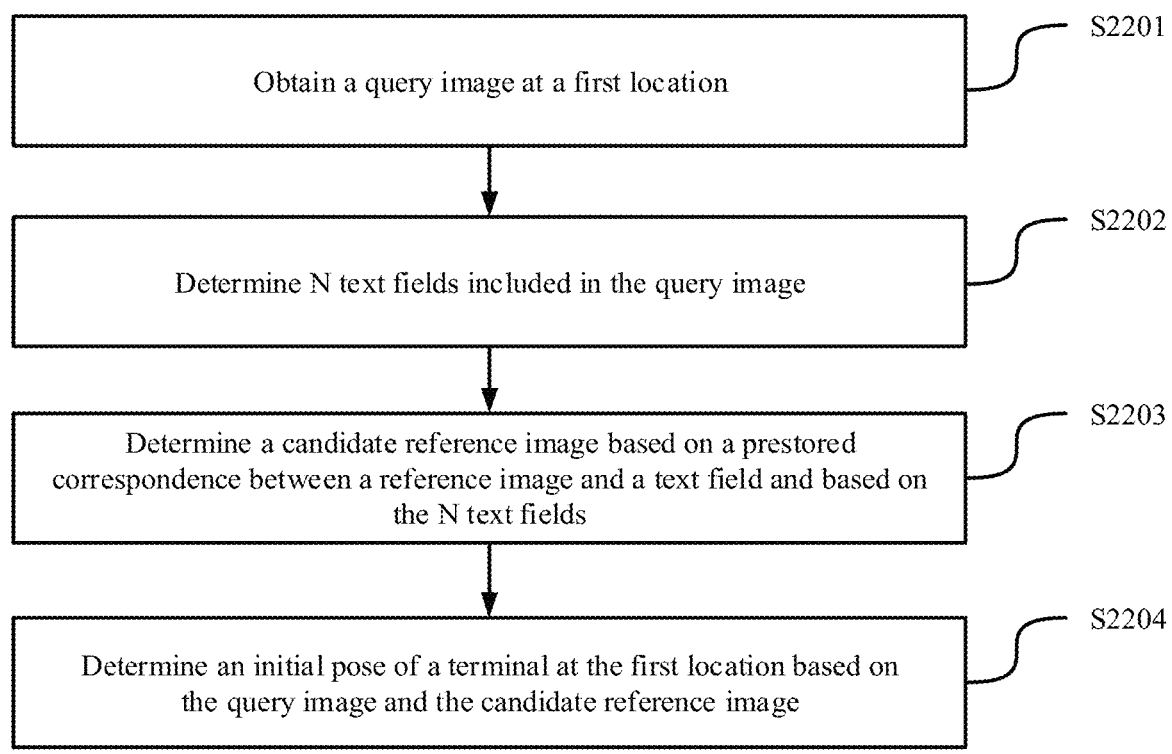
FIG. 22 is a schematic flowchart of a method for determining a pose according to an example embodiment.

In summary, the methods for determining a pose according to the embodiments of this application may be classified into two types. A difference between the two types is as follows: In one type of method, the terminal determines the N text fields included in the query image, and sends the query image and the text fields to the server. In the other type of method, the terminal sends the query image to the server, and the server determines the N text fields included in the query image. The following provides an integrated description about the two types of methods for determining a pose. The description may be as follows:

FIG. 22 is a schematic flowchart of a method for determining a pose according to an embodiment of the present disclosure. A procedure of the method for determining a pose may include the following operations.

Operation S2201: Obtain a query image at a first location.

Operation S2202: Determine N text fields included in the query image.

Operation S2203: Determine a candidate reference image based on a prestored correspondence between a reference image and a text field and based on the N text fields.

Operation S2204: Determine an initial pose of a terminal at the first location based on the query image and the candidate reference image.

It should be noted that operation S2202 may be performed by the terminal, or may be performed by a server.

When operation S2202 is performed by the terminal, after the N text fields are determined, the N text fields and the query image further need to be sent to the server. For specific processing, refer to related content in operations S1702 and S1703, S1603, and S802.

When operation S2203 is performed by the server, the terminal sends the query image to the server, and then the server performs processing of determining the N text fields in the query image. For specific processing, refer to related content in operation S2002.

Figure 23:
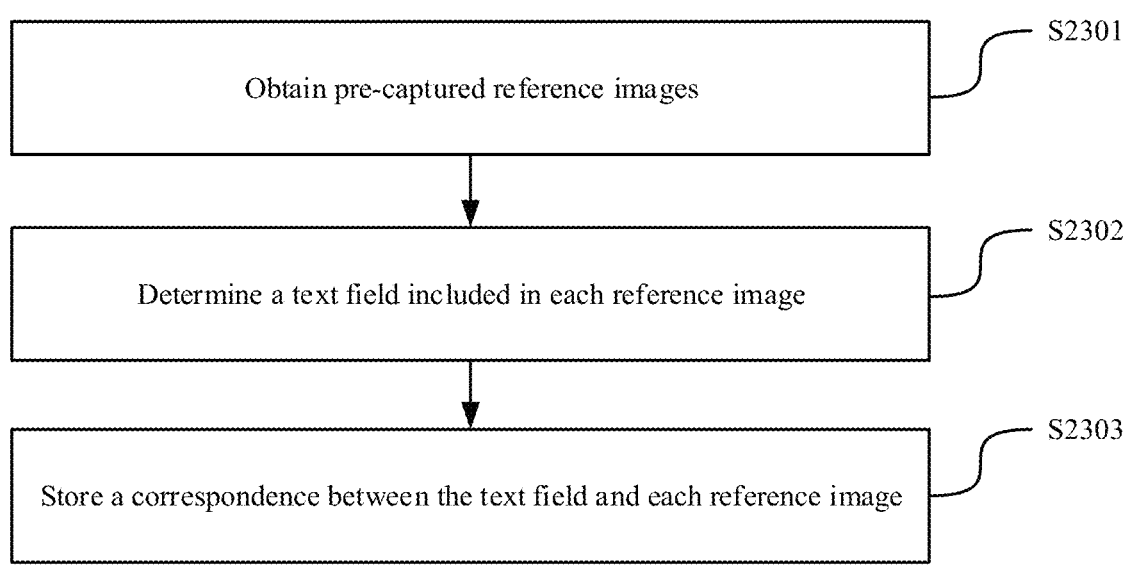
FIG. 23 is a schematic flowchart of an offline calibration method according to an example embodiment.

An example embodiment of the present disclosure provides an offline calibration method. The method may be performed before an actual online positioning process to determine some correspondences that need to be used in the online positioning process. The method may be applied to a server. As shown in FIG. 23, a processing procedure of the method may include the following operations.

Operation S2301: Obtain pre-captured reference images.

Operation S2302: Determine a text field included in each reference image.

Operation S2303: Store a correspondence between the text field and each reference image.

The foregoing processing operations have been described in corresponding processing operations in the online positioning process described in the foregoing embodiment, and details are not described herein again. For details, refer to content described in the foregoing embodiment.

Figure 24:
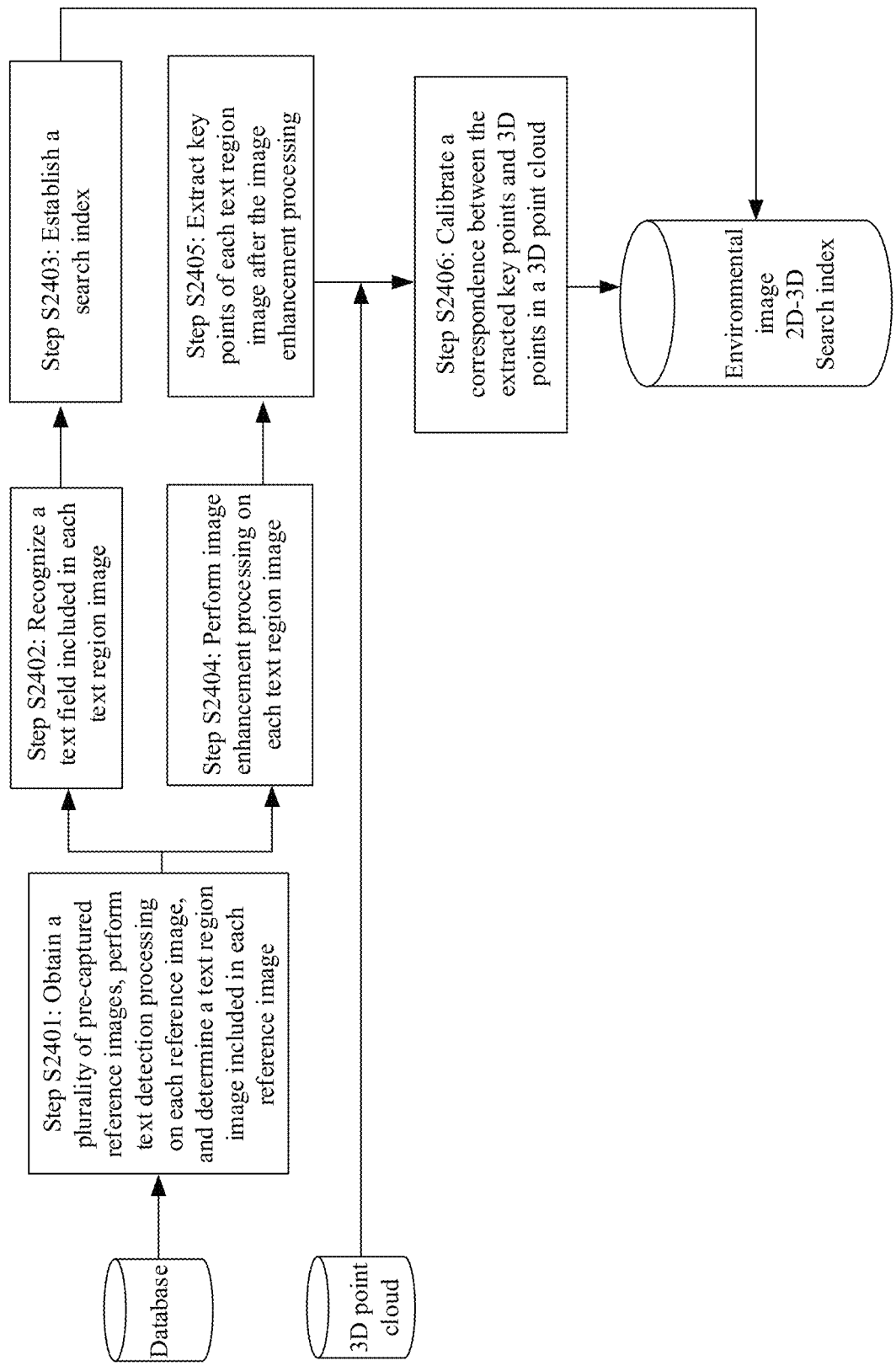
FIG. 24 is a schematic flowchart of an offline calibration method according to an example embodiment.

An example embodiment of the present disclosure further provides an offline calibration method. As shown in FIG. 24, a processing procedure of the method may include the following operations.

Operation S2401: Obtain a plurality of pre-captured reference images, perform text detection processing on each reference image, and determine a text region image included in each reference image.

The plurality of pre-captured reference images may be environmental images shot at each position in a target venue. Each time the venue is changed, an offline calibration process can be performed.

Operation S2402: Recognize a text field included in each text region image.

Operation S2403: Establish a search index based on each text field, and register and store the search index.

Operation S2404: Perform image enhancement processing on each text region image.

Operation S2405: Extract image key points of each text region image after the image enhancement processing.

Operation S2406: Obtain a 3D point cloud, calibrate a correspondence between the extracted image key points and 3D points in the 3D point cloud, and register and store the calibrated correspondence.

Optionally, the method provided in this embodiment of the present disclosure may further include: determining a 2D-3D correspondence of each text region image based on 2D points of the text region image included in each reference image and a pre-obtained 2D-3D correspondence of each reference image; and storing the 2D-3D correspondence of each text region image.

In an implementation, a server may obtain a pre-established 2D-3D correspondence of each reference image. The 2D-3D correspondence includes a large quantity of 3D points and corresponding 2D points in the reference image. Each 3D point corresponds to one physical point in the target venue. Each 3D point corresponds to three-dimensional location information of one corresponding physical point in actual space. After the text region image is determined from each reference image, the 2D points of each text region image may be obtained. Based on the 2D points of each text region image and the 2D-3D correspondence of the reference image to which each text region image belongs, the 2D-3D correspondence of each text region image may be determined. After the 2D-3D correspondence of each text region image is established, the correspondence may be stored in a database of the server.

The server may pre-establish three-dimensional location information of a physical point that is in the actual space and corresponding to each pixel in the reference image, where the information is recorded as a 2D-3D correspondence.

A method for automatic calibration based on an OCR region (text image region) and a 3D point cloud (a 2D-3D correspondence of each reference image) is provided. The method can automatically calibrate and register a text box region in an image and a 2D-3D correspondence of each existing reference image offline, and provide a data basis for subsequent accurate positioning. An offline calibration method provides a solid data basis for a subsequent online positioning process.

According to this embodiment of the present disclosure, even if a plurality of similar environments exist at different positions in target venues, and there are a plurality of similar images among different images shot at different positions in the venues, a candidate reference image that matches the query image can be queried based on a text field included in the query image and text fields included in different reference images. Even if there is interference from the plurality of similar images, accuracy of the candidate reference image found based on the text field is high, and an initial pose of the terminal obtained by performing pose calculation processing based on the candidate reference image with higher accuracy is more accurate.

Figure 25:
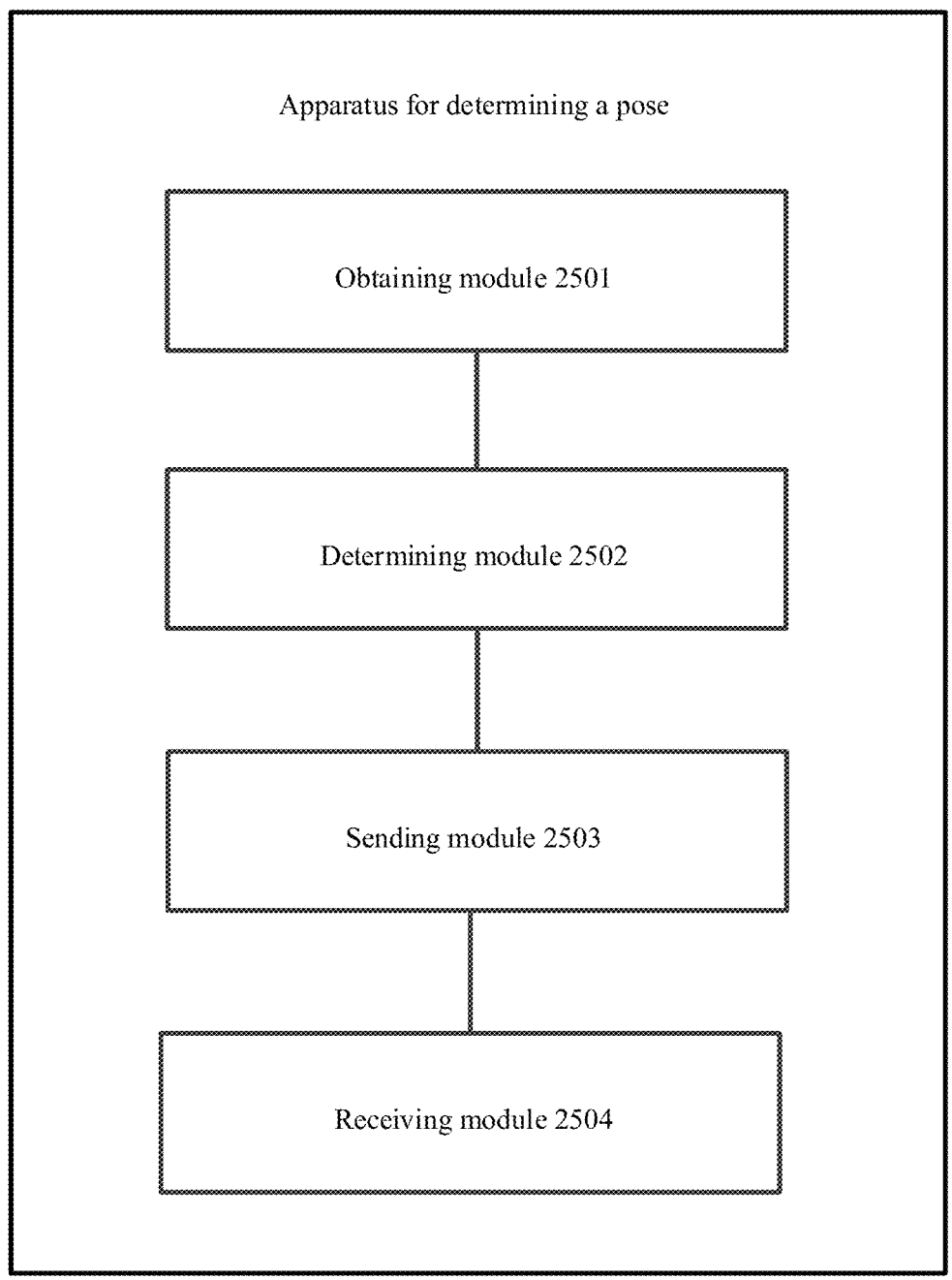
FIG. 25 is a schematic diagram of a structure of an apparatus for determining a pose according to an example embodiment.

Another example embodiment of the present disclosure provides an apparatus for determining a pose. As shown in FIG. 25, the apparatus includes:

an obtaining module 2501, configured to obtain a query image at a first location, where a scene at the first location includes a scene in the query image, and the query image has a text; and the obtaining function in operation S601 and other implicit operations may be implemented;

a determining module 2502, configured to determine N text fields included in the query image, where N is greater than or equal to 1; and the determining function in operation S602 and other implicit operations may be implemented;

a sending module 2503, configured to send the N text fields and the query image to a server; and the sending function in operation S603 and other implicit operations may be implemented; and a receiving module 2504, configured to receive an initial pose that is of a terminal at the first location and is returned by the server, where the initial pose is determined and obtained by the server based on the N text fields and the query image; and the receiving function in operation S604 and other implicit operations may be implemented.

In an embodiment, the obtaining module 2501 is configured to:

shoot a first initial image;

when the first initial image has no text, display first prompt information or play first prompt information by voice, where the first prompt information is used to indicate that no text is detected in the first initial image, and prompt a user to move a location of the terminal or adjust a shooting angle of the terminal; and when shooting, at the first location, a second initial image having a text, determine the second initial image as the query image.

In an embodiment, the obtaining module 2501 is configured to:

shoot a third initial image;

determine, by performing text detection processing on the third initial image, a text region image included in the third initial image;

when the text region image included in the third initial image does not meet a preferred image condition, display second prompt information or play second prompt information by voice, where the second prompt information is used to indicate that the text region image included in the third initial image does not meet the preferred image condition, and prompt a user to move the terminal in a direction of a real text; and when shooting, at the first location, a fourth initial image including a text region image that meets the preferred image condition, determine the fourth initial image as the query image, where the preferred image condition includes one or more of the following conditions:

a size of the text region image is greater than or equal to a size threshold;

definition of the text region image is higher than or equal to a definition threshold; and texture complexity of the text region image is less than or equal to a complexity threshold.

In an embodiment, the obtaining module 2501 is configured to:

shoot a fifth initial image;

determine N text fields included in the fifth initial image;

obtain M text fields included in a reference image, where a time interval between a time at which the reference image is captured and a time at which the fifth initial image is captured is less than a duration threshold, and M is greater than or equal to 1;

when any text field included in the fifth initial image is inconsistent with each of the M text fields, display third prompt information or play third prompt information by voice, where the third prompt information is used to indicate that an incorrect text field is recognized in the fifth initial image, and prompt a user to move a location of the terminal or adjust a shooting angle of the terminal; and when text fields included in a sixth initial image shot at the first location all belong to the M text fields, determine the sixth initial image as the query image.

In an embodiment, the obtaining module 2501 is configured to:

capture a first image of a current scene at the first location, where the first image includes a text;

perform text detection processing on the first image to obtain at least one text region image; and use the at least one text region image included in the first image as the query image.

In an embodiment, the determining module 2502 is further configured to determine a location region of the text region image in the query image; and the sending module 2503 is further configured to send the location region to the server; and that the initial pose is determined and obtained by the server based on the N text fields and the query image includes: the initial pose is determined and obtained by the server based on the location region of the text region image in the query image, the N text fields, and the query image.

In an embodiment, the obtaining module 2501 is further configured to obtain location information of the terminal; and the sending module 2503 is further configured to send the location information to the server; and that the initial pose is determined and obtained by the server based on the N text fields and the query image includes: the initial pose is determined and obtained by the server based on the N text fields, the query image, and the location information.

In an embodiment, the obtaining module 2501 is further configured to obtain a pose change of the terminal; and the determining module 2502 is further configured to determine a real-time pose based on the initial pose and the pose change of the terminal.

In an embodiment, the obtaining module 2501 is further configured to obtain a preview stream of the current scene;

the determining module 2502 is further configured to determine, based on the real-time pose, preset media content included in a digital map corresponding to the scene in the preview stream; and the apparatus further includes:

a rendering module, configured to render the media content in the preview stream.

It should be noted that the obtaining module 2501, the determining module 2502, the sending module 2503, and the receiving module 2504 may be implemented by a processor, or may be implemented by a processor in cooperation with a transceiver.

Figure 26:
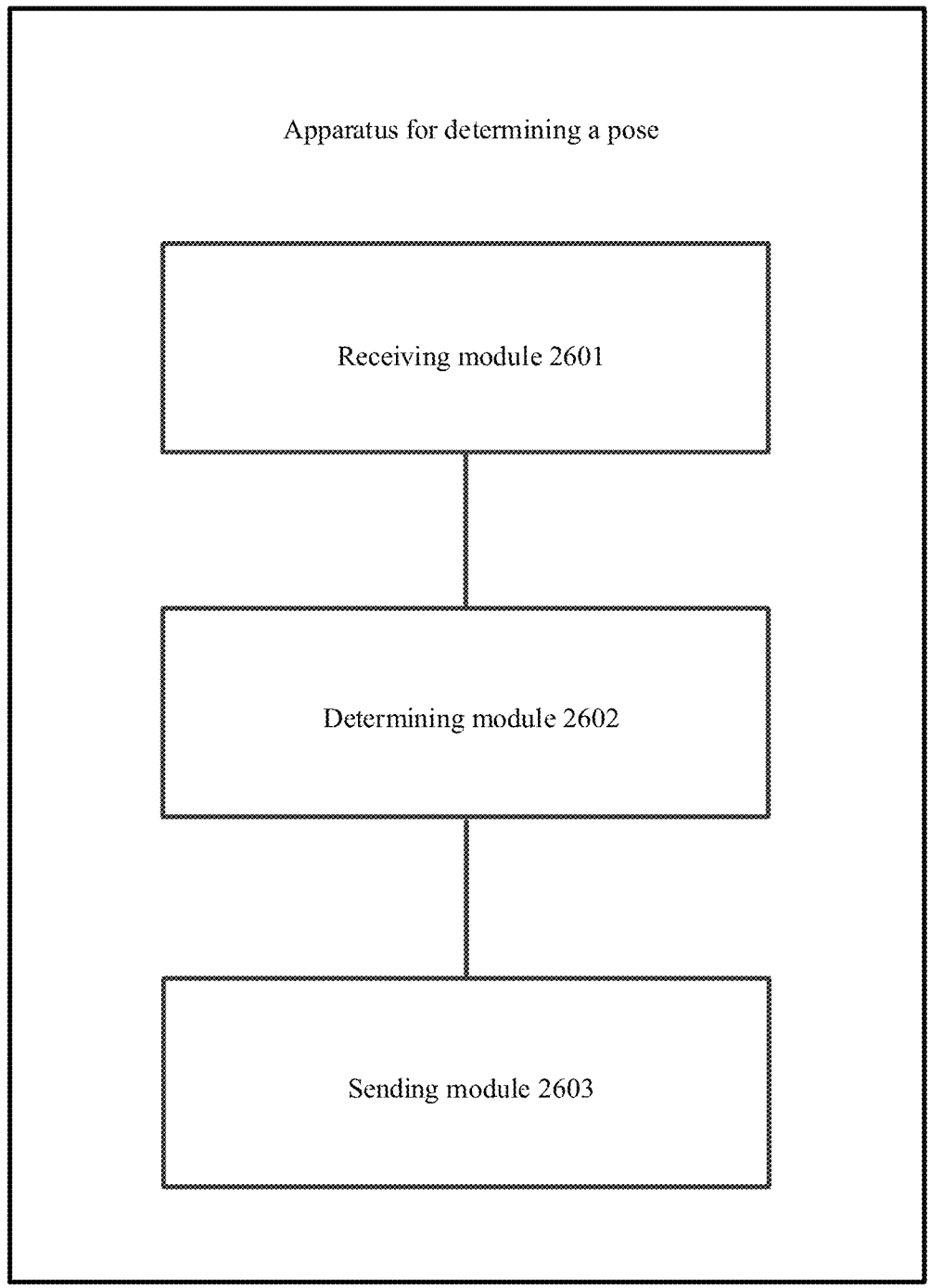
FIG. 26 is a schematic diagram of a structure of an apparatus for determining a pose according to an example embodiment.

Another example embodiment of the present disclosure provides an apparatus for determining a pose. As shown in FIG. 26, the apparatus includes:

a receiving module 2601, configured to receive a query image sent by a terminal and N text fields included in the query image, where N is greater than or equal to 1, the query image is obtained based on an image captured by the terminal at a first location, and a scene at the first location includes a scene in the query image; and the receiving function in operation S701 and other implicit operations may be implemented;

a determining module 2602, configured to determine a candidate reference image based on a prestored correspondence between a reference image and a text field and based on the N text fields; and the determining function in operation S702 and other implicit operations may be implemented, where the determining module 2602 is configured to determine an initial pose of the terminal at the first location based on the query image and the candidate reference image; and the determining function in operation S703 and other implicit operations may be implemented; and a sending module 2603, configured to send the determined initial pose to the terminal; and the sending function in operation S704 and other implicit operations may be implemented.

In an embodiment, the determining module 2602 is configured to:

determine a target reference image in the candidate reference image, where the scene at the first location includes a scene in the target reference image; and determine the initial pose of the terminal at the first location based on the query image and the target reference image.

In an embodiment, the determining module 2602 is configured to:

determine a 2D-2D correspondence between the query image and the target reference image; and determine the initial pose of the terminal at the first location based on the 2D-2D correspondence and a preset 2D-3D correspondence of the target reference image.

In an embodiment, the receiving module 2601 is further configured to receive a location region of a text region image in the query image sent by the terminal;

the determining module 2602 is configured to determine, based on the location region, a target text region image included in the query image;

the apparatus further includes:

an obtaining module, configured to obtain a text region image included in the target reference image; and the determining module 2602 is configured to determine a 2D-2D correspondence between the target text region image and the text region image included in the target reference image.

In an embodiment, the determining module 2602 is configured to:

determine an image similarity between each candidate reference image and the query image; and determine a candidate reference image whose image similarity is greater than or equal to a preset similarity threshold as the target reference image.

In an embodiment, the determining module 2602 is configured to:

obtain a global image feature of each candidate reference image;

determine a global image feature of the query image;

determine a distance between the global image feature of each candidate reference image and the global image feature of the query image; and determine a candidate reference image whose distance is less than or equal to a preset distance threshold as the target reference image.

In an embodiment, the determining module 2602 is configured to:

receive location information sent by the terminal;

obtain a shooting location corresponding to each candidate reference image; and determine, in each candidate reference image, a target reference image whose shooting location matches the location information.

In an embodiment, when N is greater than 1, the determining module 2602 is configured to:

determine, in each candidate reference image, a target reference image including the N text fields.

In an embodiment, the determining module 2602 is configured to:

when there is only one candidate reference image, determine the candidate reference image as the target reference image.

In an embodiment, the determining module 2602 is configured to:

input the N text fields included in the query image into a pre-trained text classifier to obtain a text type of each text field included in the query image;

determine a text field whose text type is a preset salient type; and search, based on the prestored correspondence between a reference image and a text field, for a candidate reference image corresponding to the text field of the salient type.

It should be noted that the receiving module 2601, the determining module 2602, and the sending module 2603 may be implemented by a processor, or may be implemented by a processor in cooperation with a memory and a transceiver.

For the apparatus in the foregoing embodiment, a specific manner of performing an operation by each module is described in detail in the method embodiments, and details are not described herein again.

Figure 27:
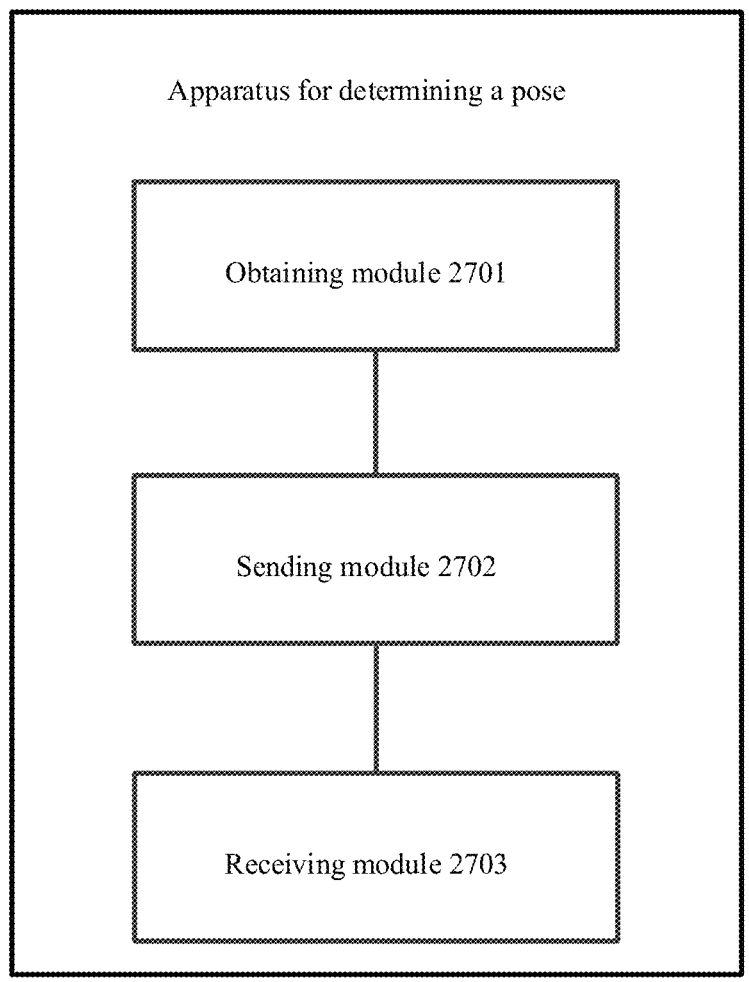
FIG. 27 is a schematic diagram of a structure of an apparatus for determining a pose according to an example embodiment.

Another example embodiment of the present disclosure provides an apparatus for determining a pose. As shown in FIG. 27, the apparatus includes:

an obtaining module 2701, configured to obtain a query image at a first location, where a scene at the first location includes a scene in the query image; and the obtaining function in operation S1901 and other implicit operations may be implemented;

a sending module 2702, configured to send the query image to a server, so that the server determines N text fields included in the query image and determines an initial pose of a terminal at the first location based on the N text fields and the query image, where N is greater than or equal to 1; and the sending function in operation S1902 and other implicit operations may be implemented; and a receiving module 2703, configured to receive an initial pose that is of the terminal at the first location and is returned by the server; and the receiving function in operation S1903 and other implicit operations may be implemented.

In an embodiment, the obtaining module 2701 is further configured to obtain location information of the terminal; and the sending module 2702 is further configured to send the location information to the server; and the determining an initial pose of a terminal at the first location based on the N text fields and the query image includes: determining the initial pose of the terminal at the first location based on the N text fields, the query image, and the location information.

In an embodiment, the obtaining module 2701 is further configured to obtain a pose change of the terminal; and the apparatus further includes a determining module, configured to determine a real-time pose based on the initial pose and the pose change of the terminal.

In an embodiment, the obtaining module 2701 is further configured to obtain a preview stream of a current scene;

the determining module is further configured to determine, based on the real-time pose, preset media content included in a digital map corresponding to the scene in the preview stream; and the apparatus further includes:

a rendering module, configured to render the media content in the preview stream.

It should be noted that the obtaining module 2701, the sending module 2702, and the receiving module 2703 may be implemented by a processor, or may be implemented by a processor in cooperation with a transceiver.

Figure 28:
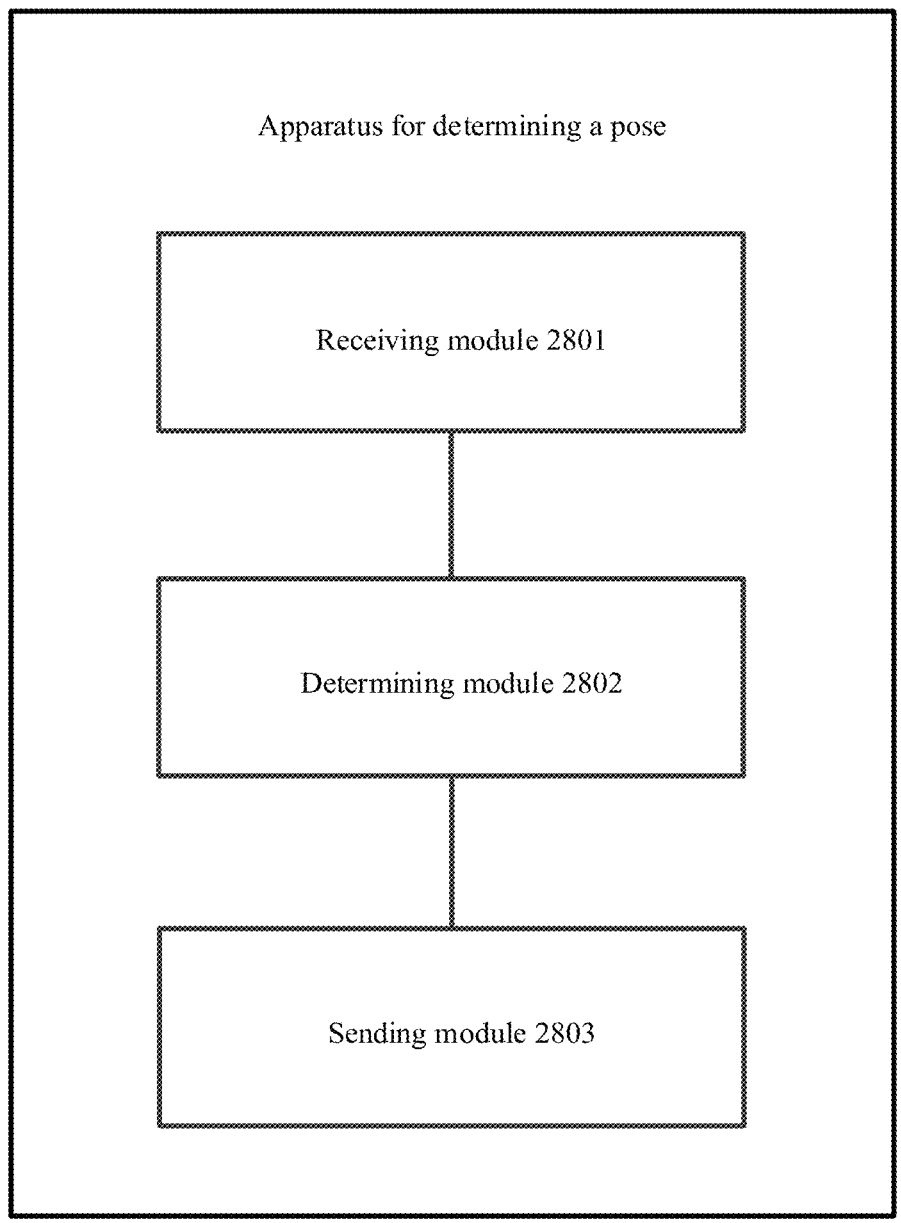
FIG. 28 is a schematic diagram of a structure of an apparatus for determining a pose according to an example embodiment.

Another example embodiment of the present disclosure provides an apparatus for determining a pose. As shown in FIG. 28, the apparatus includes:

a receiving module 2801, configured to receive a query image sent by a terminal, where the query image is obtained based on an image captured by the terminal at a first location, and a scene at the first location includes a scene in the query image; and the receiving function in operation S2001 and other implicit operations may be implemented;

a determining module 2802, configured to determine N text fields included in the query image, where N is greater than or equal to 1; and the determining function in operation S2002 and other implicit operations may be implemented, where the determining module 2802 is further configured to determine a candidate reference image based on a prestored correspondence between a reference image and a text field and based on the N text fields; and the determining function in operation S2003 and other implicit operations may be implemented; and the determining module 2802 is further configured to determine an initial pose of the terminal at the first location based on the query image and the candidate reference image; and the determining function in operation S2004 and other implicit operations may be implemented; and a sending module 2803, configured to send the initial pose to the terminal. a sending function in operation S2005 and other implicit operations may be implemented.

In an embodiment, the determining module 2802 is configured to:

determine a target reference image in the candidate reference image, where the scene at the first location includes a scene in the target reference image; and determine the initial pose of the terminal at the first location based on the query image and the target reference image.

In an embodiment, the determining module 2802 is configured to:

determine a 2D-2D correspondence between the query image and the target reference image; and determine the initial pose of the terminal at the first location based on the 2D-2D correspondence and a preset 2D-3D correspondence of the target reference image.

In an embodiment, the determining module 2802 is further configured to determine a target text region image included in the query image;

the apparatus further includes:

an obtaining module, configured to obtain a text region image included in the target reference image; and the determining module 2802 is configured to determine a 2D-2D correspondence between the target text region image and the text region image included in the target reference image.

In an embodiment, the determining module 2802 is configured to:

determine an image similarity between each candidate reference image and the query image; and determine a candidate reference image whose image similarity is greater than or equal to a preset similarity threshold as the target reference image.

In an embodiment, the determining module 2802 is configured to:

obtain a global image feature of each candidate reference image;

determine a global image feature of the query image;

determine a distance between the global image feature of each candidate reference image and the global image feature of the query image; and determine a candidate reference image whose distance is less than or equal to a preset distance threshold as the target reference image.

In an embodiment, the determining module 2802 is configured to:

receive location information sent by the terminal;

obtain a shooting location corresponding to each candidate reference image; and determine, in each candidate reference image, a target reference image whose shooting location matches the location information.

In an embodiment, when N is greater than 1, the determining module 2802 is configured to:

determine, in each candidate reference image, a target reference image including the N text fields.

In an embodiment, the determining module 2802 is configured to:

when there is only one candidate reference image, determine the candidate reference image as the target reference image.

In an embodiment, the determining module 2802 is configured to:

input the N text fields included in the query image into a pre-trained text classifier to obtain a text type of each text field included in the query image;

determine a text field whose text type is a preset salient type; and search, based on the prestored correspondence between a reference image and a text field, for a candidate reference image corresponding to the text field of the salient type.

It should be noted that the receiving module 2801, the determining module 2802, and the sending module 2803 may be implemented by a processor, or may be implemented by a processor in cooperation with a memory and a transceiver.

For the apparatus in the foregoing embodiment, a specific manner of performing an operation by each module is described in detail in the method embodiments, and details are not described herein again.

According to this embodiment of the present disclosure, even if a plurality of similar environments exist at different positions in target venues, and there are a plurality of similar images among different images shot at different positions in the venues, a candidate reference image that matches the query image can be queried based on a text field included in the query image and text fields included in different reference images. Even if there is interference from the plurality of similar images, accuracy of the candidate reference image found based on the text field is high, and the initial pose of the terminal obtained by performing pose calculation processing based on the candidate reference image with higher accuracy is more accurate.

It should be noted that, when the apparatus for determining a pose provided in the foregoing embodiment determines a pose, division into the functional modules is merely used as an example for description. During actual application, the foregoing functions may be allocated to different functional modules and implemented according to a requirement. In other words, internal structures of the terminal and the server may be divided into different functional modules to implement all or some of the functions described above. In addition, the apparatus for determining a pose provided in the foregoing embodiment is based on a same inventive idea as the method embodiment. For a specific implementation process of the apparatus for determining a pose, refer to the method embodiment, and details are not described herein again.

Another example embodiment of the present disclosure provides an apparatus for determining a pose. The apparatus includes:
- an obtaining module, configured to obtain pre-captured reference images;
- a determining module, configured to determine a text field included in each reference image; and
- a storage module, configured to store a correspondence between the text field and each reference image.

In an embodiment, the determining module is configured to:
- for each reference image, determine, by performing text detection processing on the reference image, a text region image included in the reference image; and determine a text field included in the text region image.

In an embodiment, the determining module is further configured to determine a 2D-3D correspondence of each text region image based on 2D points of the text region image included in each reference image and a pre-obtained 2D-3D correspondence of each reference image; and
- the storage module is further configured to store the 2D-3D correspondence of each text region image.

For the apparatus in the foregoing embodiment, a specific manner of performing an operation by each module is described in detail in the method embodiments, and details are not described herein again.

Another example embodiment of the present disclosure provides a system for determining a pose. The system includes a terminal and a server.

The terminal is configured to: obtain a query image at a first location, where a scene at the first location includes a scene in the query image, and the query image has a text; determine N text fields included in the query image, where N is greater than or equal to 1; send the N text fields and the query image to the server; and receive an initial pose returned by the server.

The server is configured to: receive the query image sent by the terminal and the N text fields included in the query image, where N is greater than or equal to 1, the query image is obtained based on an image captured by the terminal at the first location, and the scene at the first location includes the scene in the query image; determine a candidate reference image based on a prestored correspondence between a reference image and a text field and based on the N text fields; determine the initial pose of the terminal at the first location based on the query image and the candidate reference image; and send the determined initial pose to the terminal.

Another example embodiment of the present disclosure provides a system for determining a pose. The system includes a terminal and a server.

The terminal is configured to: obtain a query image at a first location, where a scene at the first location includes a scene in the query image; send the query image to a server; and receive an initial pose that is of the terminal at the first location and is returned by the server.

The server is configured to: receive the query image sent by the terminal; determine N text fields included in the query image, where N is greater than or equal to 1; determine a candidate reference image based on a prestored correspondence between a reference image and a text field and based on the N text fields; determine the initial pose of the terminal at the first location based on the query image and the candidate reference image; and send the initial pose to the terminal.

For the system in the foregoing embodiment, a specific manner of performing an operation by the terminal and the server has been described in detail in the embodiment related to the method. Details are not described herein again.

A person skilled in the art can easily figure out another implementation solution of the disclosure after considering the specification and practicing the disclosure that is disclosed herein. This application is intended to cover any variations, functions, or adaptive changes of the disclosure. These variations, functions, or adaptive changes comply with general principles of the disclosure, and include common knowledge or a commonly used technical means in the technical field that is not disclosed in the disclosure. The specification and the embodiments are merely considered as examples, and the actual scope of this application are pointed out by the following claims.

It should be understood that the present disclosure is not limited to the accurate structures that are described in the foregoing and that are shown in the accompanying drawings, and modifications and changes may be made without departing from the scope of the disclosure. The scope of the present disclosure is subject only to the appended claims.

What is claimed is:

1. A method for determining a pose, wherein the method comprises:
   - receiving a query image sent by a terminal and N text fields comprised in the query image, wherein N is greater than or equal to 1, wherein the query image is obtained based on an image captured by the terminal at a first location, and wherein a scene at the first location comprises a scene in the query image;
   - determining at least one candidate reference image based on a prestored correspondence between a reference image and a text field and based on the N text fields;
   - determining a target reference image in the at least one candidate reference image, wherein the scene at the first location comprises a scene in the target reference image;
   - determining an initial pose of the terminal at the first location based on the query image and the target reference image; and
   - sending the initial pose to the terminal.

2. The method according to claim 1, wherein the determining of the initial pose of the terminal at the first location based on the query image and the target reference image comprises:
   - determining a 2D-2D correspondence between the query image and the target reference image; and determining the initial pose of the terminal at the first location based on the 2D-2D correspondence and a preset 2D-3D correspondence of the target reference image.

3. The method according to claim 1, wherein the determining of the target reference image in the at least one candidate reference image comprises:
    determining an image similarity between each candidate reference image and the query image; and
    determining a candidate reference image whose image similarity is greater than or equal to a preset similarity threshold as the target reference image.

4. The method according to claim 1, wherein the determining of the target reference image in the at least one candidate reference image comprises:
    obtaining a global image feature of each candidate reference image;
    determining a global image feature of the query image;
    determining a distance between the global image feature of each candidate reference image and the global image feature of the query image; and
    determining a candidate reference image whose distance is less than or equal to a preset distance threshold as the target reference image.

5. The method according to claim 1, wherein the determining of the at least one candidate reference image based on the prestored correspondence between the reference image and the text field and based on the N text fields comprises:
    inputting the N text fields comprised in the query image into a pre-trained text classifier to obtain a text type of each text field comprised in the query image;
    determining a text field whose text type is a preset salient type; and
    searching, based on the prestored correspondence between the reference image and the text field, for a candidate reference image corresponding to the text field of the salient type.

6. An apparatus for determining a pose, wherein the apparatus comprises:
    one or more processors;
    a receiving module, configured by the one or more processors to receive a query image sent by a terminal and N text fields comprised in the query image, wherein N is greater than or equal to 1, wherein the query image is obtained based on an image captured by the terminal at a first location, and wherein a scene at the first location comprises a scene in the query image;
    a determining module, configured by the one or more processors to determine at least one candidate reference image based on a prestored correspondence between a reference image and a text field and based on the N text fields,
    determine a target reference image in at least one candidate reference image, wherein the scene at the first location comprises a scene in the target reference image, and determine an initial pose of the terminal at the first location based on the query image and the target reference image; and
    a sending module, configured by the one or more processors to send the initial pose to the terminal.

7. The apparatus according to claim 6, wherein the determining module is configured to:
    determine a 2D-2D correspondence between the query image and the target reference image; and
    determine the initial pose of the terminal at the first location based on the 2D-2D correspondence and a preset 2D-3D correspondence of the target reference image.

8. The apparatus according to claim 6, wherein the determining module is configured to:
    determine an image similarity between each candidate reference image and the query image; and
    determine a candidate reference image whose image similarity is greater than or equal to a preset similarity threshold as the target reference image.

9. The apparatus according to claim 6, wherein the determining module is configured to:
    obtain a global image feature of each candidate reference image;
    determine a global image feature of the query image;
    determine a distance between the global image feature of each candidate reference image and the global image feature of the query image; and
    determine a candidate reference image whose distance is less than or equal to a preset distance threshold as the target reference image.

10. The apparatus according to claim 6, wherein the determining module is configured to:
    input the N text fields comprised in the query image into a pre-trained text classifier to obtain a text type of each text field comprised in the query image;
    determine a text field whose text type is a preset salient type; and
    search, based on the prestored correspondence between a reference image and a text field, for a candidate reference image corresponding to the text field of the salient type.

11. A non-transitory computer readable medium storing program instructions, which, when executed by one or more processors, causes the one or more processors to perform operations for determining a pose, the operations comprising:
    receiving a query image sent by a terminal and N text fields comprised in the query image, wherein N is greater than or equal to 1, wherein the query image is obtained based on an image captured by the terminal at a first location, and wherein a scene at the first location comprises a scene in the query image;
    determining at least one candidate reference image based on a prestored correspondence a reference image and a text field and based on the N text fields;
    determining a target reference image in the at least one candidate reference image, wherein the scene at the first location comprises a scene in the target reference image;
    determining an initial pose of the terminal at the first location based on the query image and the target reference image; and
    sending the initial pose to the terminal.

12. The non-transitory computer readable medium according to claim 11, wherein the determining of the initial pose of the terminal at the first location based on the query image and the target reference image comprises:
    determining a 2D-2D correspondence between the query image and the target reference image; and
    determining the initial pose of the terminal at the first location based on the 2D-2D correspondence and a preset 2D-3D correspondence of the target reference image.

13. The non-transitory computer readable medium according to claim 11, wherein the determining of the target reference image in the at least one candidate reference image comprises:
- determining an image similarity between each candidate reference image and the query image; and
- determining a candidate reference image whose image similarity is greater than or equal to a preset similarity threshold as the target reference image.

14. The non-transitory computer readable medium according to claim 11, wherein the determining of the target reference image in the candidate reference image comprises:
- obtaining a global image feature of each candidate reference image;
- determining a global image feature of the query image;
- determining a distance between the global image feature of each candidate reference image and the global image feature of the query image; and
- determining a candidate reference image whose distance is less than or equal to a preset distance threshold as the target reference image.

15. The non-transitory computer readable medium according to claim 11, wherein the determining of the at least one candidate reference image based on the prestored correspondence between the reference image and the text field and based on the N text fields comprises:
- inputting the N text fields comprised in the query image into a pre-trained text classifier to obtain a text type of each text field comprised in the query image;
- determining a text field whose text type is a preset salient type; and
- searching, based on the prestored correspondence between the reference image and the text field, for a candidate reference image corresponding to the text field of the salient type.

* * * * *